US012512044B1

(12) United States Patent
Xie

(10) Patent No.: US 12,512,044 B1
(45) Date of Patent: Dec. 30, 2025

(54) DISPLAY PANEL AND DISPLAY DEVICE

(71) Applicant: Tianma Advanced Display Technology Institute (Xiamen) Co., Ltd., Xiamen (CN)

(72) Inventor: Mengmeng Xie, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 18/810,828

(22) Filed: Aug. 21, 2024

(30) Foreign Application Priority Data

Jun. 26, 2024 (CN) ........................ 202410840296.1

(51) Int. Cl.
*G09G 3/32* (2016.01)

(52) U.S. Cl.
CPC ....... *G09G 3/32* (2013.01); *G09G 2300/0426* (2013.01)

(58) Field of Classification Search
CPC ............. G09G 3/32; G09G 2300/0426; G09G 2310/0264; G09G 2310/08; G09G 2330/021
See application file for complete search history.

(56) References Cited

U.S. PATENT DOCUMENTS

| | | | | |
|---|---|---|---|---|
| 11,170,719 | B1 * | 11/2021 | Lu | G09G 3/3291 |
| 2020/0221554 | A1 * | 7/2020 | Chiang | H10D 86/481 |
| 2021/0056900 | A1 * | 2/2021 | Kuo | G09G 3/3233 |
| 2024/0006574 | A1 * | 1/2024 | Li | H10D 86/60 |

* cited by examiner

*Primary Examiner* — Muhammad N Edun
(74) *Attorney, Agent, or Firm* — Anova Law Group, PLLC

(57) ABSTRACT

A display panel and a display device are provided. The display panel includes a pixel circuit; and a light-emitting unit. The pixel circuit includes a first node and a second node, the first node is electrically connected to a first power line, and the second node is electrically connected to the light-emitting unit. The pixel circuit includes a first transistor coupled between the first node and the second node, the first transistor includes X first sub-transistors, gates of the X first sub-transistors are connected, first terminals of the X first sub-transistors are connected, second terminals of the X first sub-transistors are connected, X≥2, and X is an integer.

20 Claims, 45 Drawing Sheets

DISPLAY PANEL AND DISPLAY DEVICE

CROSS-REFERENCE TO RELATED APPLICATION

This application claims the priority of Chinese Patent Application No. 202410840296.1, filed on Jun. 26, 2024, the content of which is incorporated by reference in its entirety.

TECHNICAL FIELD

The present disclosure generally relates to the field of display technologies and, more particularly, relates to a display panel and a display device.

BACKGROUND

Light-emitting diode (LED) display panels are widely used in various display devices due to their advantages such as high brightness, good luminous efficiency, and low power consumption.

Display devices under different applications have different requirements for display brightness, which requires that in some display panels, the pixel circuit can output a larger driving current to the LED. How to increase the upper limit of the driving current that the pixel circuit can output while making the pixel circuit have good performance is a technical problem that needs to be solved urgently. The present disclosed display panels and display devices are direct to solve such a problem and other problems in the arts.

SUMMARY

One aspect of the present disclosure provides a display panel. The display panel includes a pixel circuit; and a light-emitting unit. The pixel circuit includes a first node and a second node, the first node is electrically connected to a first power line, and the second node is electrically connected to the light-emitting unit. Further, the pixel circuit includes a first transistor coupled between the first node and the second node, the first transistor includes X first sub-transistors, gates of the X first sub-transistors are connected, first terminals of the X first sub-transistors are connected, and second terminals of the X first sub-transistors are connected, X≥2, and X is an integer.

Another aspect of the present disclosure includes a display device. The display device includes a display panel. The display panel includes a pixel circuit; and a light-emitting unit. The pixel circuit includes a first node and a second node, the first node is electrically connected to a first power line, and the second node is electrically connected to the light-emitting unit. Further, the pixel circuit includes a first transistor coupled between the first node and the second node, the first transistor includes X first sub-transistors, gates of the X first sub-transistors are connected, first terminals of the X first sub-transistors are connected, and second terminals of the X first sub-transistors are connected, X≥2, and X is an integer.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

DETAILED DESCRIPTION

To better understand the technical solution of the present disclosure, the embodiments of the present disclosure are described in detail below in conjunction with the accompanying drawings.

It should be clear that the described embodiments are only part of the embodiments of the present disclosure, not all of the embodiments. Based on the embodiments of the present disclosure, all other embodiments obtained by ordinary technicians in the field without creative work belong to the scope of protection of the present disclosure.

The terms used in the embodiments of the present disclosure are only for the purpose of describing specific embodiments, and are not intended to limit the present disclosure. The singular forms of "one", "said" and "the" used in the embodiments of the present disclosure and the appended claims are also intended to include plural forms, unless the context clearly indicates other meanings.

It should be understood that the term "and/or" used in this disclosure is only a description of the association relationship of the associated objects, indicating that there can be three relationships, for example, A and/or B can represent: A exists alone, A and B exist at the same time, and B exists alone. In addition, the character "/" in this disclosure generally indicates that the associated objects before and after are in an "or" relationship.

Figure 1:
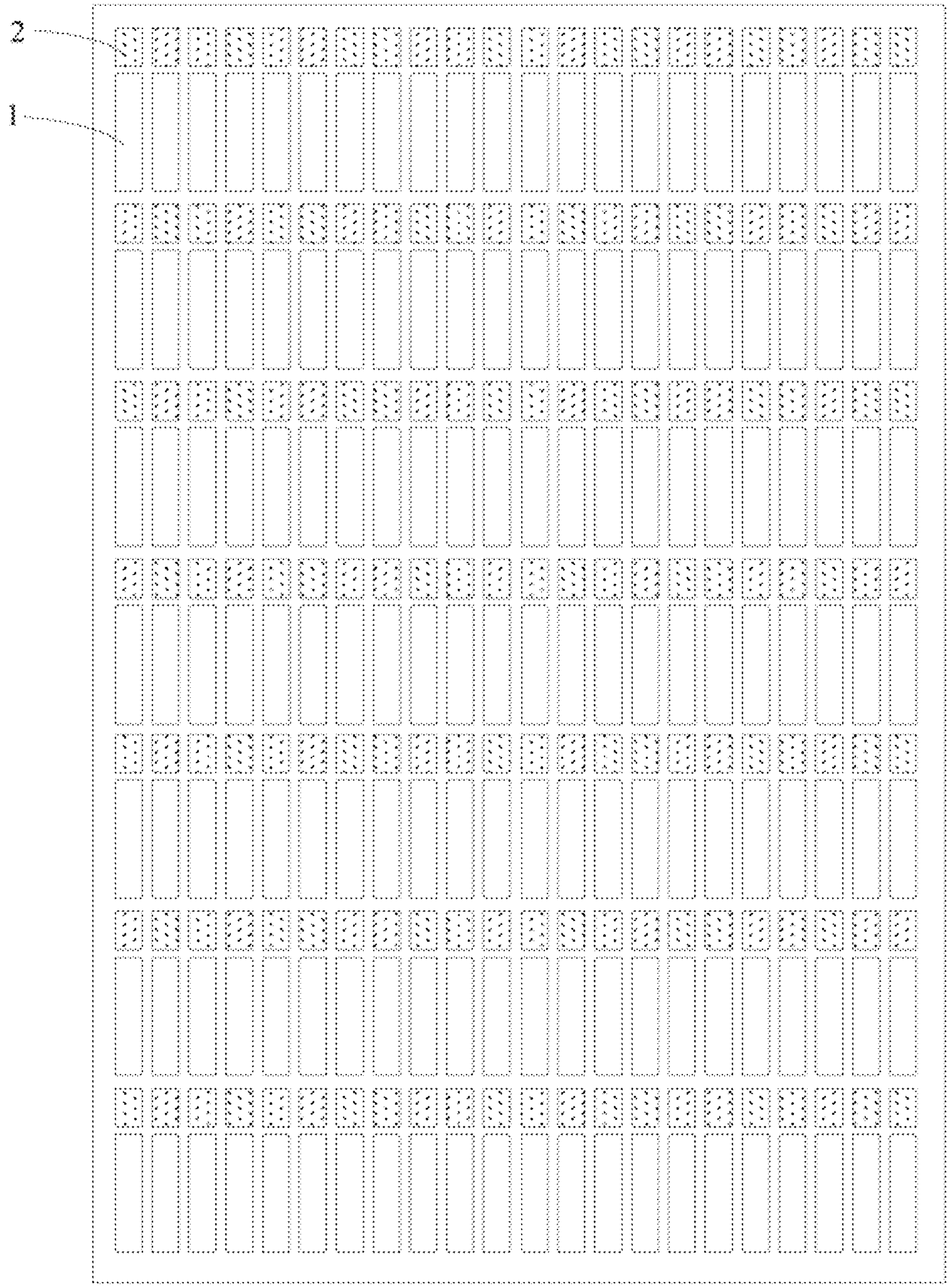
FIG. 1 illustrates an exemplary display panel according to various disclosed embodiments of the present disclosure.

The present disclosure provides a display panel. FIG. 1 is a structural schematic diagram of an exemplary display panel according to various disclosed embodiments of the present disclosure. As shown in FIG. 1, the display panel may include a pixel circuit 1 and a light-emitting unit 2.

Figure 2:
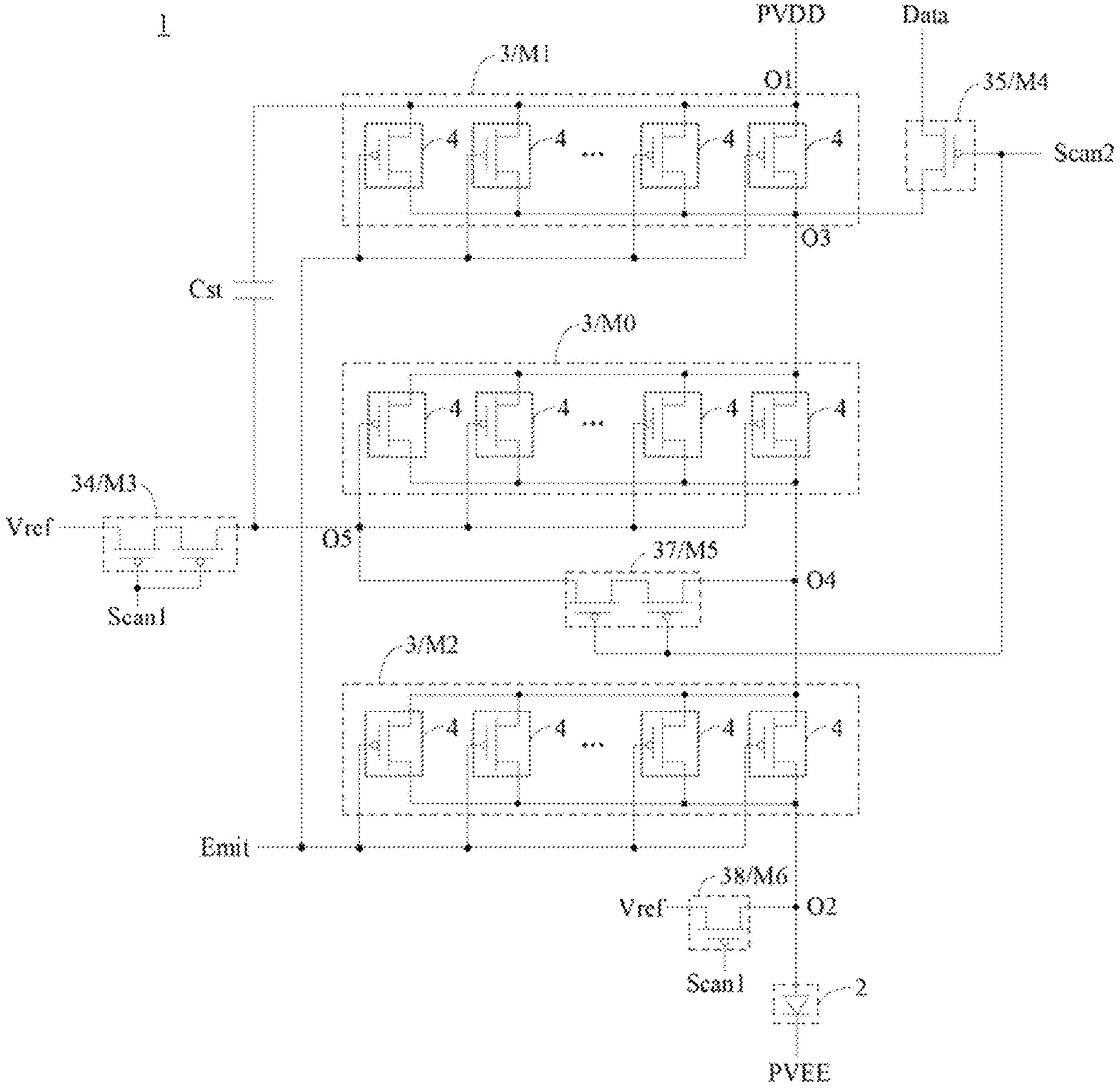
FIG. 2 illustrates a circuit structure of an exemplary pixel circuit according to various disclosed embodiments of the present disclosure.

FIG. 2 is a schematic diagram of an exemplary circuit structure of a pixel circuit 1 provided in an embodiment of the present disclosure. As shown in FIG. 2, the pixel circuit 1 may include a first node O1 and a second node O2. The first node O1 may be electrically connected to the first power line PVDD, and the second node O2 may be electrically connected to the light-emitting unit 2.

The pixel circuit 1 may include a first transistor 3, and the first transistor 3 may be coupled between the first node O1 and the second node O2. The first transistor 3 may include X first sub-transistors 4. The gates of the X first sub-transistors 4 may be connected, the first terminals of the X first sub-transistors 4 may be connected, and the second terminals of the X first sub-transistors 4 may be connected. $X \geq 2$, and X may be an integer.

The configuration that the gates of the X first sub-transistors 4 may be connected, the first terminals of the X first sub-transistors 4 may be connected, and the second terminals of the X first sub-transistors may be connected may mean that the gates of the X first sub-transistors 4 may be connected together, the first terminals of the X first sub-transistors 4 may be connected together, and the second terminals of the X first sub-transistors 4 may be connected together.

Alternatively, it may be expressed as: the X first sub-transistors 4 may include the 1st first sub-transistor 4-1 to the X-th first sub-transistor 4-X, and for any two of the x1-th first sub-transistor 4-*x*1 and the x2-th first sub-transistor 4-*x*2, the gate of the x1-th first sub-transistor 4-*x*1 may be connected to the gate of the x2-th first sub-transistor 4-*x*2, the first terminal of the x1-th first sub-transistor 4-*x*1 may be connected to the first terminal of the x2-th first sub-transistor 4-*x*2, and the second terminal of the x1-th first sub-transistor 4-*x*1 may be connected to the second terminal of the x2-th first sub-transistor 4-*x*2. x1 and x2 may be respectively taken in 1~X, and x1≠x2.

Figure 3:
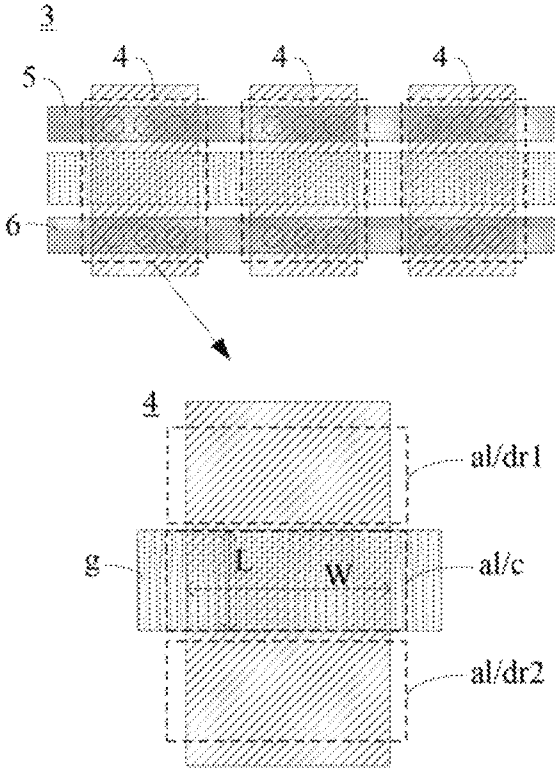
FIG. 3 illustrates an exemplary layer structure of at least a portion of the first sub-transistor of a first transistor according to various disclosed embodiments of the present disclosure.
Figure 4:
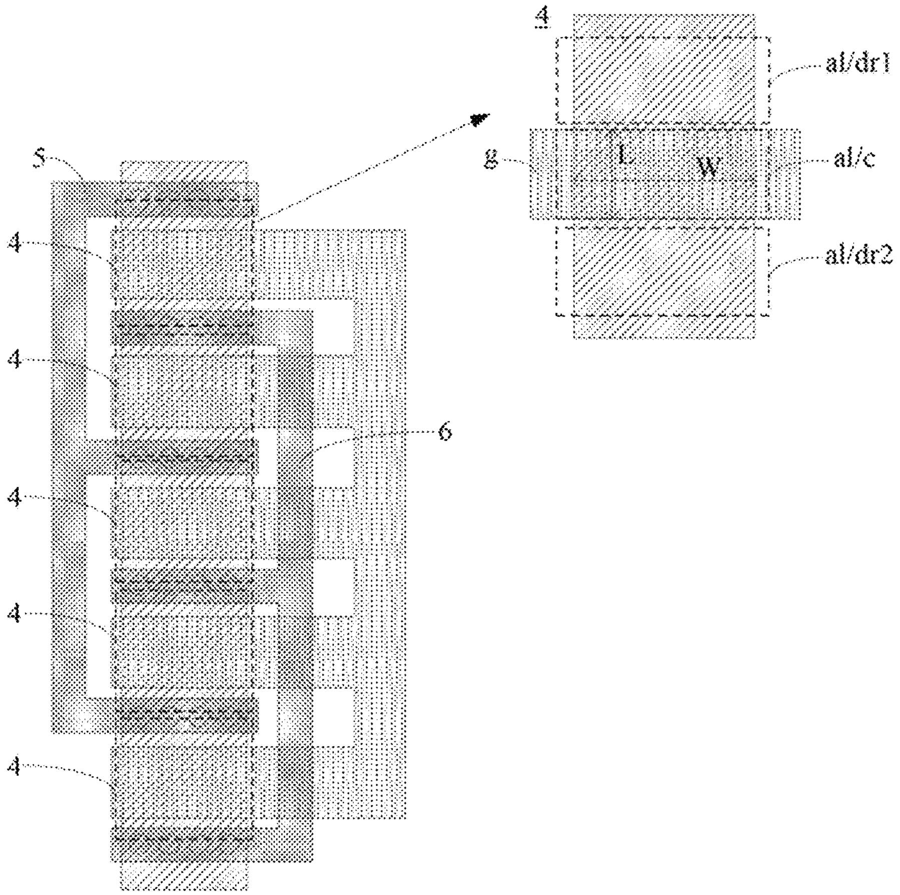
FIG. 4 illustrates another exemplary layer structure of at least a portion of the first sub-transistor in a first transistor according to various disclosed embodiments of the present disclosure.

Based on the connection relationship of the X first sub-transistors 4, it may be known that the X first sub-transistors 4 may be arranged in parallel, for example, the first transistor 3 may include X first sub-transistors 4 connected in parallel. The first sub-transistor 4 described in the embodiment of the present disclosure may be understood as a minimum transistor structure, which may be specifically categorized according to the channel:

FIG. 3 is a schematic diagram of a film layer structure of at least a portion of the first sub-transistor 4 in the first transistor 3 provided in one embodiment of the present disclosure, and FIG. 4 is a schematic diagram of another film layer structure of at least a portion of the first sub-transistor 4 in the first transistor 3 provided in one embodiment of the present disclosure. As shown in FIGS. 3-4, the first sub-transistor 4 may include a gate g and an active layer al, and the active layer al may include a channel c, a first doped region dr1 and a second doped region dr2.

The channel c is the portion of the active layer al that overlaps with the gate g, that is, in the direction perpendicular to the plane where the display panel is located, the channel c may overlap with the gate g. The channel length may be marked as L and the channel width may be marked as W. The first doped region dr1 may be understood as the first terminal of the first sub-transistor 4, and the first doped region dr1 may be usually electrically connected to other structures through the first source/drain metal electrode 5, and the second doped region dr2 may be understood as the second terminal of the first sub-transistor 4, and the second doped region dr2 may be usually electrically connected to other structures through the second source/drain metal electrode 6.

Referring to FIG. 3 and FIG. 4, the first sub-transistors 4 may be categorized according to the spacing of the channels c, that is, the channel c in a single first sub-transistor 4 may be a structure connected together as a whole, while the channels c in adjacent first sub-transistors 4 may be separated. Exemplarily, in FIG. 3, the active layers al of two adjacent first sub-transistors 4 may be separated from each other, thus the channels c of the two first sub-transistors 4 may also be separated. In FIG. 4, although the active layers al of two adjacent first sub-transistors 4 may be connected, there may be a first doped region dr1 or a second doped region dr2 between the channels c of the two first sub-transistors 4, thus the channels c of the two first sub-transistors 4 may also be separated.

It may be understood that the pixel circuit 1 may be used to transmit a driving current to the light-emitting unit 2 connected thereto to drive the light-emitting unit 2 to emit light, and the greater the driving current transmitted by the pixel circuit 1, the higher the light-emitting brightness of the light-emitting unit 2, and accordingly, the greater the brightness that the display screen may achieve. In the pixel circuit 1, the path between the first node O1 and the second node O2 may be the transmission path of the driving current, and the current output capability of the transistors connected in series on the current transmission path may largely affect the upper limit of the driving current that the pixel circuit 1 may output.

According to the characteristics of the transistor, the larger the width-to-length ratio of the transistor, the greater the current output capability of the transistor, that is, the higher the upper limit of the current that the transistor may output. However, if the transistor on the current transmission path is directly set to a transistor structure with a large channel width, the transfer characteristic curve of the transistor may be abnormal, affecting the turn-on speed of the transistor, and further affecting the performance of the pixel circuit 1.

In this regard, in an embodiment of the present disclosure, for the first transistor 3 coupled to the current transmission path, its channel width may not be directly increased, but it may be made to include at least two first sub-transistors 4 arranged in parallel. In the structure of the first transistor 3, the equivalent width-to-length ratio of the first transistor 3 may be equal to the width-to-length ratio of a single first sub-transistor 4 multiplied by the number of first sub-transistors 4 included in the first transistor 3, thereby significantly increasing the equivalent width-to-length ratio of the first transistor 3 and improving the current output capacity of the first transistor 3, while avoiding the channel width of a single transistor structure in the pixel circuit being too large. Accordingly, the transistor structure may have a better turn-on speed, and thus the pixel circuit 1 may have a better performance.

It may be further understood that after the current output capacity of the first transistor 3 is increased, the upper limit of the driving current that may be output by the pixel circuit 1 may also be increased, and the pixel circuit 1 may output a larger driving current to the light-emitting unit 2. Accordingly, the display screen may have a higher brightness, thereby better meeting the display requirements.

It should be noted that, referring to FIG. 1, the display panel involved in the embodiments of the present disclosure may be used in conventional display devices such as mobile phones and computers. Such display devices may not have too high requirements for the brightness of the display screen. Therefore, such display panels may not have too high requirements for the upper limit of the driving current that may be output by the pixel circuit 1. In such a display panel, the number of first sub-transistors 4 in the first transistor 3 may be slightly less, for example, the first transistor 3 may include only a few first sub-transistors 4.

Figure 5:
FIG. 5 illustrates a top view of an exemplary display panel according to various disclosed embodiments of the present disclosure.
Figure 6:
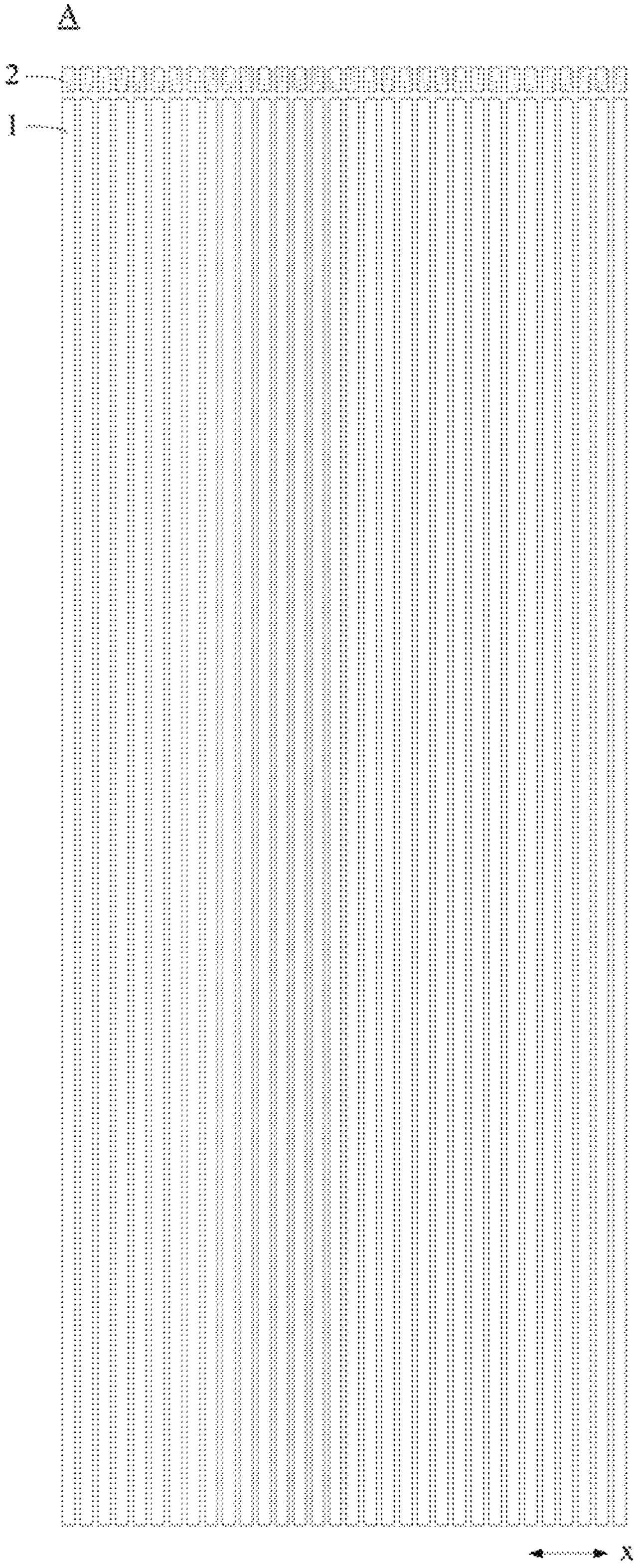
FIG. 6 illustrates an exemplary structure corresponding the area A in FIG. 5.

FIG. 5 is a top view of an exemplary display panel provided in an embodiment of the present disclosure, and FIG. 6 is a structural schematic diagram corresponding to the area A in FIG. 5. In another embodiment, as shown in FIGS. 5-6, the display panel involved in the embodiment of the present disclosure may also be used in some special display devices such as printer light bars. The shape of this type of display panel may usually be a horizontal long stripe, which may have a very high lateral resolution. This type of display devices may have a high demand for the brightness of the display screen, and the operating current of a single LED may need to reach hundreds of microamperes. Therefore, this type of display panels may have a high demand for the upper limit of the driving current that the pixel circuit 1 may output, and the pixel circuit 1 may need to be able to output a large driving current. In this display panel, the number of first sub-transistors 4 included in the first transistor 3 may be more, for example, the first transistor 3 may include dozens of first sub-transistors 4.

The display panel provided in the embodiment of the present disclosure may be more suitable for such display devices with high brightness requirements. This type of display devices may have a high demand for the brightness of the display screen, and accordingly require a high upper limit of the driving current that the pixel circuit 1 may output. After applying the technical solution provided in the embodiments of the present disclosure, the upper limit of the driving current that the pixel circuit 1 may output may be greatly increased by increasing the number of first sub-transistors 4 in the first transistor 3. Moreover, because the channel width of a single first sub-transistor 4 may be relatively small, the pixel circuit 1 may also ensure better performance.

In some embodiments, referring to FIG. 2, the pixel circuit 1 may include a driving transistor M0, a first light-emitting control transistor M1, and a second light-emitting control transistor M2. The first light-emitting control transistor M1 may be coupled between the first node O1 and the driving transistor M0, and the second light-emitting control transistor M2 may be coupled between the driving transistor M0 and the second node O2.

At least one of the first light-emitting control transistor M1, the driving transistor M0, and the second light-emitting control transistor M2 may be a first transistor 3 to improve the current output capacity of the first light-emitting control transistor M1, the driving transistor M0, and/or the second light-emitting control transistor M2 such that a larger driving current may flow through the current transmission path.

It should be noted that FIG. 2 is merely a schematic diagram of the first light-emitting control transistor M1, the driving transistor M0, and the second light-emitting control transistor M2 being all first transistors 3, and the pixel circuit 1 may include three first transistors 3. In other embodiments of the present disclosure, any one or any two of the first light-emitting control transistor M1, the driving transistor M0, and the second light-emitting control transistor M2 may be first transistors 3, and in this case, the pixel circuit 1 may include only one or two first transistors 3.

Figure 7:
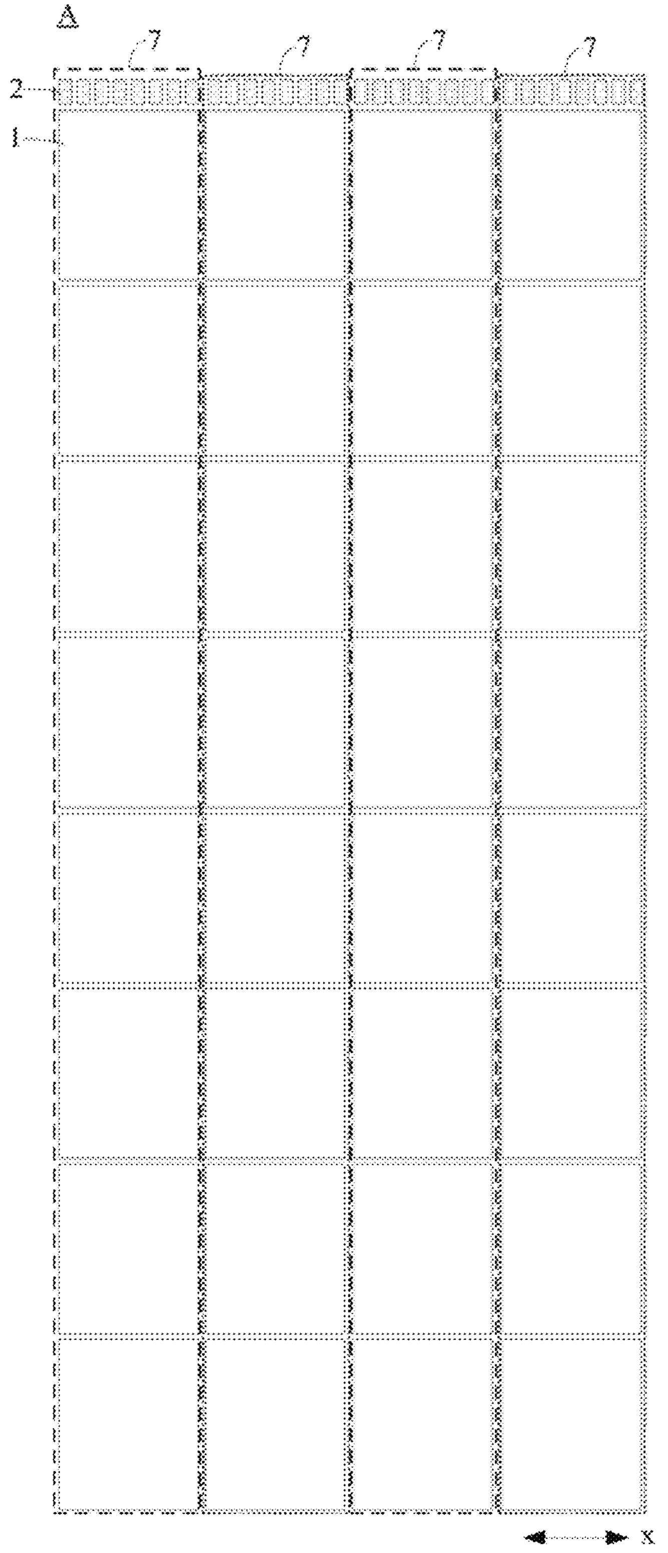
FIG. 7 illustrates another exemplary structure corresponding to the area A in FIG. 5.
Figure 8:
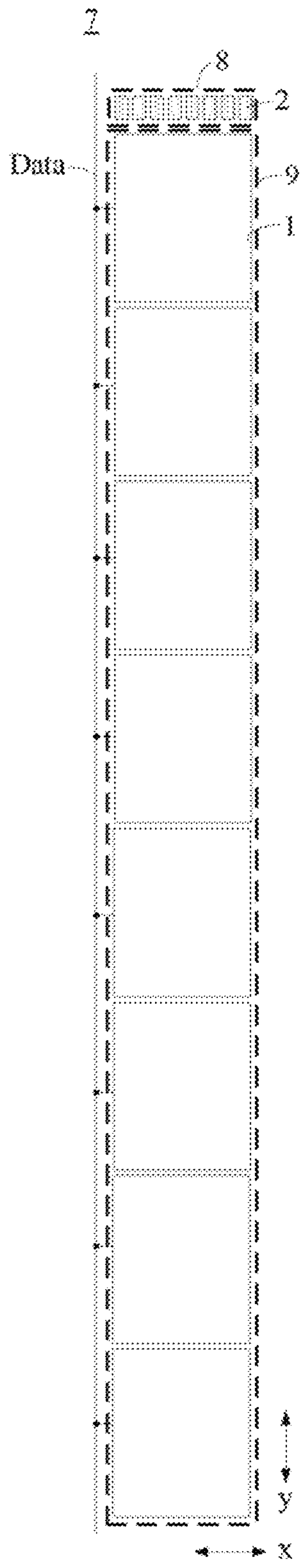
FIG. 8 illustrates an exemplary first display unit according to various disclosed embodiments of the present disclosure.

FIG. 7 is another structural schematic diagram corresponding to the area A in FIG. 5, and FIG. 8 is a structural schematic diagram of the first display unit 7 provided in an embodiment of the present disclosure. In one embodiment, as shown in FIG. 7 and FIG. 8, the display panel may include the first display unit 7, and the first display unit 7 may include a first light-emitting unit group 8 and a first pixel circuit group 9.

The first light-emitting unit group 8 may include M light-emitting units 2 arranged along the first direction x, and the first pixel circuit group 9 may include N pixel circuits 1 arranged along the second direction y. The pixel circuits 1 in the first pixel circuit group 9 may be electrically connected to at least one light-emitting unit 2 in the first light-emitting unit group 8. M≥2, N≥2, and M and N may be both integers. The accompanying drawings of the embodiments of the present disclosure are illustrated by taking M=8 and N=8 as examples. The first direction x and the second direction y may intersect each other. In one embodiment, the first direction may be perpendicular to the second direction y. The first direction x is referred to as the horizontal direction below, and the second direction y may be referred to as the vertical direction.

In conjunction with FIG. 2, it may be seen that the pixel circuit 1 may need to be electrically connected to the data line Data. Usually, multiple pixel circuits 1 arranged vertically may be electrically connected to one data line Data. For the N pixel circuits 1 connected to the M light-emitting units 2 arranged horizontally, when the N pixel circuits 1 adopt the arrangement shown in FIG. 6, the N pixel circuits 1 may be arranged horizontally, and the N pixel circuits 1 may need to be electrically connected to the N data lines Data respectively, while when the arrangement shown in FIG. 8 is adopted, the N pixel circuits 1 may be arranged vertically, and the N pixel circuits 1 may only need to be electrically connected to one data line Data. For the entire display panel, the N×m data lines originally required to be set may be reduced to m data lines, which may greatly save the number of data lines Data.

This setting method may be particularly suitable for horizontally long stripe display panels such as the aforementioned printer light bar. This type of display panels may have a high lateral resolution and a small pixel pitch. After applying the above solution, the number of data lines Data may be greatly reduced. Correspondingly, the number of pins in the lower frame used to provide signals to the data channel may also be greatly reduced, which may help to further optimize the narrow frame design of the display panel.

It should be noted that this method only adjusts the arrangement of the pixel circuit 1, and does not need to change the lateral distribution density of the light-emitting unit 2, thus it may not affect the lateral resolution of the display panel.

In addition, it should be noted that when the first transistor 3 includes X first sub-transistors 4 arranged in parallel, the vertical space required to be occupied by the pixel circuit 1 may be large. When the N pixel circuits 1 in the first display unit 7 adopt the above-mentioned vertical arrangement method, the embodiment of the present disclosure may further adjust the arrangement method of the X first sub-transistors 4 in the first transistor 3 to reduce the vertical length of a single pixel circuit 1, thereby reducing the total length occupied by the N pixel circuits 1 in the second direction y. This part will be described in detail later.

Further, referring to FIG. 8, in one embodiment, M=N. At this time, a pixel circuit 1 may be electrically connected to a light-emitting unit 2, and the pixel circuit 1 may only need to provide a light-emitting unit 2 to provide the required driving current, and the brightness displayed by each light-emitting unit 2 may be more accurate.

In one embodiment, referring to FIG. 8, in the first display unit 7, N pixel circuits 1 in the first pixel circuit group 9 may be located in at least one side of the first light-emitting unit group 8 in the second direction y. At this time, the pixel circuit 1 may overlap with the first light-emitting unit group 8 vertically, and the pixel circuit 1 may not occupy the space between two adjacent first light-emitting unit groups 8 in the horizontal direction. The lateral distribution of the light-emitting units 2 may be more uniform, and the display effect may be better.

Figure 9:
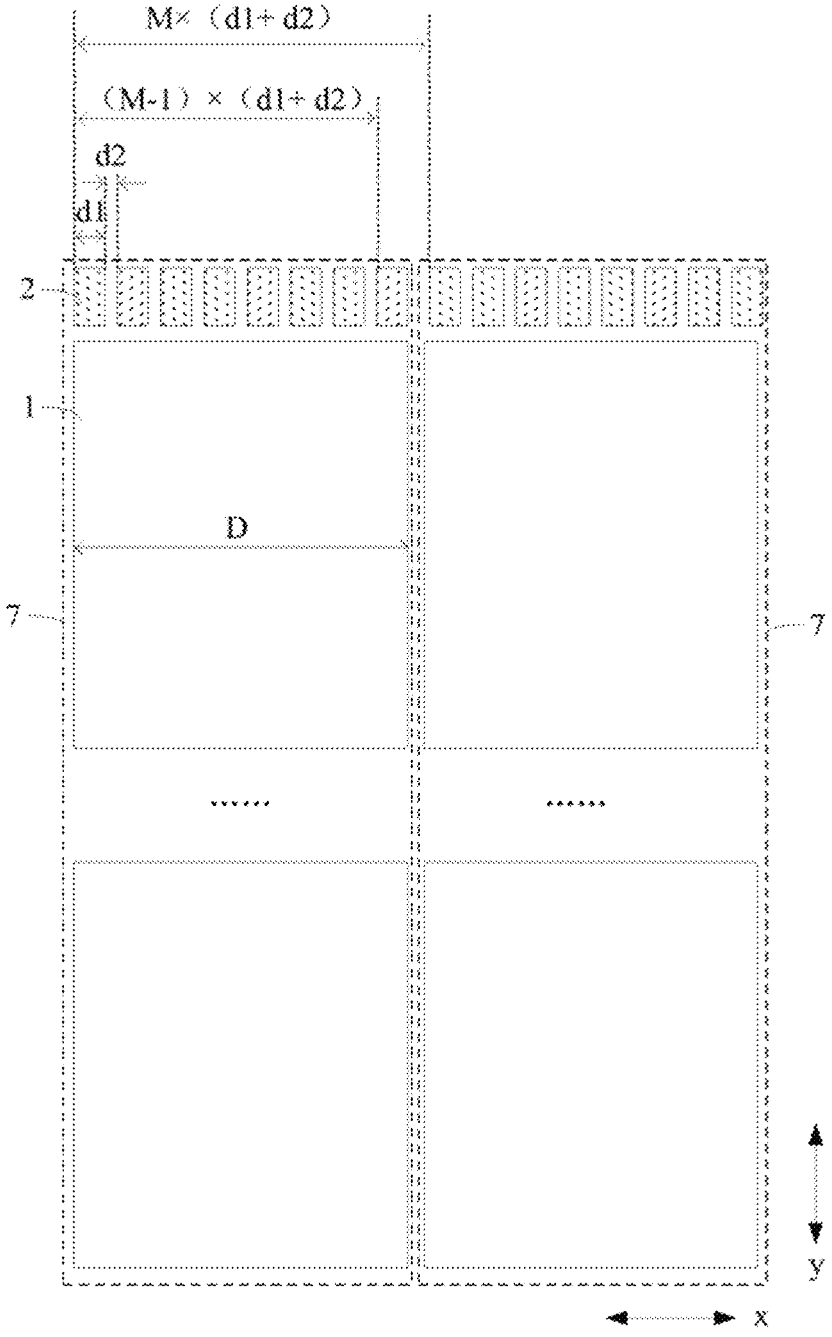
FIG. 9 illustrates a size of an exemplary pixel circuit according to various disclosed embodiments of the present disclosure.

FIG. 9 is a size schematic diagram of a pixel circuit 1 provided in an embodiment of the present disclosure. As shown in FIG. 9, the length of the pixel circuit 1 in the first direction x may be D, $(M-1)\times(d1+d2)\leq D\leq M\times(d1+d2)$. d1 may be the length of the light-emitting unit 2 in the first direction x, and d2 may be the spacing between adjacent light-emitting units 2 in the first direction x.

By setting the length D of the pixel circuit 1 in the first direction x to be greater than or equal to $(M-1)\times(d1+d2)$, the pixel circuit 1 may be widened horizontally and narrowed vertically as much as possible. In this way, when N pixel circuits 1 are arranged vertically, it may be possible to avoid the N pixel circuits 1 occupying too much vertical space and affecting the vertical length of the display panel, and to reduce the connection distance between the light-emitting unit 2 and the pixel circuit 1. Further setting the length D of the pixel circuit 1 in the first direction x to be less than or equal to Mx (d1+d2) may also avoid the horizontal width of the pixel circuit 1 being too wide, resulting in the two first pixel circuit groups 9 adjacent to each other in the horizontal direction being unable to be arranged.

It should be noted that when limiting the length D of the above-mentioned pixel circuit 1 in the first direction x, in the first direction x, the boundaries of the two opposite sides of the pixel circuit 1 may be defined by the boundaries of the active layer al of the outermost transistor structure on both sides of the pixel circuit 1.

Figure 28:
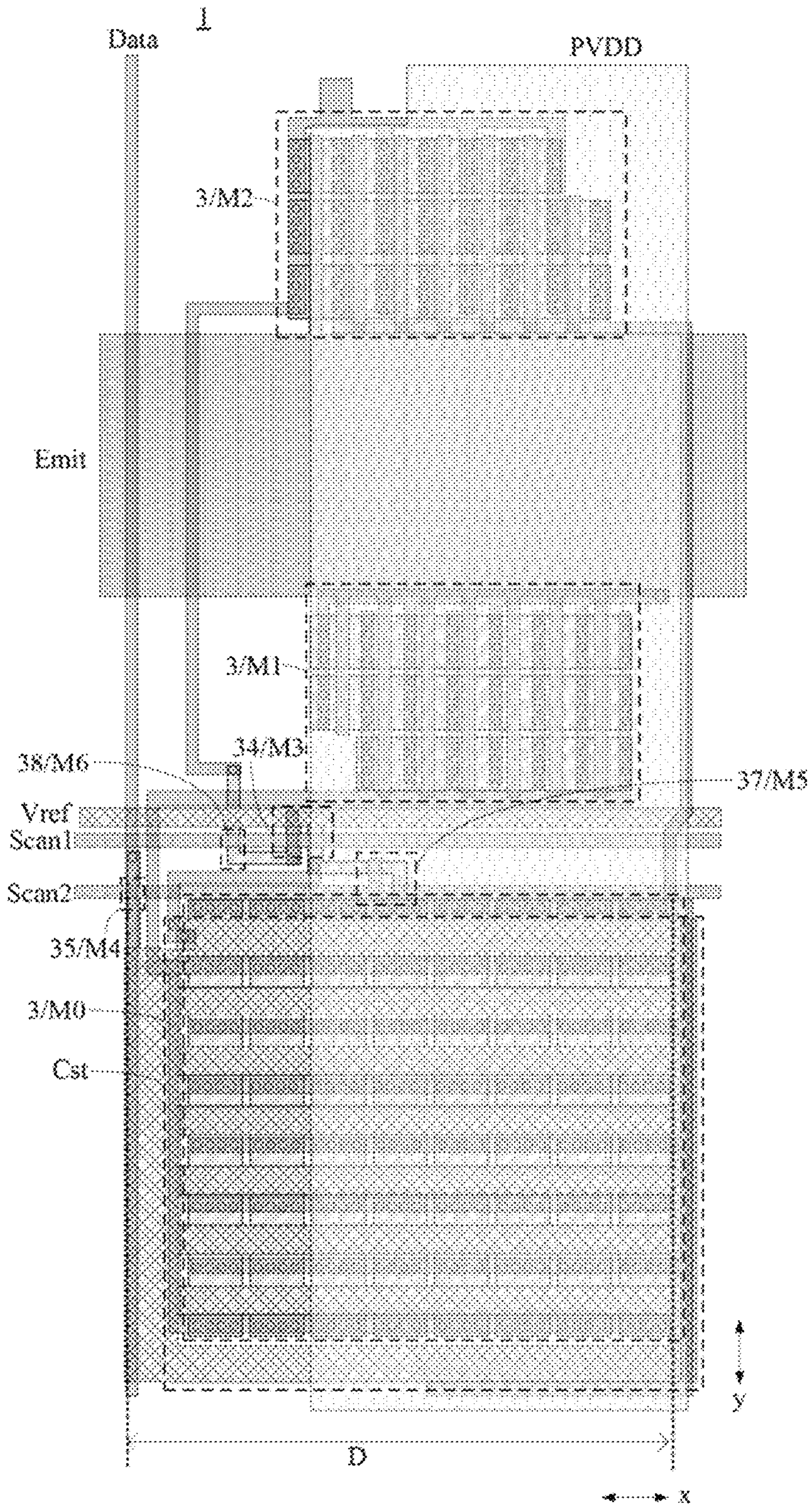
FIG. 28 illustrates an exemplary pixel circuit according to various disclosed embodiments of the present disclosure.

For example, referring to FIG. 28, the pixel circuit 1 may include two opposite sides in the first direction x, one side of which may be the first sub-transistor 4 in the driving transistor M0 as the outermost transistor structure, and the other side of which may be the data writing transistor M4 as the outermost transistor structure. Therefore, the boundaries of the pixel circuit 1 on the two opposite sides in the first direction x may be respectively determined by the outermost transistor in the driving transistor M0.

The edge of the active layer of the first sub-transistor 4 on the outside and the edge of the active layer of the data writing transistor M4 may be defined. The length D of the pixel circuit 1 in the first direction x is illustrated in FIG. 28.

Figure 10:
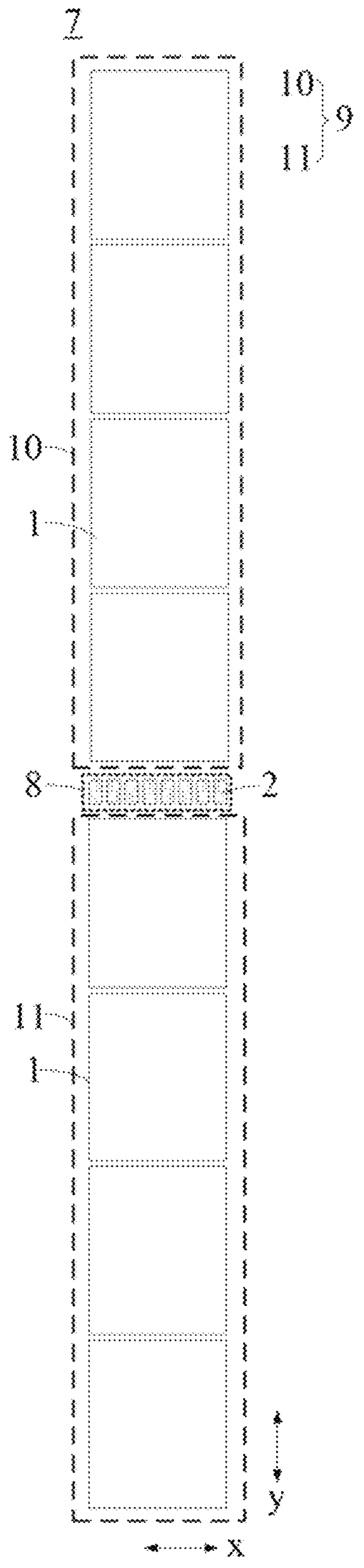
FIG. 10 illustrates another exemplary first display unit according to various disclosed embodiments of the present disclosure.

FIG. 10 is another structural schematic diagram of the first display unit 7 provided in an embodiment of the present disclosure. As shown in FIG. 10, in one embodiment, the first pixel circuit group 9 may include a first sub-circuit group 10 and a second sub-circuit group 11, the first sub-circuit group 10 may include N1 pixel circuits 1, the second sub-circuit group 11 may include N2 pixel circuits 1, N1+N2=N, N1≥1, N2≥1, and N1 and N2 may be both integers. The first light-emitting unit group 8 may be located between the first sub-circuit group 10 and the second sub-circuit group 11.

Compared with the N pixel circuits 1 being located only on one side of the first light-emitting unit group 8, the above-mentioned setting method may be to disperse the N pixel circuits 1 on the opposite sides of the first light-emitting unit group 8 such that the connection distance between the outermost pixel circuit 1 (the pixel circuit 1 farthest from the first light-emitting unit group 8) and the light-emitting unit 2 may be shortened, and the signal attenuation may be reduced.

Figure 11:
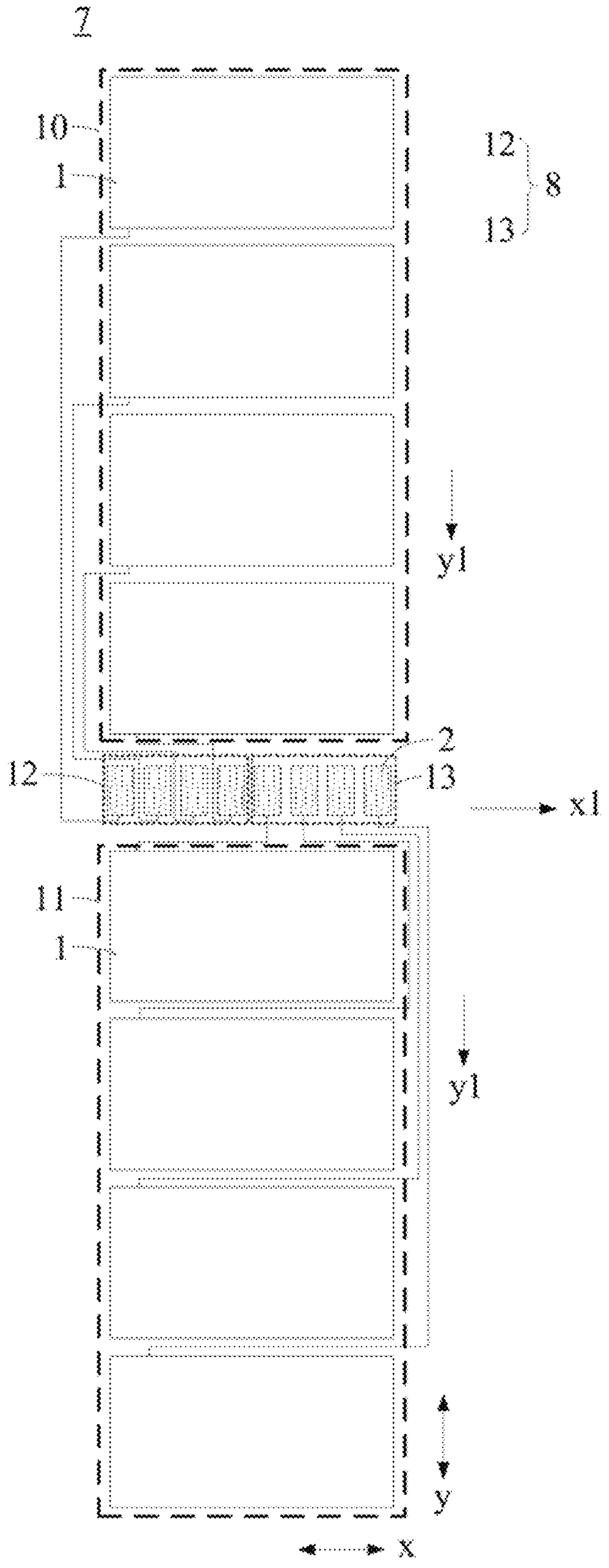
FIG. 11 illustrates an exemplary connection between the pixel circuit in the first display unit and the light-emitting unit according to various disclosed embodiments of the present disclosure.

FIG. 11 is a connection diagram of the pixel circuit 1 and the light-emitting unit 2 in the first display unit 7 provided in an embodiment of the present disclosure. As shown in FIG. 11, in one embodiment, M=N, N1≥2, and N2≥2. The first light-emitting unit group 8 may include a first sub-unit group 12 and a second sub-unit group 13 arranged along the first direction x, the first sub-unit group 12 may include N1 light-emitting units 2, and the second sub-unit group 13 may include N2 light-emitting units 2.

The N1 pixel circuits 1 arranged in the first sub-circuit group 10 along the direction from the first sub-circuit group 10 to the second sub-circuit group 11 (indicated by arrow y1 in FIG. 11) may be electrically connected to the N1 light-emitting units 2 arranged in the first sub-unit group 12 along the direction from the first sub-unit group 12 to the second sub-unit group 13 (indicated by arrow x1 in FIG. 11). The N2 pixel circuits 1 arranged in the second sub-circuit group 11 along the direction from the first sub-circuit group 10 to the second sub-circuit group 11 may be electrically connected to the N2 light-emitting units 2 arranged in the second sub-unit group 13 along the direction from the first sub-circuit group 12 to the second sub-unit group 13.

Based on the above connection method, the wiring of the connection line 14 between the pixel circuit 1 and the light-emitting unit 2 may have a certain regularity and be more convenient. Moreover, the pixel circuit 1 adjacent to the first light-emitting unit group 8 may be connected to the light-emitting unit 2 adjacent to the inside of the first light-emitting unit group 8, and the pixel circuit 1 farther away from the first light-emitting unit group 8 may be electrically connected to the light-emitting unit 2 adjacent to the outside of the first light-emitting unit group 8, which may also reduce the difference in connection distance between different pixel circuits 1 and the light-emitting unit 2, thereby reducing the difference in signal attenuation.

In one embodiment, referring to FIG. 11, N1=N2, for example, the number of pixel circuits 1 on the two opposite sides of the first light-emitting unit group 8 may be same, and the outermost pixel circuits 1 on both sides may not be too far from the first light-emitting unit group 8, which may reduce the connection distance between the outermost pixel circuit 1 and the light-emitting unit 2.

In another embodiment, referring to FIG. 2, the pixel circuit 1 may include a first light-emitting control transistor M1, a driving transistor M0, and a second light-emitting control transistor M2. The first light-emitting control transistor M1 may be coupled between the first node O1 and the driving transistor M0, and the second light-emitting control transistor M2 may be coupled between the driving transistor M0 and the second node O2. At least one of the first light-emitting control transistor M1, the driving transistor M0 and the second light-emitting control transistor M2 may be the first transistor 3.

Figure 12:
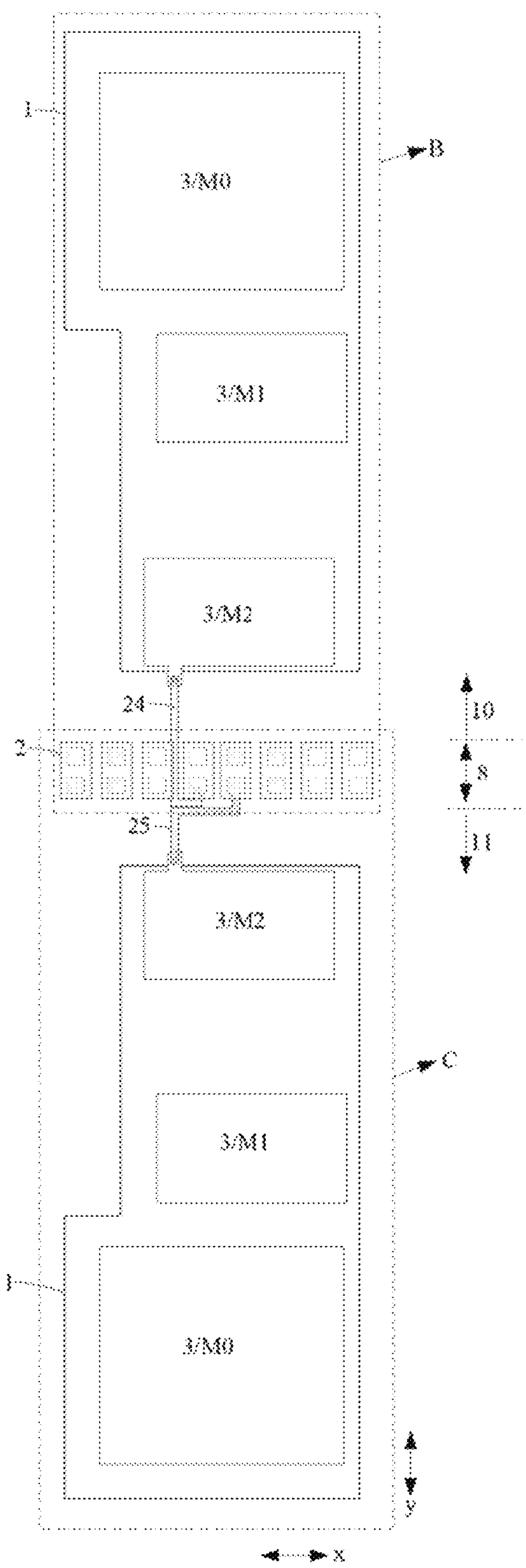
FIG. 12 illustrates another exemplary first display unit according to various disclosed embodiments of the present disclosure.
Figure 13:
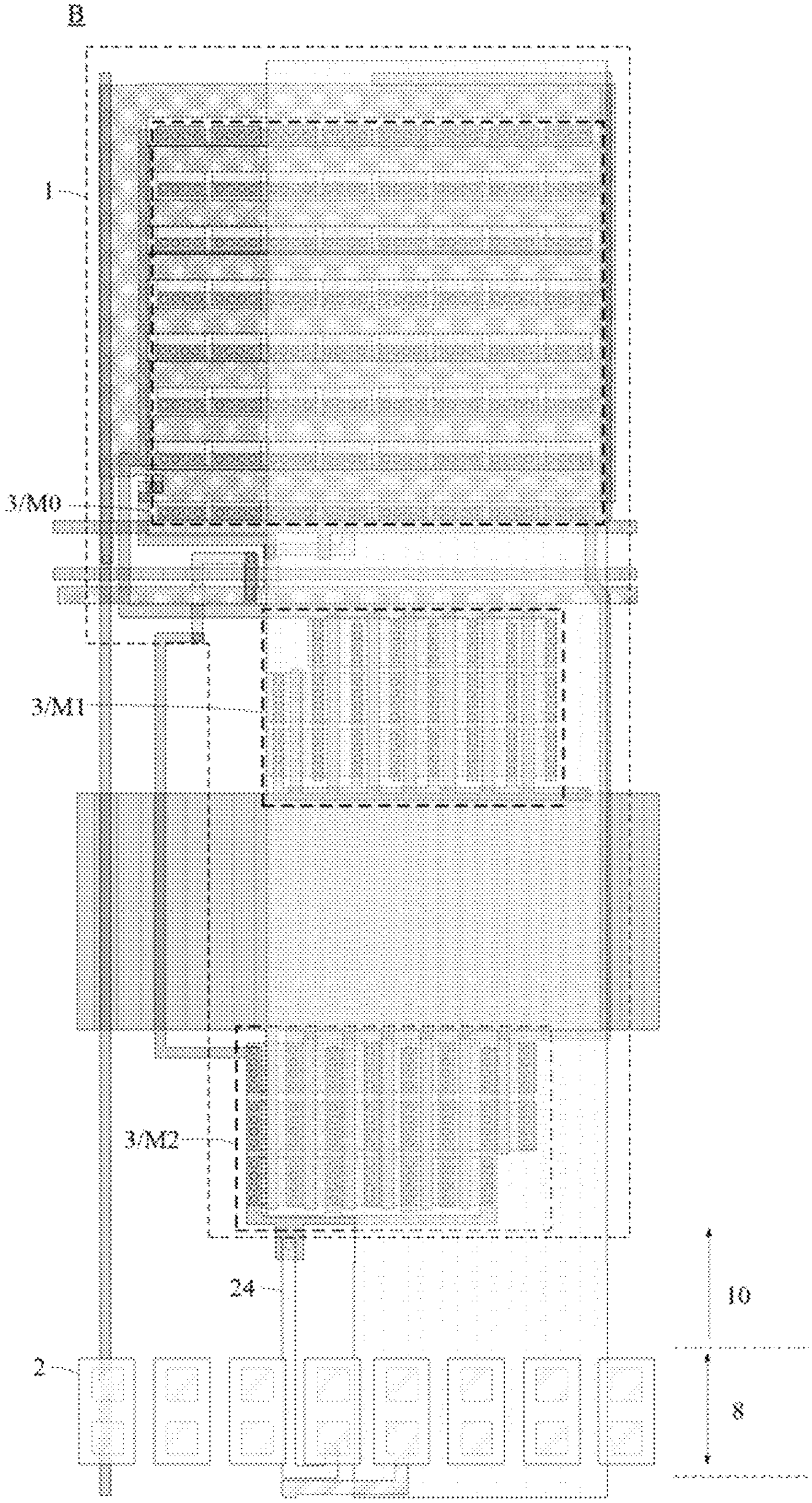
FIG. 13 illustrates an exemplary structure corresponding to the area B in FIG. 12.
Figure 14:
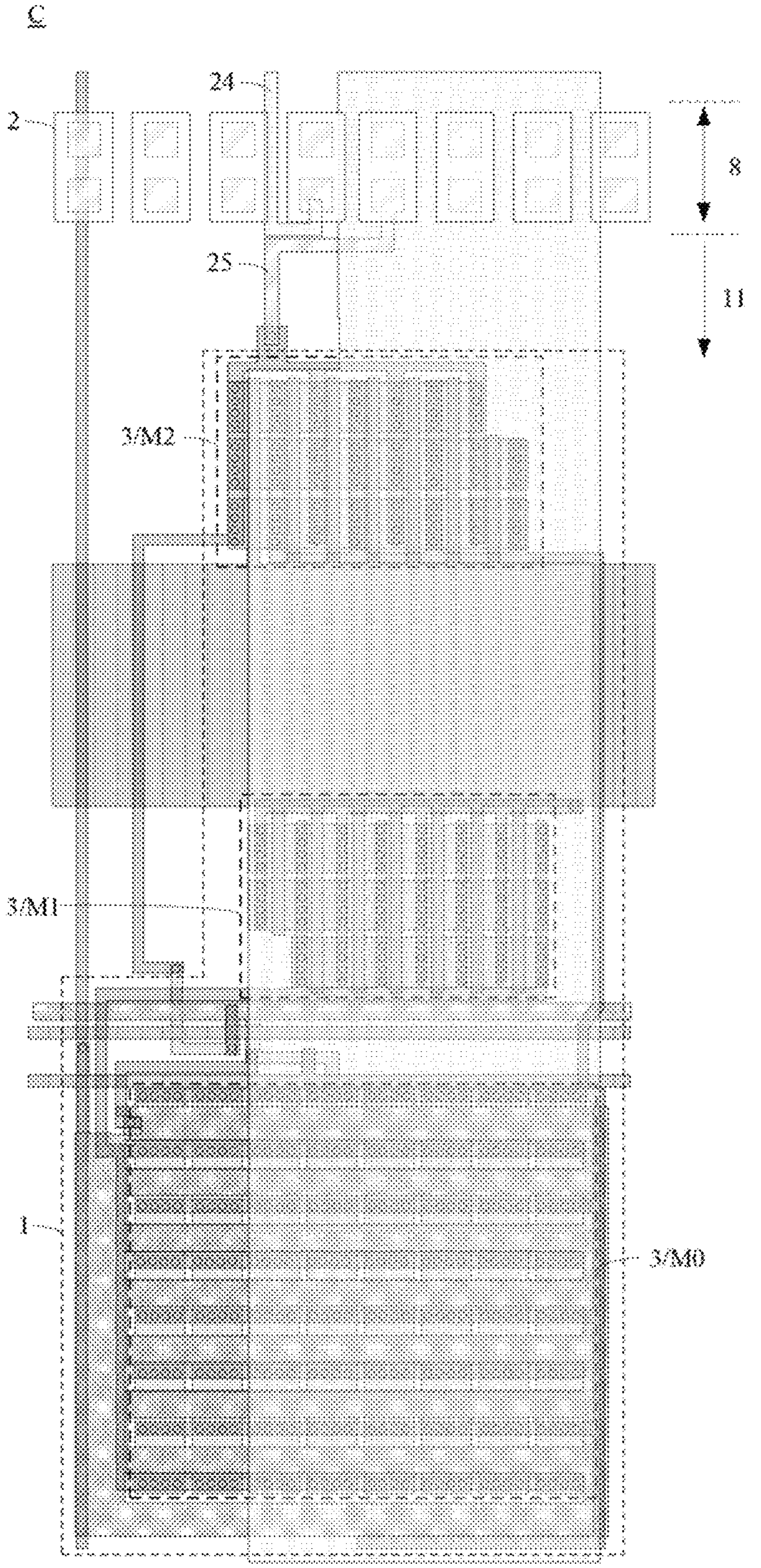
FIG. 14 illustrates an exemplary structure corresponding to the area C in FIG. 12.

FIG. 12 is another structural schematic diagram of an exemplary first display unit provided in an embodiment of the present disclosure, FIG. 13 is a structural schematic diagram corresponding to the area B in FIG. 12, and FIG. 14 is a structural schematic diagram corresponding to the area C in FIG. 12. As shown in FIGS. 12-14, in the pixel circuit 1 of the first sub-circuit group 10 and/or the second sub-circuit group 11, the distance between the second light-emitting control transistor M2 and the first light-emitting unit group 8 may be less than the distance between the first light-emitting control transistor M1 and the first light-emitting unit group 8.

Because the second light-emitting control transistor M2 may need to be electrically connected to the light-emitting unit 2, in the pixel circuit 1 of the first sub-circuit group 10 and/or the second sub-circuit group 11, by making the second light-emitting control transistor M2 closer to the first light-emitting unit group 8, the connection distance between the second light-emitting control transistor M2 and the light-emitting unit 2 may be reduced. Further, the second light-emitting control transistor M2 may be the transistor adjacent to the first light-emitting unit group 8 in the pixel circuit 1.

Further, referring to FIG. 12, the pixel circuit 1 of the first sub-circuit group 10 and the pixel circuit 1 of the second sub-circuit group 11 may be in a mirror relationship along the first direction x. That is, the pixel circuit 1 of the first subcircuit group 10 and the pixel circuit 1 of the second subcircuit group 11 may be symmetrical along the first direction x. At this time, after the pattern of the pixel circuit 1 on one side of the first light-emitting unit group 8 is flipped 180° with the first direction x as the axis, the pattern of the pixel circuit 1 on the other side may be obtained, and no additional adjustment may be required for the arrangement of the transistors inside the pixel circuit 1 on the other side.

Figure 15:
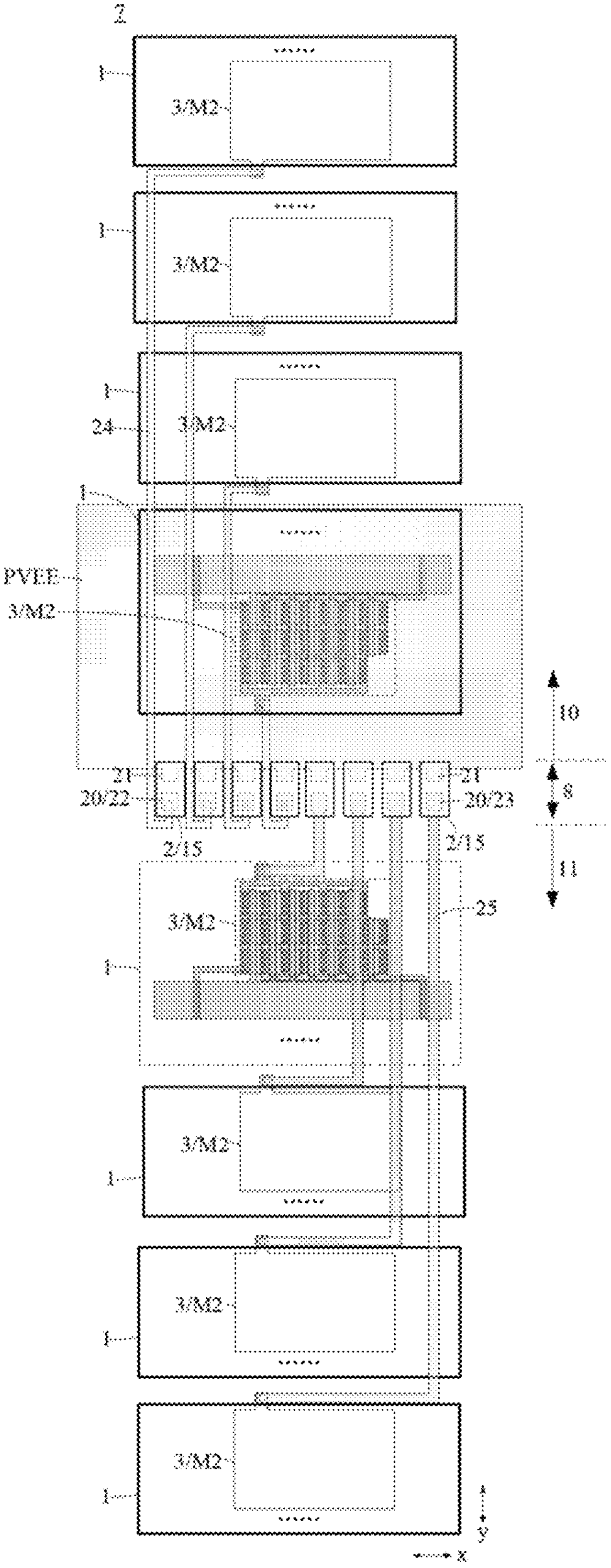
FIG. 15 illustrates another exemplary first display unit according to various disclosed embodiments of the present disclosure.
Figure 16:
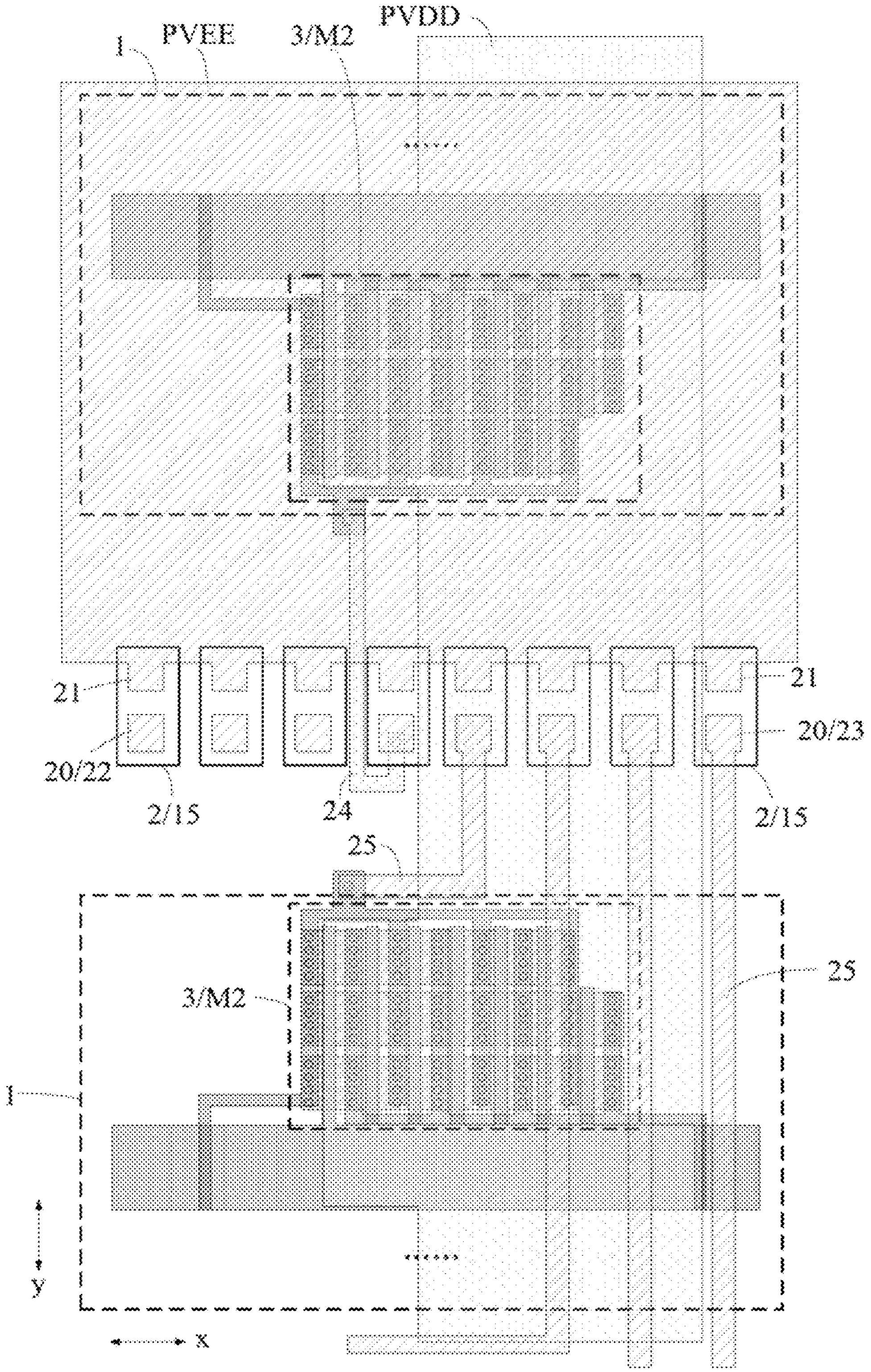
FIG. 16 illustrates another layer structure of an exemplary display panel according to various disclosed embodiments of the present disclosure.
Figure 17:
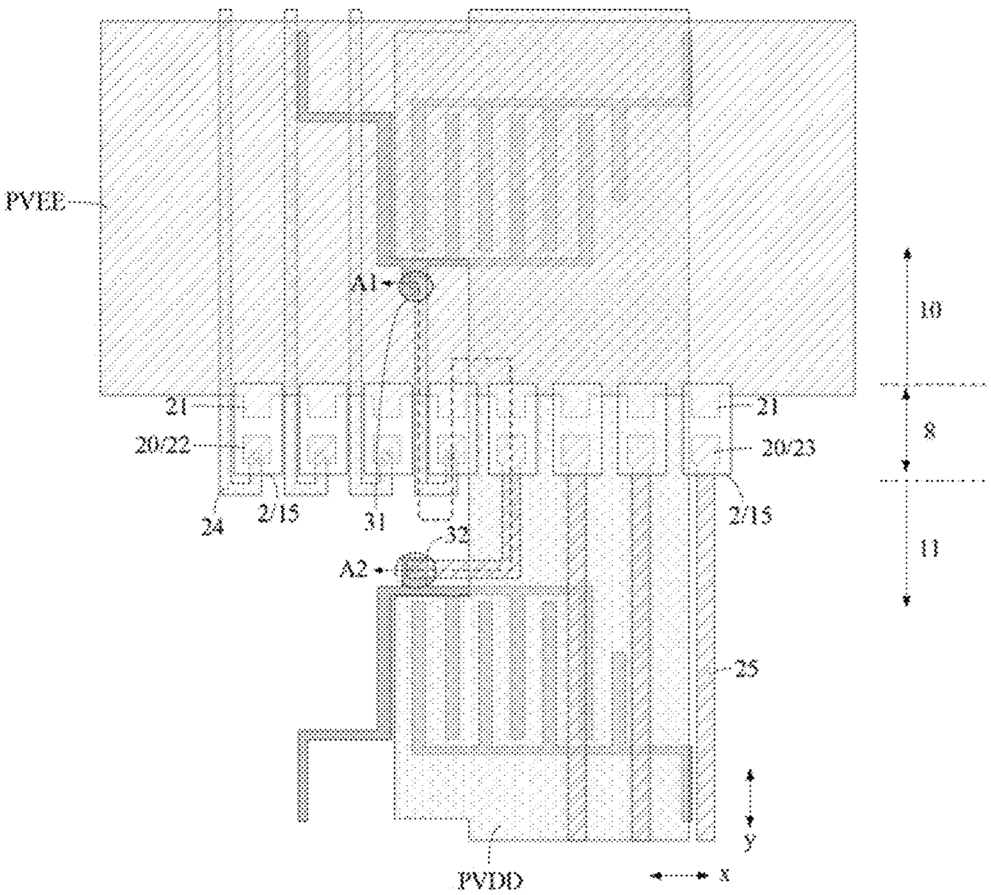
FIG. 17 illustrates another layer structure of an exemplary display panel according to various disclosed embodiments of the present disclosure.
Figure 18:
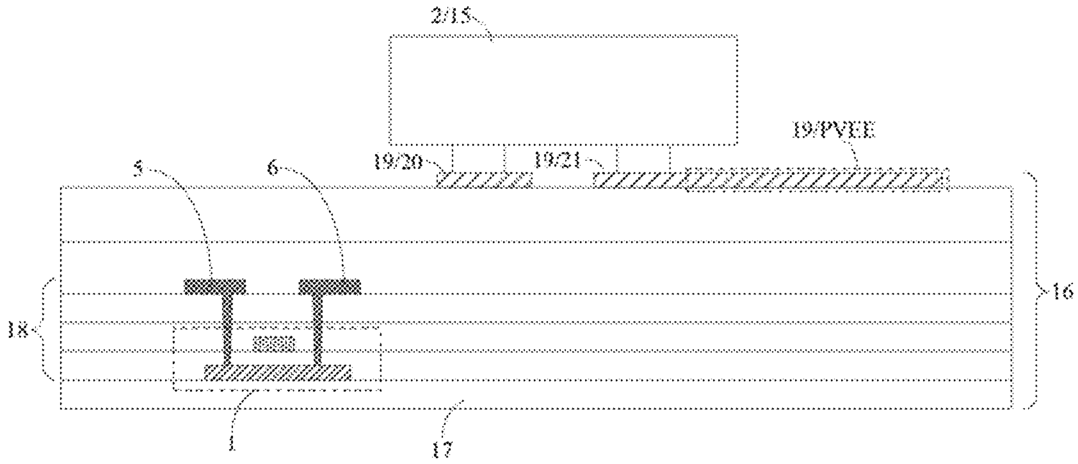
FIG. 18 illustrates a cross-sectional view of another exemplary display panel according to various disclosed embodiments of the present disclosure.
Figure 19:
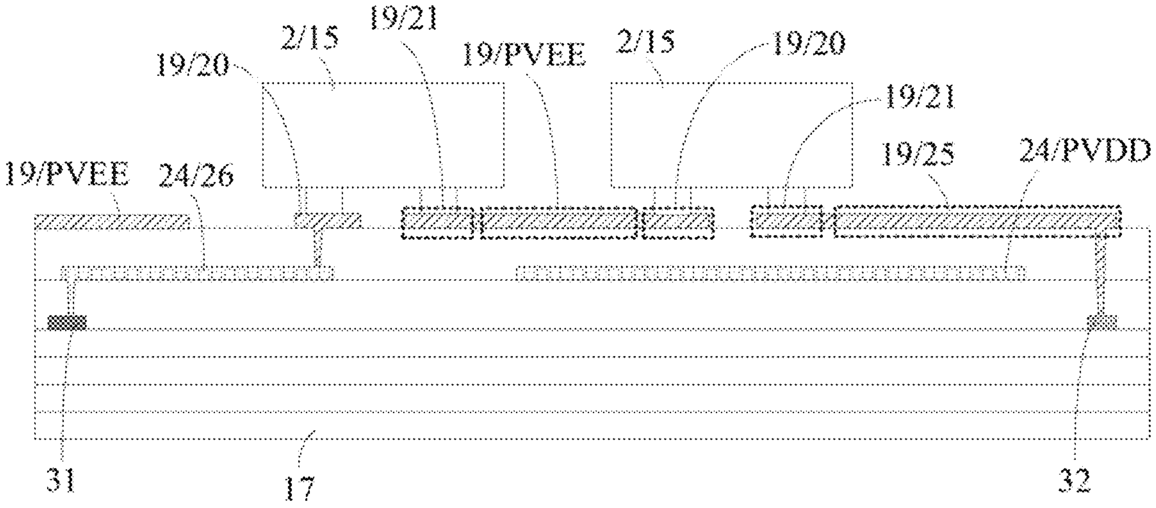
FIG. 19 illustrates an A1-A2-sectional view in FIG. 17.

FIG. 15 is another structural schematic diagram of an exemplary first display unit 7 provided in an embodiment of the present disclosure, FIG. 16 is another film layer structure schematic diagram of an exemplary display panel provided in an embodiment of the present disclosure, FIG. 17 is another film layer structure schematic diagram of an exemplary display panel provided in an embodiment of the present disclosure, FIG. 18 is a cross-sectional structural schematic diagram of an exemplary display panel provided in an embodiment of the present disclosure, and FIG. 19 is a cross-sectional view of FIG. 17 along the A1-A2 direction. As shown in FIGS. 15-19, in one embodiment, the light-emitting unit 2 may include a light-emitting element 15. The light-emitting element 15 may be an LED, which may be a micro LED, or a mini LED, etc. In another embodiment of the present disclosure, the light-emitting unit 2 may include a light-emitting element 15, or the light-emitting unit 2 may also include two or more light-emitting elements 15, in which case at least one light-emitting element 15 in the light-emitting unit 2 may be used as a regular light-emitting element, and the remaining light-emitting elements 15 may be used as spare light-emitting elements.

The display panel may also include a driving backplane 16. The driving backplane may include a substrate 17, a circuit layer 18 located on one side of the substrate 17, and a first metal layer 19 located on the side of the circuit layer 18 away from the substrate 17.

The circuit layer 18 may include a pixel circuit 1. The first metal layer 19 may include a first output electrode 20 electrically connected to the first terminal of the light-emitting element 15, a second output electrode 21 electrically connected to the second terminal of the light-emitting element 15, and a second power line PVEE electrically connected to the second output electrode 21. In the direction perpendicular to the plane where the substrate 17 is located, the first output electrode 20 may overlap with the first terminal of the light-emitting element 15, and the first output electrode 20 may be soldered to the first terminal of the light-emitting element 15, and the first output electrode 20 may be regarded as an anode pad. In the direction perpendicular to the plane where the substrate 17 is located, the second output electrode 21 may overlap with the second terminal of the light-emitting element 15, the second output electrode 21 may be soldered to the second terminal of the light-emitting element 15, and the second output electrode 21 may be regarded as a cathode pad.

Moreover, for the first output electrode 20 and the second output electrode 21 connected to the same light-emitting element 15, the first output electrode 20 may be located on the side of the second output electrode 21 adjacent to the second sub-circuit group 11, and the second power line PVEE may overlap with the first sub-circuit group 10 in the direction perpendicular to the plane where the substrate 17 is located.

The first output electrode 20 may include a first sub-electrode 22 and a second sub-electrode 23. The first sub-electrode 22 may be electrically connected to the pixel circuit 1 in the first sub-circuit group 10 through a first connection line 24, and the second sub-electrode 23 may be electrically connected to the pixel circuit 1 in the second sub-circuit group 11 through a second connection line 25. The second connection line 25 may be located in the first metal layer 19, and the first connection line 24 may be located on the side of the first metal layer 19 adjacent to the substrate 17.

In the above-mentioned setting, the first connection line 24 and the second power line PVEE may be both located on the side of the first output electrode 20 away from the second sub-circuit group 11. Because the first connection line 24 may inevitably overlap with the second power line PVEE, the first connection line 24 may be set with the second power line PVEE to avoid a short circuit between the two. Because the second connection line 25 and the second power line PVEE may be located on different sides of the first output electrode 20, the positions of the first connection line 24 and the second power line PVEE may be staggered, the second connection line 25 may be set to a same layer as the second power line PVEE such that the second connection line 25 may no longer occupy an other film layer.

Figure 20:
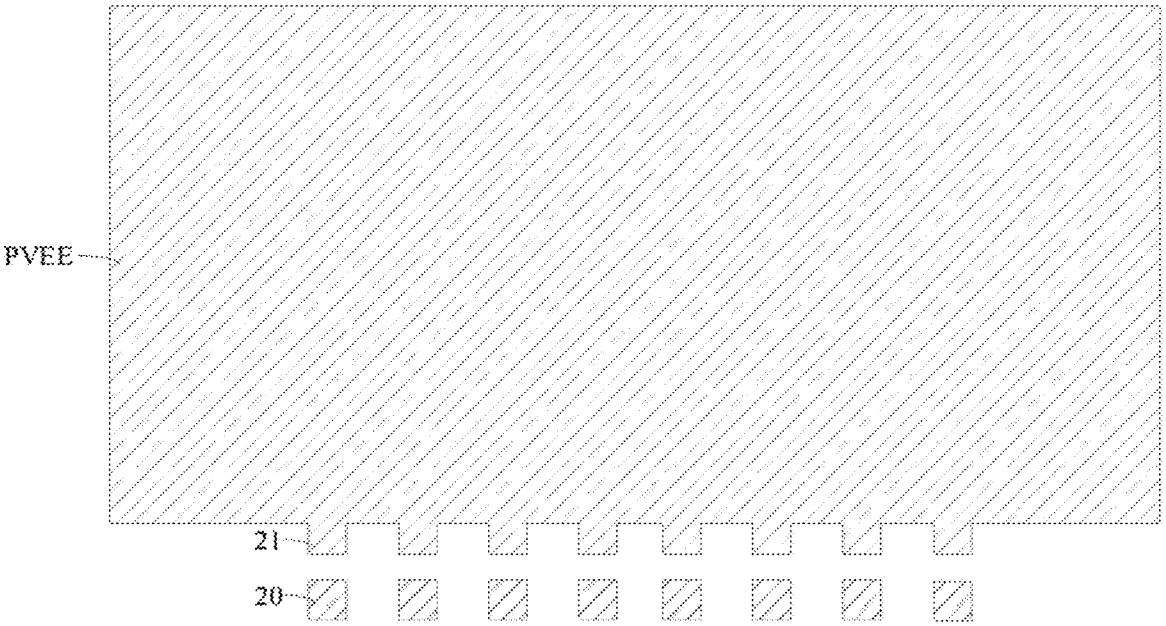
FIG. 20 illustrates an exemplary structure of a second power line and a second output electrode according to various disclosed embodiments of the present disclosure.

FIG. 20 is a structural schematic diagram of the second power line PVEE and the second output electrode 21 provided in an embodiment of the present disclosure. As shown in FIG. 20, regarding the second power line PVEE and the second output electrode 21, in one embodiment, the second power line PVEE may be located on the side of the second output electrode 21 away from the first output electrode 20, and the second output electrode 21 may be connected to the second power line PVEE.

Figure 21:
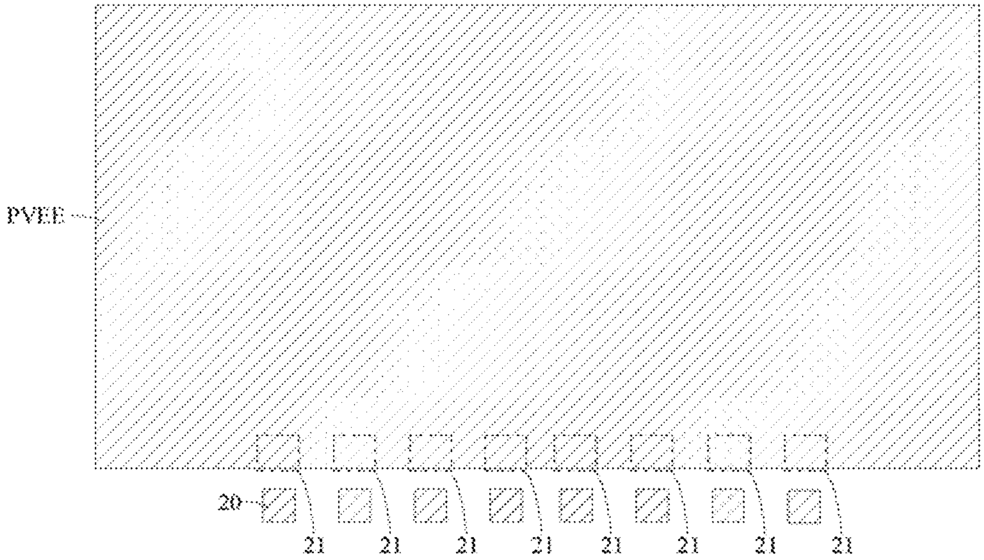
FIG. 21 illustrates another exemplary structure of a second power line and a second output electrode according to various disclosed embodiments of the present disclosure.

FIG. 21 is another structural schematic diagram of the second power line PVEE and the second output electrode 21 provided in an embodiment of the present disclosure. As shown in FIG. 21, in another embodiment, a portion of the second power line PVEE may be multiplexed as the second output electrode 21.

Figure 22:
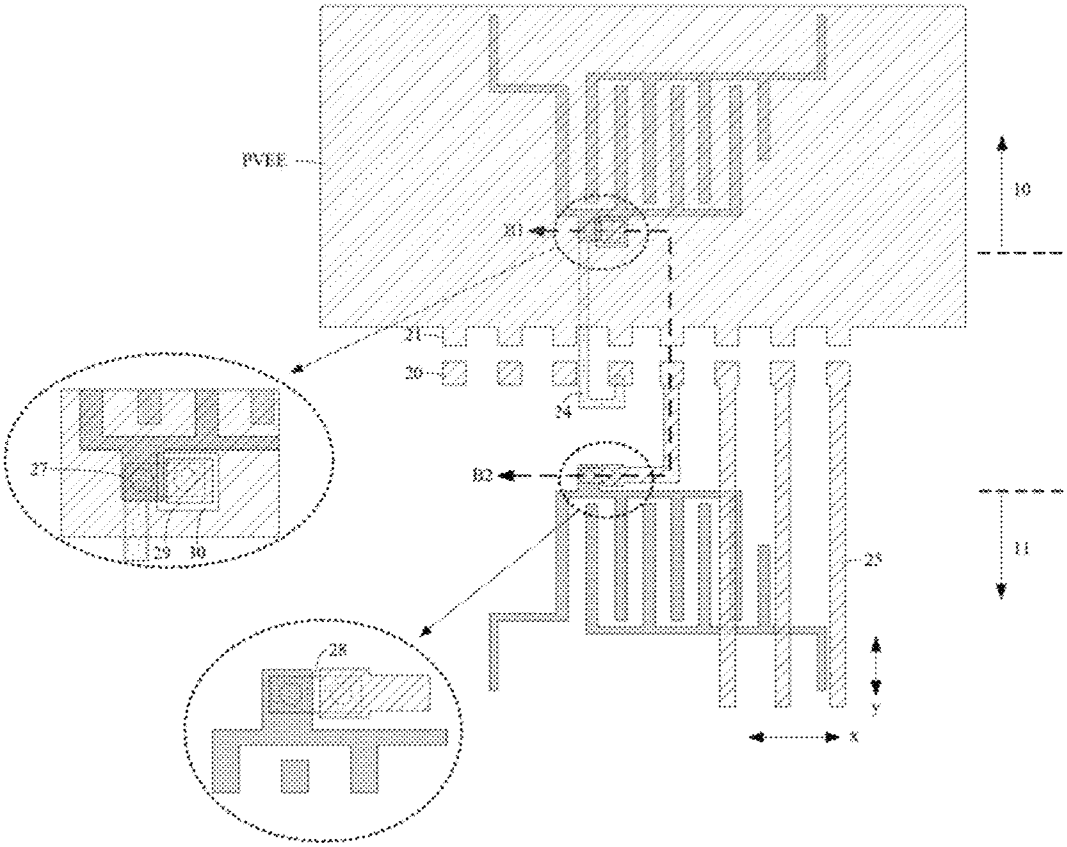
FIG. 22 illustrates another layer structure of an exemplary display panel according to various disclosed embodiments of the present disclosure.
Figure 23:
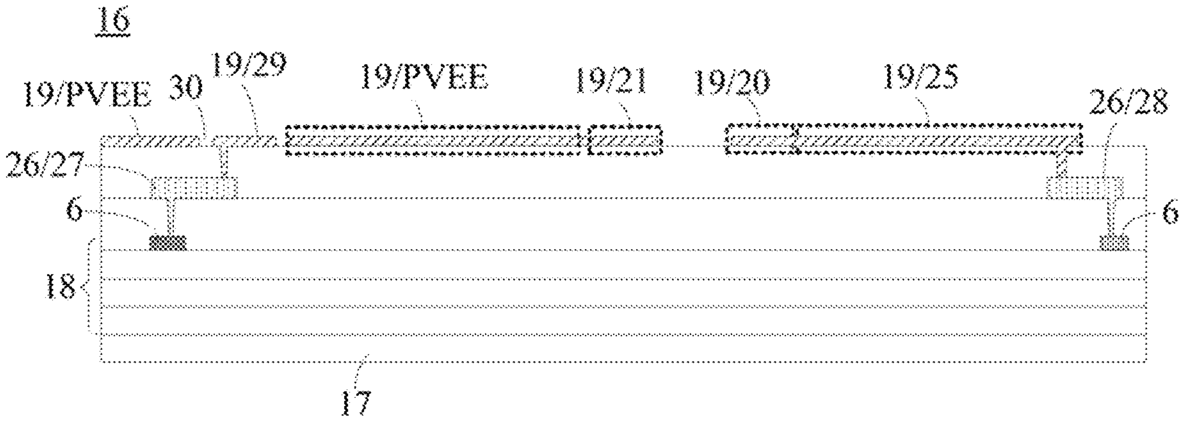
FIG. 23 illustrates a B1-B2-sectional view in FIG. 22.

FIG. 22 is another schematic diagram of a film layer structure of an exemplary display panel provided by an embodiment of the present disclosure, and FIG. 23 is a cross-sectional view of FIG. 22 along the B1-B2 direction. As shown in FIG. 22 and FIG. 23, the driving backplane 16 may further include a second metal layer 26 located between the circuit layer 18 and the first metal layer 19. The first connection line 24 may be located in the second metal layer 26, and the second metal layer 26 may further include a first connection electrode 27 and a second connection electrode 28.

The pixel circuit 1 in the second sub-circuit group 11 may be electrically connected to the second connection line 25 through the second connection electrode 28, and the pixel circuit 1 in the first sub-circuit group 10 may be electrically connected to the first metal member 29 through the first connection electrode 27. The first metal member 29 may be located in the first metal layer 19, and the second power line PVEE may include a hollowed structure 30. At least a portion of the first metal member 29 may be located in the hollowed structure 30, and may be electrically insulated from the second power line PVEE.

In the above structure, the second connection electrode 28 may act as an auxiliary connection electrode between the pixel circuit 1 and the second connection line 25, avoiding the second connection line 25 from being provided with a deep connection via hole when connecting to the pixel circuit 1. When a second connection electrode 28 is provided on the side where the second subcircuit is located, and the second connection electrode 28 may be connected to the second connection line 25 through a connection via hole, a first metal member 29 of a same layer as the second connection line 25 may be further provided at a position corresponding to the side of the first sub-circuit, and the first metal member 29 and the first connection line 24 may be connected through a connection via hole. At this time, the connection via hole between the first metal member 29 and the first connection line 24 may correspond to the connection via hole between the second connection electrode 28 and the second connection line 25 such that the distribution of the connection via holes on both sides of the first light-emitting unit group 8 may be consistent, and there may be no need to remove the connection via holes on the side of the first sub-circuit, simplifying the layout design. The first metal member 29 may be electrically connected only to the first connection electrode 27 and may not receive other signals.

In another embodiment, referring to FIGS. 22-23, the driving backplane 16 may also include a second metal layer 26 located between the circuit layer 18 and the first metal layer 19, and the first connection line 24 may be located in the second metal layer 26. In the direction perpendicular to the plane where the substrate 17 is located, the thickness of the first metal layer 19 may be different from the thickness of the second metal layer 26; and/or, the width of the second connecting line 25 may be different from the width of the first connection line 24.

The width of the second connection line 25 may refer to the line width of the second connection line 25 in the direction perpendicular to its extension, and the width of the first connection line 24 may refer to the line width of the first connection line 24 in the direction perpendicular to its extension. Taking the first connection line 24 as an example, the line width of the portion of the first connection line 24 extending along the first direction x may be its width in the second direction y, and the line width of the portion of the first connection line 24 extending along the second direction y may be its width in the first direction x.

For the first connection line 24 and the second connection line 25, by differentially designing the thickness and/or line width of the two, the thickness and line width may be used to balance the load, thereby reducing the load difference between the first connection line 24 and the second connection line 25.

For example, referring to FIG. 22 and FIG. 23, in one configuration, the thickness of the first metal layer 19 in the direction perpendicular to the plane where the substrate 17 is located may be less than the thickness of the second metal layer 26 in the direction perpendicular to the plane where the substrate 17 is located, and the width of the second connection line 25 may be greater than the width of the first connection line 24. In this way, the second connection line 25 may use the influence of its larger line width on the load to balance the influence of the smaller film thickness on the load, thereby reducing the load difference between the second connection line 25 and the first connection line 24.

In some other embodiments of the present disclosure, the thickness of the second metal layer 26 in the direction perpendicular to the plane where the substrate 17 is located may also be less than the thickness of the first metal layer 19 in the direction perpendicular to the plane where the substrate 17 is located, and the width of the first connection line 24 may be greater than the width of the second connection line 25. Accordingly, the first connection line 24 may use the influence of its larger line width on the load to balance the influence of the smaller film thickness on the load.

In addition, it should be noted that in one embodiment of the present disclosure, the materials of the first metal layer 19 and the second metal layer 26 may be same or different. For example, at least one of the first metal layer 19 and the second metal layer 26 may adopt a laminated metal design of titanium-aluminum-titanium, and/or at least one of the first metal layer 19 and the second metal layer 26 may adopt a laminated metal design of molybdenum-aluminum-molybdenum. Exemplarily, in one embodiment, the first metal layer 19 and the second metal layer 26 may be both titanium-aluminum-titanium structures. In another embodiment, the first metal layer 19 may be a titanium-aluminum-titanium structure, and the second metal layer 26 may be a molybdenum-aluminum-molybdenum structure.

Figure 24:
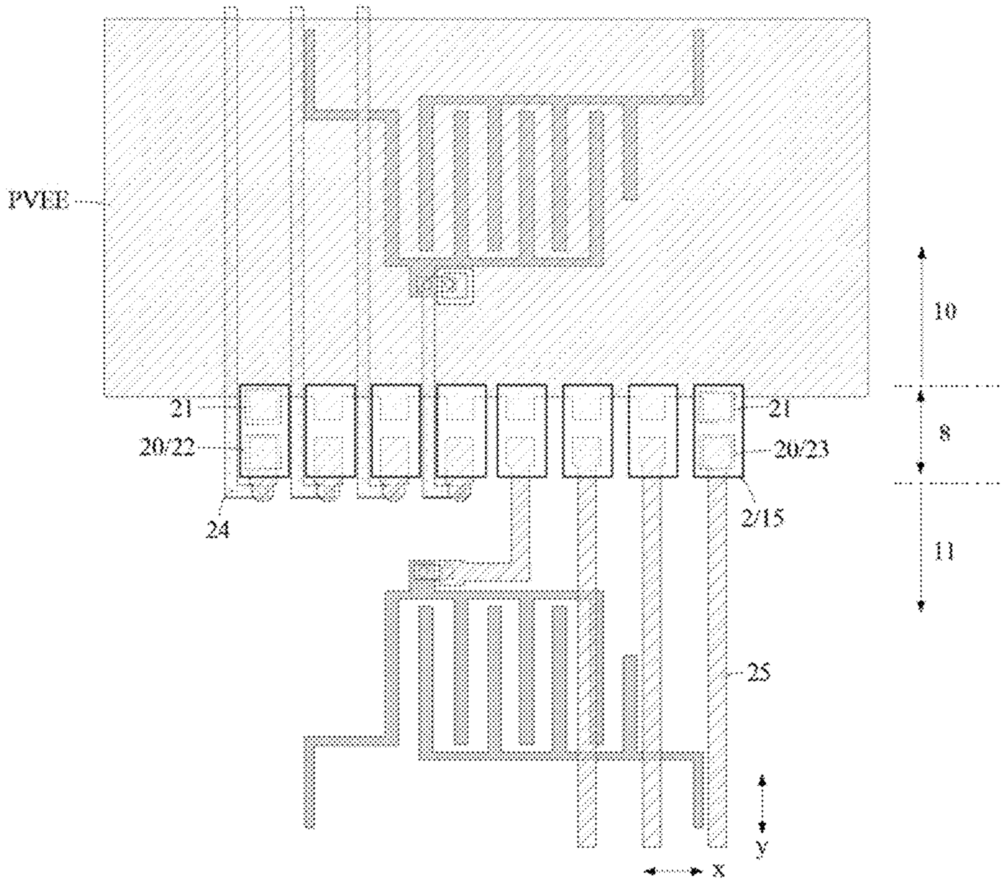
FIG. 24 illustrates another layer structure of an exemplary display panel according to various disclosed embodiments of the present disclosure.

FIG. 24 is a schematic diagram of another film layer structure of a display panel provided in an embodiment of the present disclosure. As shown in FIG. 24, in a direction perpendicular to the plane where the substrate 17 is located, the first connection line 24 may not overlap with the first output electrode 20 and the second output electrode 21.

When the light-emitting element 15 is bonded, the lower film layer may be penetrated under the action of pressure. By making the first connecting line 24 not overlap with the first output electrode 20 and the second output electrode 21, it may be possible to avoid short circuits between the first connection line 24 and the first output electrode 20 and the second output electrode 21 when the film layer is penetrated.

Further, referring to FIG. 24, the first connection line 24 may be electrically connected to the first sub-electrode 22 on the side of the first sub-electrode 22 adjacent to the second sub-circuit group 11.

On the one hand, the connection vias between the first connection line 24 and the first sub-electrode 22 may not occupy space between adjacent light-emitting elements 15, and thus may not affect the arrangement density of the light-emitting elements 15 in the first direction x. On the other hand, the connection via holes between the first connection line 24 and the first sub-electrode 22 may not occupy space between the first sub-electrode 22 and its corresponding second output electrode 21, which may ensure that the first sub-electrode 22 and the second output electrode 21 may be spaced a sufficient distance apart to avoid the short circuit between the two.

More specifically, after the first connection line 24 is led out from the pixel circuit 1, it may extend from one side of its corresponding light-emitting unit 2 in the first direction x to the side of the first sub-electrode 22 adjacent to the second sub-circuit group 11, and may be electrically connected to the first sub-electrode 22.

Figure 25:
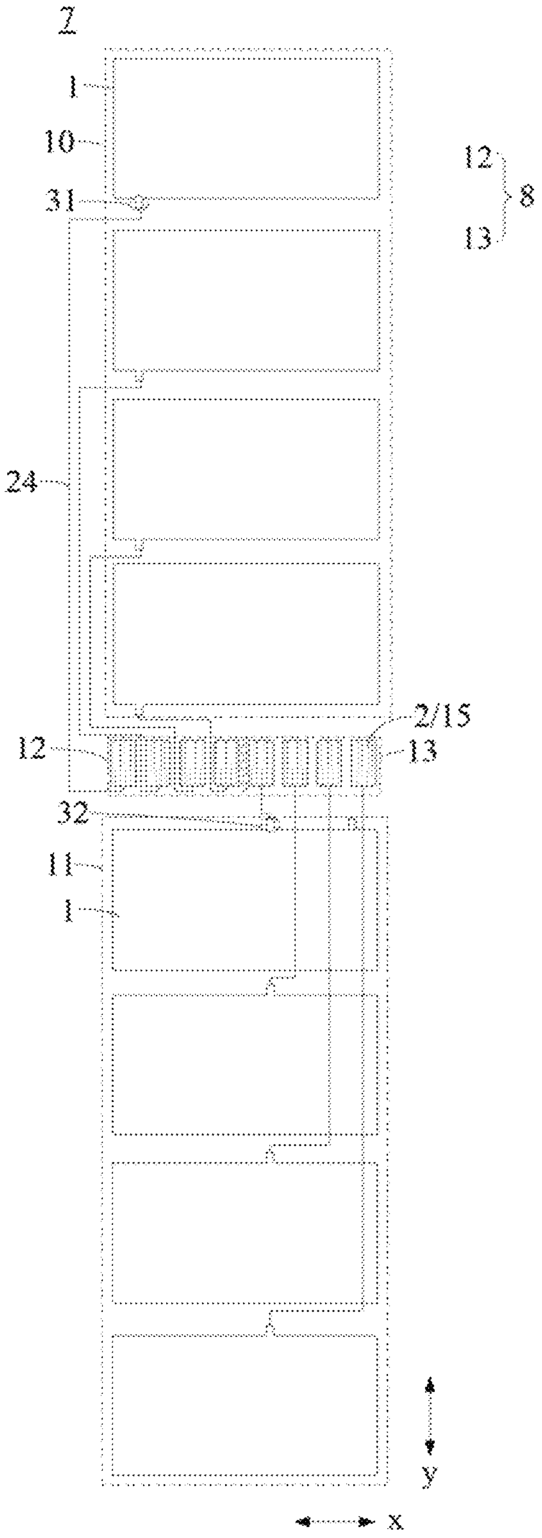
FIG. 25 illustrates another exemplary first display unit according to various disclosed embodiments of the present disclosure.
Figure 26:
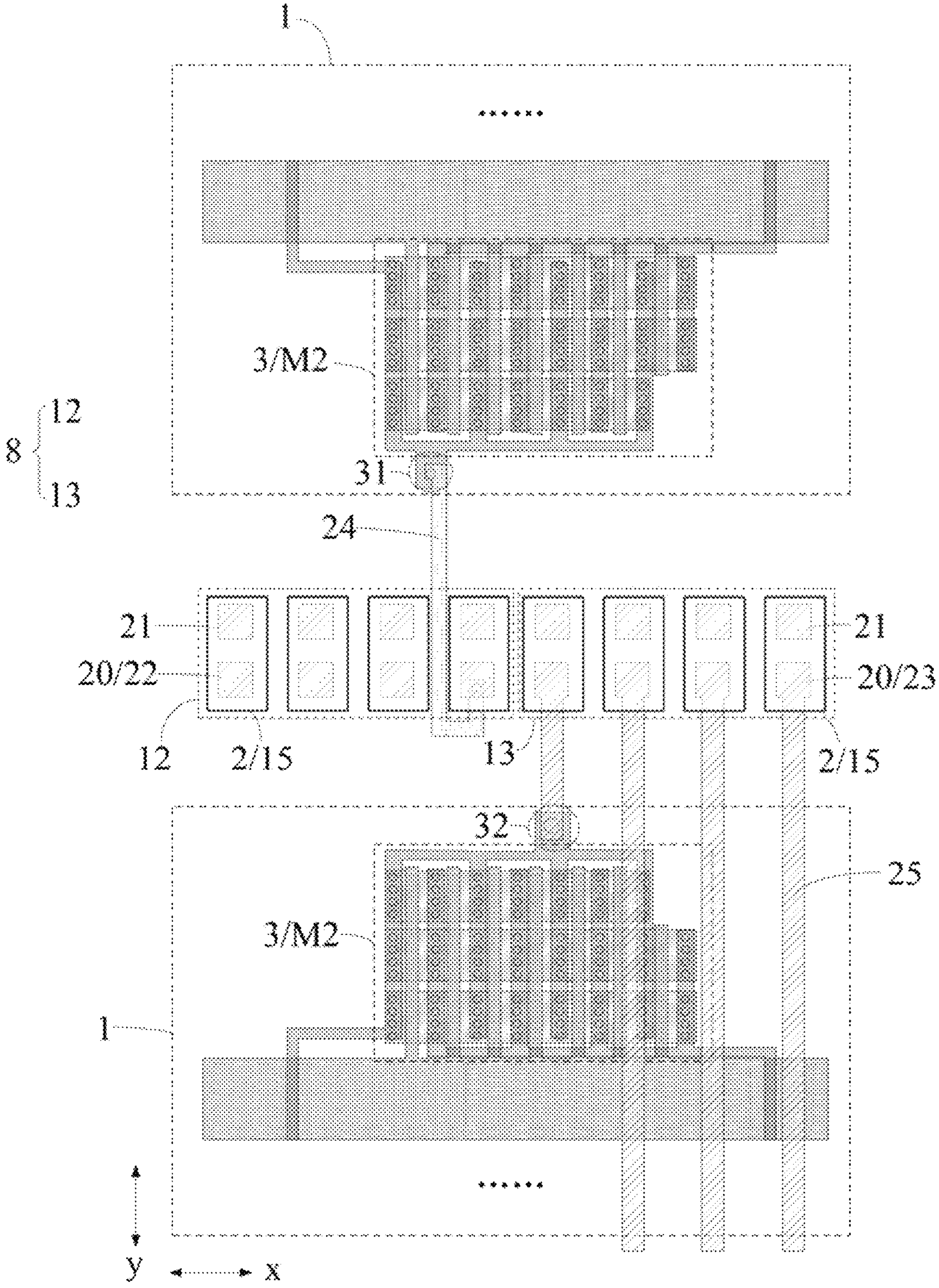
FIG. 26 illustrates another exemplary structure of a display panel according to various disclosed embodiments of the present disclosure.

FIG. 25 is another structural schematic diagram of the first display unit 7 provided in an embodiment of the present disclosure, and FIG. 26 is another film layer structural schematic diagram of the display panel provided in an embodiment of the present disclosure. As shown in FIG. 25 and FIG. 26, in one embodiment, the first light-emitting unit group 8 may include a first sub-unit group 12 and a second sub-unit group 13 arranged along the first direction x. The first sub-unit group 12 may include M1 light-emitting units 2, the second sub-unit group 13 may include M2 light-emitting units 2, $M1 \geq 1$, $M2 \geq 1$, and M1 and M2 may be both integers.

The pixel circuit 1 in the first sub-circuit group 10 may be electrically connected to the light-emitting unit 2 in the first sub-unit group 12 through the first connection line 24, and the pixel circuit 1 in the second sub-circuit group 11 may be electrically connected to the light-emitting unit 2 in the second sub-unit group 13 through the second connection line 25.

The pixel circuit 1 in the first sub-circuit group 10 may be electrically connected to the first connection line 24 through the first lead-out electrode 31, and the pixel circuit 1 in the second sub-circuit group 11 may be electrically connected to the second connection line 25 through the second lead-out electrode 32. The first lead-out electrode 31 and the second lead-out electrode 32 may be arranged in a same layer as the first source/drain metal electrode 5 and the second source/drain metal electrode 6. The first lead-out electrode 31 and the second lead-out electrode 32 may protrude from the pixel circuit 1 from the side of the pixel circuit 1 corresponding to each of them adjacent to the first light-emitting unit group 8.

The orthographic projection of the first lead-out electrode 31 on the plane where the display panel is located may overlap with the orthographic projection of the first sub-unit group 12 on the plane where the display panel is located in the second direction y, and the orthographic projection of the second extraction electrode 32 on the plane where the display panel is located may overlap with the orthographic projection of the second sub-unit group 13 on the plane where the display panel is located in the second direction y.

The above setting method may adjust the setting position of the lead-out electrode corresponding to the pixel circuit 1 in the first sub-circuit group 10 or the second sub-circuit group 11. By setting the first lead-out electrode 31 to overlap with the first sub-unit group 12 in the second direction y, the connection distance between the pixel circuit 1 in the first sub-circuit group 10 and the corresponding light-emitting element 15 may be reduced, and by setting the second lead electrode 32 to overlap with the second sub-unit group 13 in the second direction y, the distance between the pixel circuit 1 in the second sub-circuit group 11 and the corresponding light-emitting element 15 may be reduced.

Figure 27:
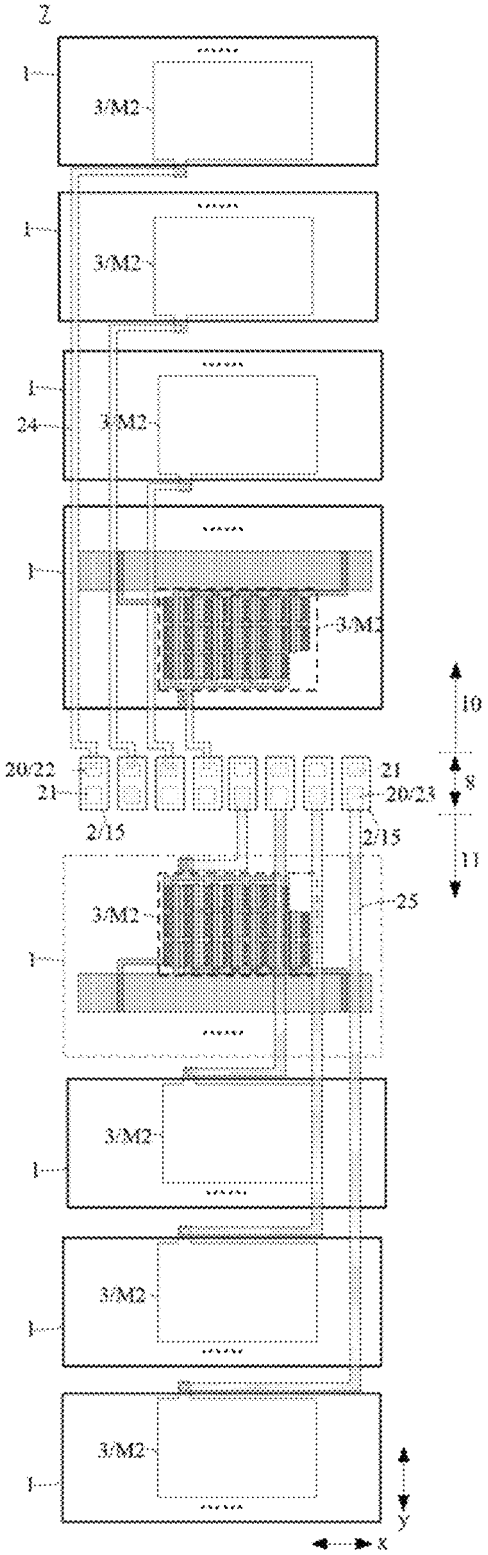
FIG. 27 illustrates another exemplary first display unit according to various disclosed embodiments of the present disclosure.

FIG. 27 is another structural schematic diagram of the first display unit 7 provided in an embodiment of the present disclosure. As shown in FIG. 27, in one embodiment, the light-emitting unit 2 may include a light-emitting element 15.

In conjunction with FIG. 18, the display panel may include a driving backplane 16. The driving backplane 16 may include a substrate 17, a circuit layer 18 located on one side of the substrate 17, and a first metal layer 19 located on the side of the circuit layer 18 away from the substrate 17.

The circuit layer 18 may include a pixel circuit 1, and the first metal layer 19 may include a first output electrode 20 electrically connected to the first terminal of the light-emitting element 15 and a second output electrode 21 electrically connected to the second terminal of the light-emitting element 15. The first output electrode 20 may include a first sub-electrode 22 and a second sub-electrode 23. The first sub-electrode 22 may also be electrically connected to the pixel circuit 1 in the first sub-circuit group 10, and the second sub-electrode 23 may also be electrically connected to the pixel circuit 1 in the second sub-circuit group 11.

For the first sub-electrode 22 and the second output electrode 21 electrically connected to the same light-emitting element 15, the first sub-electrode 22 may be located on the side of the second output electrode 21 adjacent to the first sub-circuit group 10 such that the first sub-electrode 22 may be closer to the first sub-circuit group 10, and the connection distance between the first sub-electrode 22 and the pixel circuit 1 in the first sub-circuit group 10 may be reduced. For the second sub-electrode 23 and the second output electrode 21 electrically connected to the same light-emitting element 15, the second sub-electrode 23 may be located on the side of the second output electrode 21 close to the second sub-circuit group 11, such that the second sub-electrode 23 may be closer to the second sub-circuit group 11, and the connection distance between the second sub-electrode 23 and the pixel circuit 1 in the second sub-circuit group 11 may be reduced.

Figure 29:
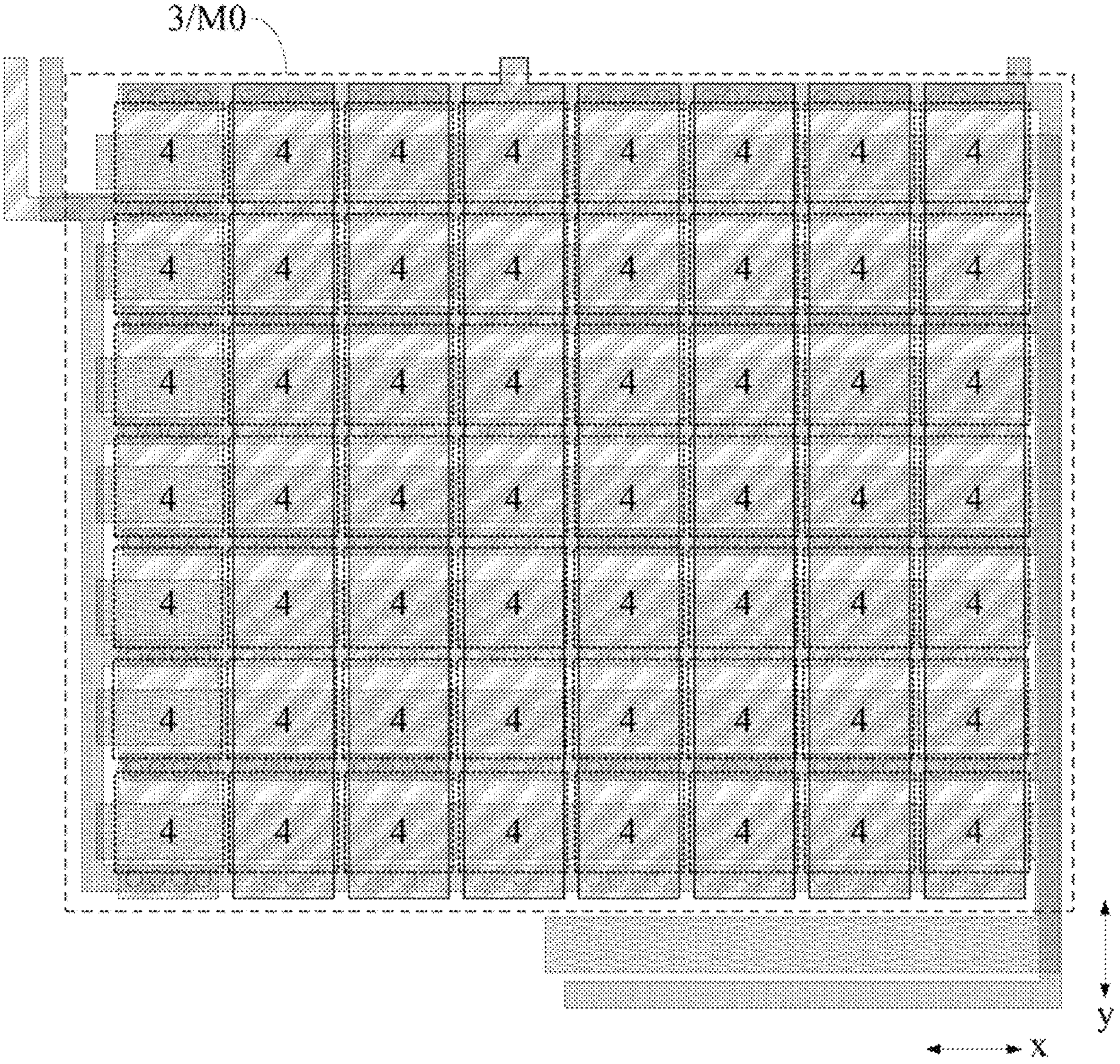
FIG. 29 illustrates an exemplary driving transistor according to various disclosed embodiments of the present disclosure.
Figure 30:
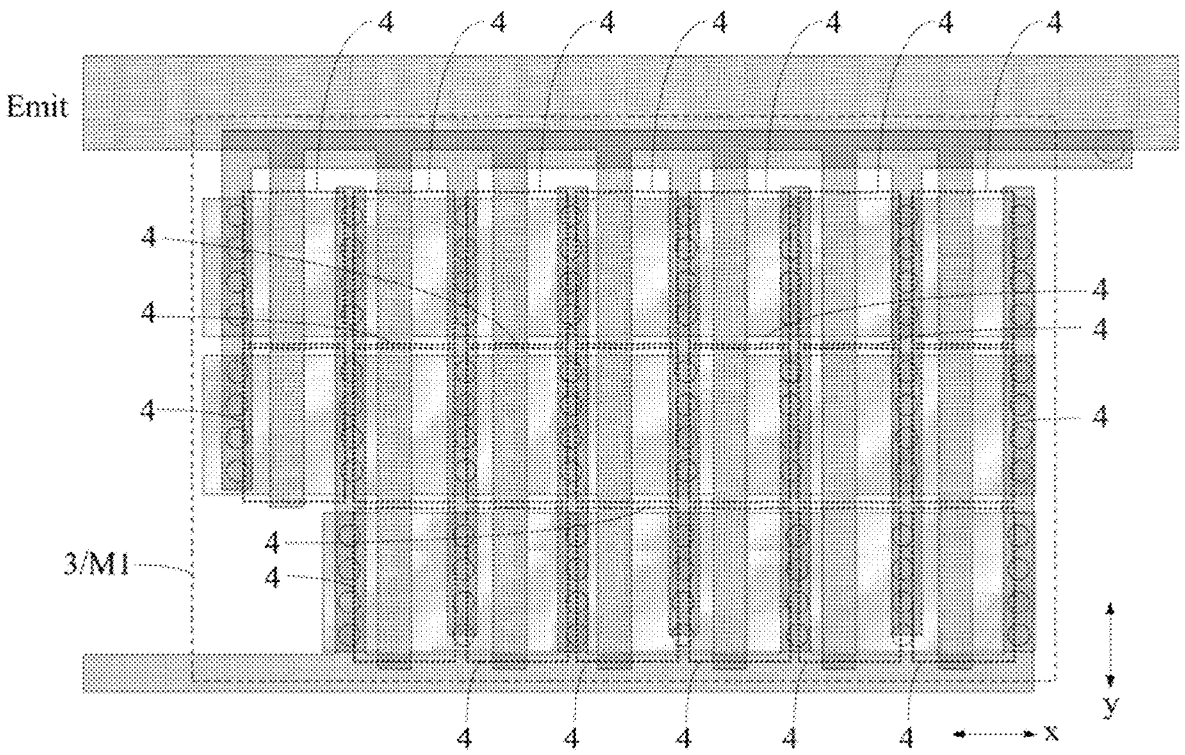
FIG. 30 illustrates an exemplary first light-emitting control transistor according to various disclosed embodiments of the present disclosure.
Figure 31:
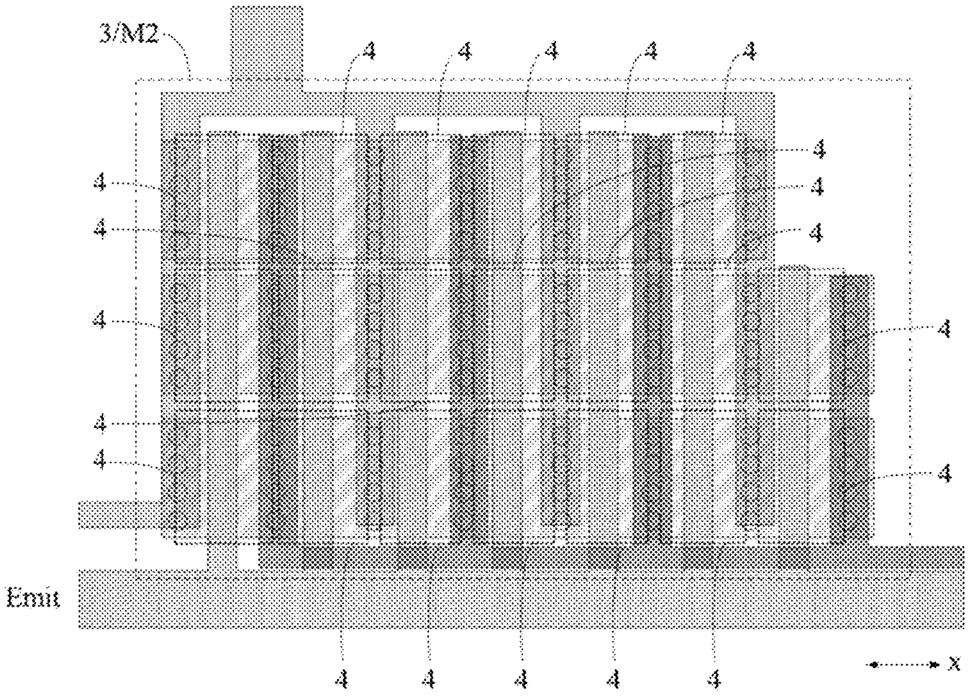
FIG. 31 illustrates an exemplary second light-emitting control transistor according to various disclosed embodiments of the present disclosure.

FIG. 28 is a schematic diagram of a film structure of a pixel circuit 1 provided in an embodiment of the present disclosure, FIG. 29 is a schematic diagram of a structure of a driving transistor M0 provided in one embodiment of the present disclosure, FIG. 30 is a schematic diagram of a structure of a first light-emitting control transistor M1 provided in an embodiment of the present disclosure, and FIG. 31 is a schematic diagram of a structure of a second light-emitting control transistor M2 provided in one embodiment of the present disclosure. As shown in FIG. 28 to FIG. 31, the first sub-transistor 4 in the first transistor 3 may be arranged along the first direction x and the second direction y, and the first direction x may intersect the second direction y. That is, the multiple first sub-transistors 4 in the first transistor 3 may arranged along multiple rows and columns, that is, arranged in a matrix.

When the first transistor 3 includes multiple first sub-transistors 4 arranged in parallel, the matrix arrangement of the multiple first sub-transistors 4 may increase the lateral space occupied by the first transistor 3 and compress the longitudinal space occupied by the first transistor 3, reduce the longitudinal space pressure caused by the excessive number of first sub-transistors 4 included in the first transistor 3, and avoid affecting the longitudinal length of the display panel.

In one embodiment, in the first transistor 3, there may be a gap between the active layers al of the adjacent first sub-transistors 4 in the first direction x, and the active layers al of the adjacent first sub-transistors 4 in the second direction y may be connected. That is, whether the pixel circuit 1 includes one or two or more first transistors 3, the active layers al of the first sub-transistors 4 in the first transistor 3 may follow the above design.

Figure 32:
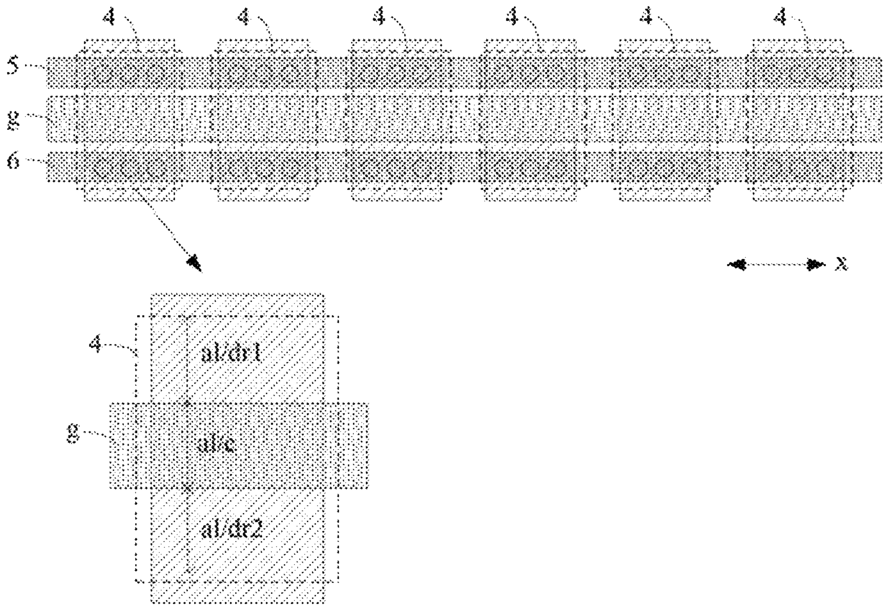
FIG. 32 illustrates an exemplary structure of the first sub-transistors arranged along a first direction corresponding to FIG. 29.
Figure 33:
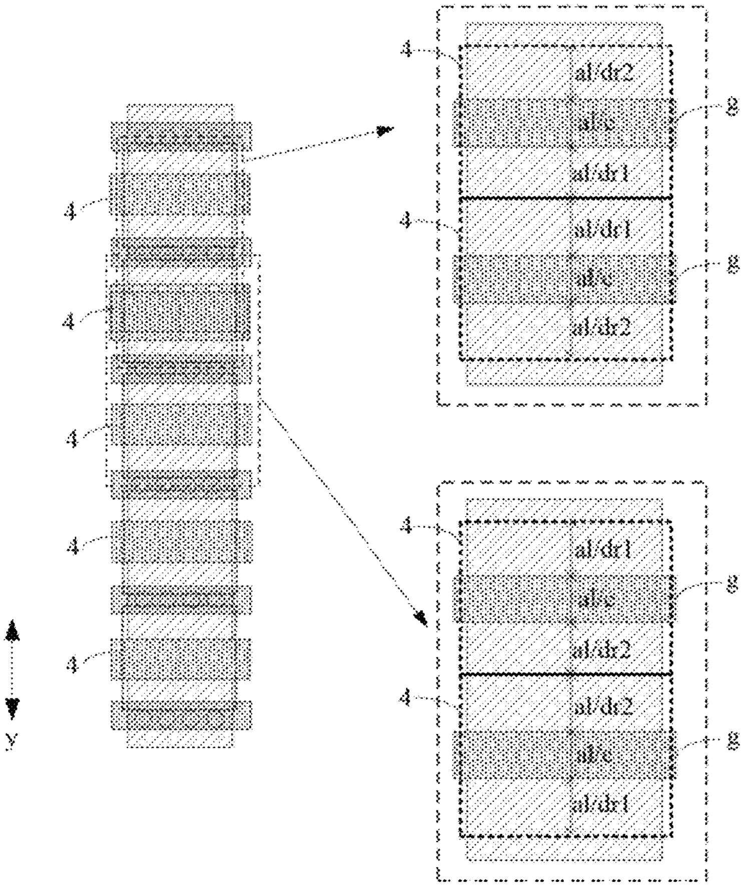
FIG. 33 illustrates an exemplary structure of the second sub-transistors arranged along a first direction corresponding to FIG. 29.

This structure may be specifically referred to the structure of the first transistor 3 shown in FIG. 29. In this type of first transistor 3, for the first sub-transistors 4 arranged along the first direction x, as shown in FIG. 32, which is a structural schematic diagram of the first sub-transistors 4 arranged along the first direction x corresponding to FIG. 29, the first doped regions dr1 in the active layers al of the multiple first sub-transistors 4 may all be electrically connected to a first source/drain metal electrode 5 extending along the first direction x, the second doped regions dr2 in the active layers al of the multiple first sub-transistors 4 may all be electrically connected to a second source/drain metal electrode 6 extending along the first direction x, and the gates of the multiple first sub-transistors 4 may be arranged along the first direction x and connected together. However, because there may be a gap between the active layers al of adjacent first sub-transistors 4, there may be a gap between the channels c of adjacent first sub-transistors 4. For the first sub-transistors 4 arranged along the second direction y, as shown in FIG. 33, which is a structural schematic diagram of the first sub-transistors 4 arranged along the second direction y corresponding to FIG. 29, there may be a first doped region dr1 or a second doping region dr2 between the channels c of two adjacent first sub-transistors 4, thus there may be also a gap between the channels c of two adjacent first sub-transistors 4. Moreover, for two adjacent first sub-transistors 4, either the first doped regions dr1 of the active layers al may be connected together, or the second doped regions dr2 of the active layers al may be connected together.

In another embodiment, in the first transistor 3, the active layers al of the adjacent first sub-transistors 4 in the first direction x may be connected, and there may be a gap between the active layers al of the adjacent first sub-transistors 4 in the second direction y. That is, whether the pixel circuit 1 includes one or two or more first transistors 3, the active layers al of the first sub-transistors 4 in the first transistor 3 may follow the above design method.

Figure 34:
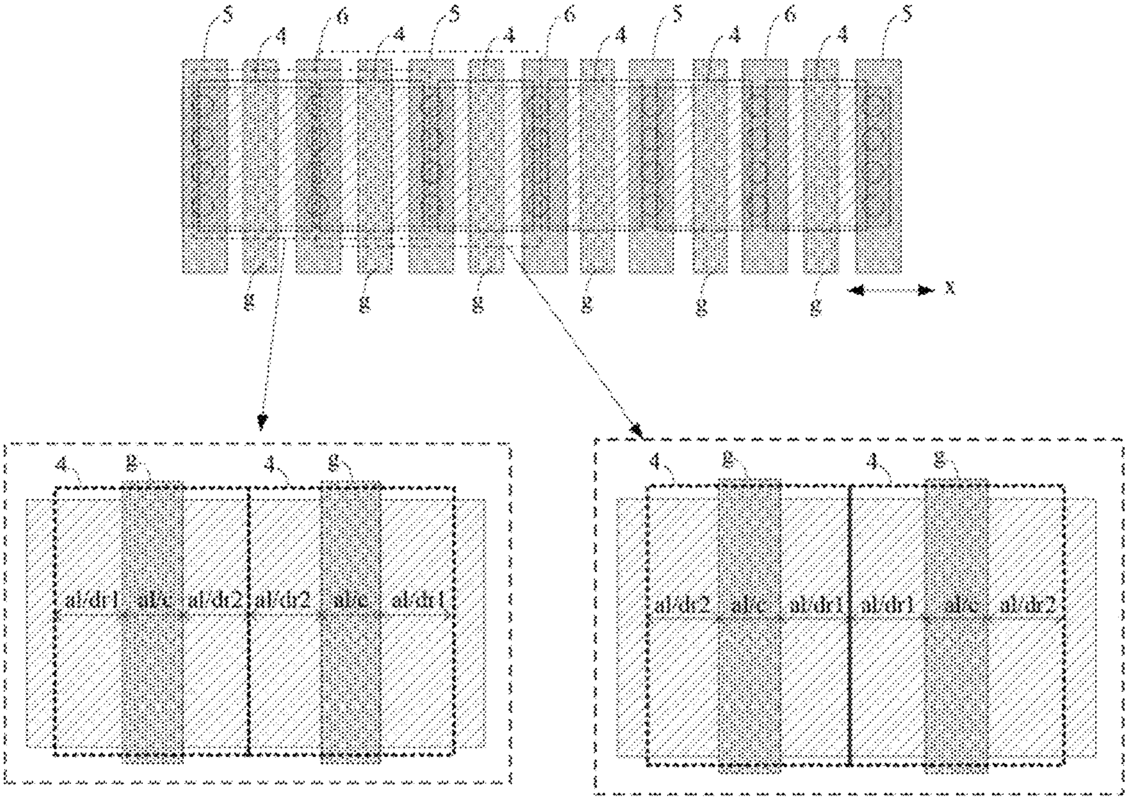
FIG. 34 illustrates an exemplary structure of the first sub-transistors arranged along a first direction corresponding to FIG. 30 and FIG. 31.
Figure 35:
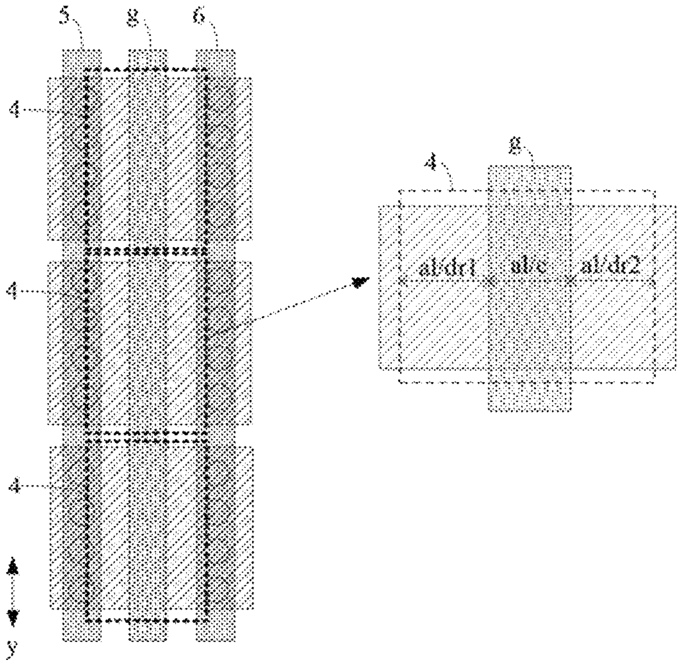
FIG. 35 illustrates an exemplary structure of the second sub-transistors arranged along a first direction corresponding to FIG. 30 and FIG. 31.

This structure may be specifically referred to the first transistor 3 shown in FIG. 30 and FIG. 31. In this type of first transistor 3, for the first sub-transistors 4 arranged along the first direction x, as shown in FIG. 34, which is a schematic diagram of the structure of the first sub-transistors 4 arranged along the first direction x corresponding to FIG. 30 and FIG. 31, a first doped region dr1 or a second doped region dr2 may be spaced between the channels c of two adjacent first sub-transistors 4, thus there may be also a gap between the channels c of two adjacent first sub-transistors 4. Moreover, for two adjacent first sub-transistors 4, either the first doped region dr1 of the active layer al may be connected together, or the second doped region dr2 of the active layer al may be connected together. For the first sub-transistors 4 arranged along the second direction y, as shown in FIG. 35, which is a structural schematic diagram of the first sub-transistors 4 arranged along the first direction x corresponding to FIG. 30 and FIG. 31, the first doped regions dr1 in the active layers al of the multiple first sub-transistors 4 may all be electrically connected to a first source/drain metal electrode 5 extending along the second direction y, and the second doped regions dr2 in the active layers al of the multiple first sub-transistors 4 may all be electrically connected to a second source/drain metal electrode 6 extending along the second direction y, and the gates of the multiple first sub-transistors 4 may be arranged along the second direction y and connected together, but because there may be a gap between the active layers al of adjacent first sub-transistors 4, there may be a gap between the channels c of adjacent first sub-transistors 4.

In another embodiment, referring to FIG. 28, the pixel circuit 1 may include at least two first transistors 3. In conjunction with FIG. 29, in some first transistors 3, there may be a gap between the active layers al of the adjacent first sub-transistors 4 in the first direction x, and the active layers al of the adjacent first sub-transistors 4 in the second direction y may be connected. The embodiment of the present disclosure is illustrated by taking the arrangement of the first sub-transistor 4 in the driving transistor M0 as an example to meet this condition. In conjunction with FIG. 32 and FIG. 33, the specific structure of the first sub-transistor 4 in this type of first transistor 3 has been described above, and will not be repeated here. In conjunction with FIG. 30 and FIG. 31, in another portion of the first transistors 3, the active layers al of the adjacent first sub-transistors 4 in the first direction x may be connected, and there may be a gap between the active layers al of the adjacent first sub-transistors 4 in the second direction y. The embodiment of the present disclosure is illustrated by taking the arrangement of the first sub-transistors 4 in the first light-emitting control transistor M1 and the second light-emitting control transistor M2 as an example to meet this condition. In conjunction with FIG. 34 and FIG. 35, the specific structure of the first sub-transistor 4 in this type of first transistor 3 has been described above, and will not be repeated here. That is, when the pixel circuit 1 includes at least two first transistors 3, the first sub-transistors 4 in at least two first transistors 3 may follow different arrangements.

In one embodiment, referring to FIG. 28, the first light-emitting control transistor M1, the driving transistor M0, and the second light-emitting control transistor M2 may all be first transistors 3. Because the driving transistor M0 plays a more important role in the pixel circuit 1, the requirements for the current output capability of the driving transistor M0 may be higher. In this regard, the number of first sub-transistors 4 in the driving transistor M0 may be set to be greater than the number of first sub-transistors 4 in the first light-emitting control transistor M1 and the second light-emitting control transistor M2 such that the driving transistor M0 may have a larger equivalent width-to-length ratio. Exemplarily, the driving transistor M0 may include 30 first sub-transistors 4, and the first light-emitting control transistor M1 and the second light-emitting control transistor M2 may respectively include 20 first sub-transistors 4. In another embodiment, as being shown in FIG. 28, the driving transistor M0 may include 56 first sub-transistors 4, and the first light-emitting control transistor M1 and the second light-emitting control transistor M2 may respectively include 20 first sub-transistors 4.

In other embodiments, the first light-emitting control transistor M1, the driving transistor M0 and the second light-emitting control transistor M2 may also include other numbers of first sub-transistors 4, and the present disclosure is not limited to this.

When a larger number of first sub-transistors 4 are set in the driving transistor M0, the number of first sub-transistors 4 arranged along the first direction x in the driving transistor M0 may be further set to be greater than the number of first sub-transistors 4 arranged along the second direction y to compress the longitudinal space of the driving transistors M0 as much as possible and avoid excessive longitudinal space occupied by a single pixel circuit 1.

In another embodiment, referring to FIG. 28, the first light-emitting control transistor M1, the driving transistor M0 and the second light-emitting control transistor M2 may be all first transistors 3. The first light-emitting control transistor M1 and the second light-emitting control transistor M2 may be both electrically connected to a light-emitting control signal line Emit extending along the first direction x. The light-emitting control signal line Emit may be located between the second light-emitting control transistor M2 and the first light-emitting control transistor M1, and the driving transistor M0 may be located on the side of the first light-emitting control transistor M1 away from the second light-emitting control transistor M2.

When the first light-emitting control transistor M1 and the second light-emitting control transistor M2 are electrically connected to the same light-emitting control signal line Emit, the light-emitting control signal line Emit may be set between the two light-emitting control transistors, which may make it easier to connect the light-emitting control signal line Emit with the two light-emitting control transistors. In addition, in conjunction with FIG. 12, the driving transistor M0 may be located on the side of the first light-emitting control transistor M1 away from the second light-emitting control transistor M2, and the driving transistor M0 may not be spaced between the second light-emitting control transistor M2 and the first light-emitting unit group 8, thus it may not affect the connection between the second light-emitting control transistor M2 and the light-emitting unit 2.

Figure 36:
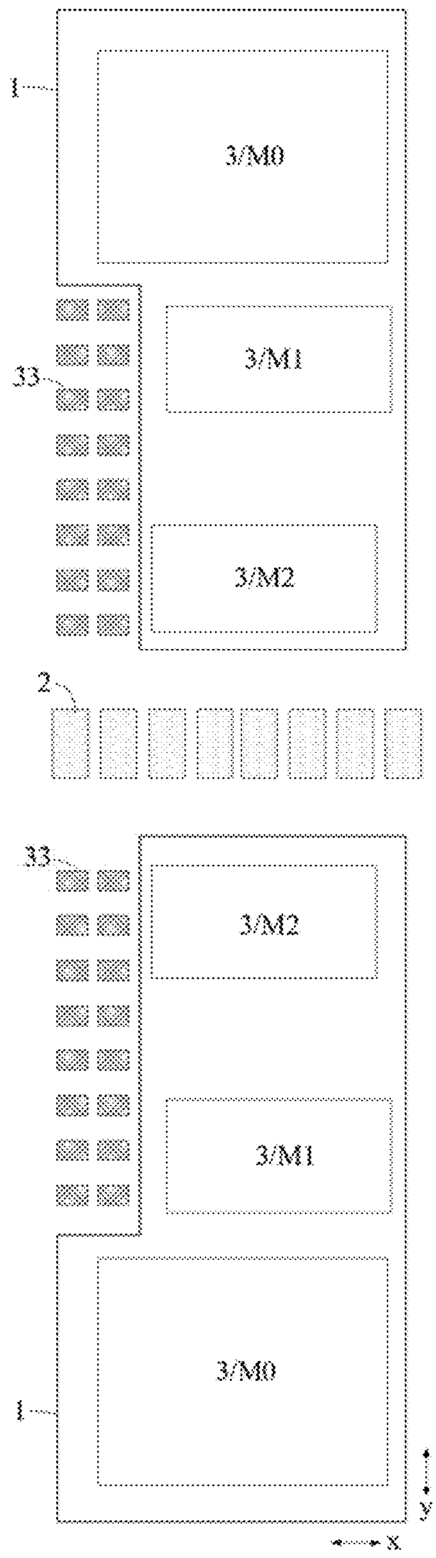
FIG. 36 illustrates an exemplary distribution of the temperature sensors according to various disclosed embodiments of the present disclosure.

FIG. 36 is a distribution diagram of a temperature sensor 33 provided in an embodiment of the present disclosure. As shown in FIG. 36, in one embodiment, the length of the driving transistor M0 in the first direction x may be greater than the length of the first light-emitting control transistor M1 and the second light-emitting control transistor M2 in the first direction x.

The display panel may also include a temperature sensor 33 for detecting the panel temperature. At least a portion of the temperature sensor 33 may be located on one side of the first light-emitting control module in the first direction x, and/or, at least a portion of the temperature sensor 33 may be located on one side of the second light-emitting control module in the first direction x, to realize the reasonable use of the space on one side of the first light-emitting control module and/or the second light-emitting control module in the first direction x.

In one embodiment, in combination with FIG. 2 and FIG. 28, the pixel circuit 1 may also include a gate reset module 34 and a data writing module 35. The gate reset module 34 may be electrically connected to the first scan signal line Scan1, and the data writing module 35 may be electrically connected to the second scan signal line Scan2.

More specifically, referring to FIG. 2, the pixel circuit 1 may also include a third node O3, a fourth node O4 and a fifth node O5. The first light-emitting control transistor M1 may be coupled between the first node O1 and the third node O3, the driving transistor M0 may be coupled between the third node O3 and the fourth node O4, the second light-emitting control transistor M2 may be coupled between the fourth node O4 and the second node O2, and the gate of the first sub-transistor 4 in the driving transistor M0 may be electrically connected to the fifth node O5.

The gate reset module 34 may include a gate reset transistor M3, the gate of the gate reset transistor M3 may be electrically connected to the first scan signal line Scan1, the first terminal of the gate reset transistor M3 may be electrically connected to the reset signal line Vref, and the second terminal of the gate reset transistor M3 may be electrically connected to the fifth node O5. The data writing module 35 may include a data writing transistor M4, the gate of the data writing transistor M4 may be electrically connected to the second scan signal line Scan2, the first terminal of the data writing transistor M4 may be electrically connected to the data line Data, and the second terminal of the data writing transistor M4 may be electrically connected to the third node O3.

The width of the light-emitting control signal line Emit in the direction perpendicular to its extension may be greater than the width of the first scan signal line Scan1 and/or the second scan signal line Scan2 in the direction perpendicular to its extension.

The light-emitting control signal line Emit may need to be connected to the first light-emitting control transistor M1 and the second light-emitting control transistor M2. Therefore, the number of first sub-transistors 4 that the light-emitting control signal line Emit needs to drive may be large, resulting in a large load. Moreover, in a display panel with a high lateral resolution, the length of the light-emitting control signal line Emit may be large, which may also increase the response time of the light-emitting control transistor. In this regard, in an embodiment of the present disclosure, the line width of the light-emitting control signal line Emit may be set larger, and then the larger line width may be used to weaken its load and reduce the response time of the light-emitting control transistor.

Figure 37:
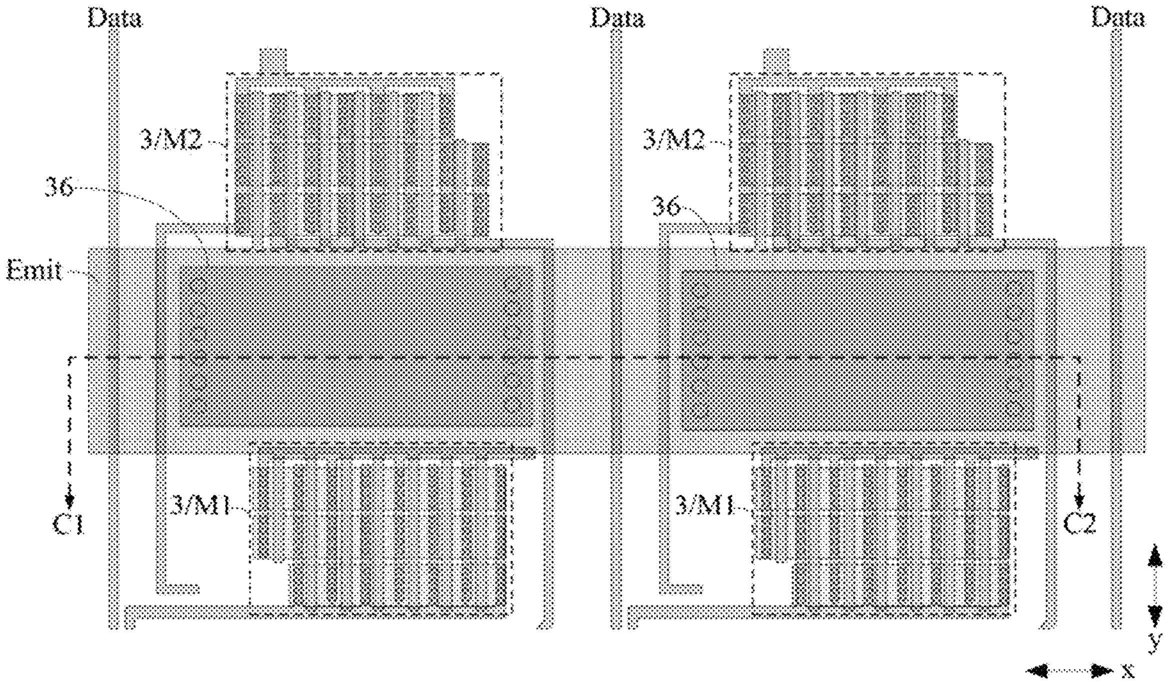
FIG. 37 illustrates another exemplary layer structure of a display panel according to various disclosed embodiments of the present disclosure.

FIG. 37 is another schematic diagram of the film layer structure of the display panel provided in an embodiment of the present disclosure. As shown in FIG. 37, in one embodiment, the light-emitting control signal line Emit may also be electrically connected to the second metal member 36, and the light-emitting control signal line Emit may overlap the second metal member 36 in the direction perpendicular to the plane where the display panel is located.

This setting method may be equivalent to a double-layer wiring design for the overall structure of the light-emitting control signal line Emit, which may not only further reduce its load, but also reduce the line width requirements for the light-emitting control signal line Emit. Under the condition that the load of the light-emitting control signal line Emit meets the requirements, the light-emitting control signal line Emit may not need to be set too wide, thereby reducing the longitudinal space required to be occupied by the light-emitting control signal line Emit.

In one embodiment, in combination with FIG. 2 and FIG. 28, the pixel circuit 1 may further include a data writing module 35. The data writing module 35 may be electrically connected to the data line Data, and the extension direction of the data line Data may intersect with the extension direction of the light-emitting control signal line Emit.

Figure 38:
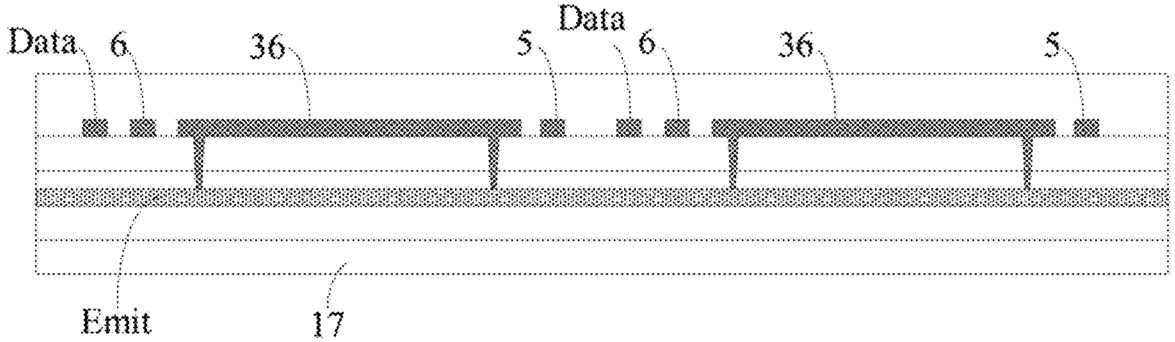
FIG. 38 illustrates a C1-C2-sectional view in FIG. 37.

FIG. 38 is a cross-sectional view of FIG. 37 along the C1-C2 direction. In combination with FIG. 37 and FIG. 38, the second metal member 36 may be arranged in the same layer as the data line Data, the light-emitting control signal line Emit may be electrically connected to a plurality of second metal members 36, and the second metal member 36 may be located between adjacent data lines Data. In this way, the second metal member 36 may be formed by the same patterning process as the data line Data, and there may be sufficient wiring space between adjacent data lines Data. Accordingly, a larger area may be set for the second metal member 36.

In one, in combination with FIG. 2 and FIG. 28, the pixel circuit 1 may further include a third node O3, a fourth node O4 and a fifth node O5. The first light-emitting control transistor M1 may be coupled between the first node O1 and the third node O3. The driving transistor M0 may be coupled between the third node O3 and the fourth node O4. The second light-emitting control transistor M2 may be coupled between the fourth node O4 and the second node O2. The gate of the first sub-transistor 4 in the driving transistor M0 may be electrically connected to the fifth node O5.

The pixel circuit 1 may also include a gate reset module 34, a data writing module 35, a compensation module 37 and an anode reset module 38. The gate reset module 34 may be electrically connected to the fifth node O5, the data writing module 35 may be electrically connected to the third node O3, the compensation module 37 may be electrically connected to the fourth node O4 and the fifth node O5 respectively, and the anode reset module 38 may be electrically connected to the second node O2.

More specifically, referring to FIG. 2, the gate reset module 34 may include a gate reset transistor M3. The gate of the gate reset transistor M3 may be electrically connected to the first scan signal line Scan1. The first terminal of the gate reset transistor M3 may be electrically connected to the reset signal line Vref, and the second terminal of the gate reset transistor M3 may be electrically connected to the fifth node O5.

The data writing module 35 may include a data writing transistor M4, the gate of the data writing transistor M4 may be electrically connected to the second scan signal line Scan2, the first terminal of the data writing transistor M4 may be electrically connected to the data line Data, and the second terminal of the data writing transistor M4 may be electrically connected to the third node O3.

The compensation module 37 may include a compensation transistor M5, the gate of the compensation transistor M5 may be electrically connected to the second scan signal line Scan2, the first terminal of the compensation transistor M5 may be electrically connected to the fourth node O4, and the second terminal of the compensation transistor M5 may be electrically connected to the fifth node O5.

The anode reset module 38 may include an anode reset transistor M6, the first terminal of the anode reset transistor M6 may be electrically connected to the reset signal line Vref, and the second terminal of the anode reset transistor M6 may be electrically connected to the second node O2.

Referring to FIG. 28, the gate reset module 34, the data writing module 35, the compensation module 37 and the anode reset module 38 may all be located between the first light-emitting control transistor M1 and the driving transistor M0.

These modules may be arranged between the first light-emitting control transistor M1 and the driving transistor M0. On the one hand, the gate reset module 34, the data writing module 35 and the compensation module 37 may be close to the driving transistor M0, which may facilitate the connection between these modules and the driving transistor M0. On the other hand, compared with arranging these modules on the side of the driving transistor M0 away from the first light-emitting control transistor M1, the anode reset module 38 may also be closer to the second light-emitting control transistor M2, which may facilitate the connection between the anode reset module 38 and the second light-emitting control transistor M2, thereby realizing the connection with the light-emitting element 15.

In addition, referring to FIG. 2 and FIG. 28, the pixel circuit 1 may further include a storage capacitor Cst. The first plate of the storage capacitor Cst may be electrically connected to the first node O1, and the second plate of the storage capacitor Cst may be electrically connected to the fifth node O5.

Figure 39:
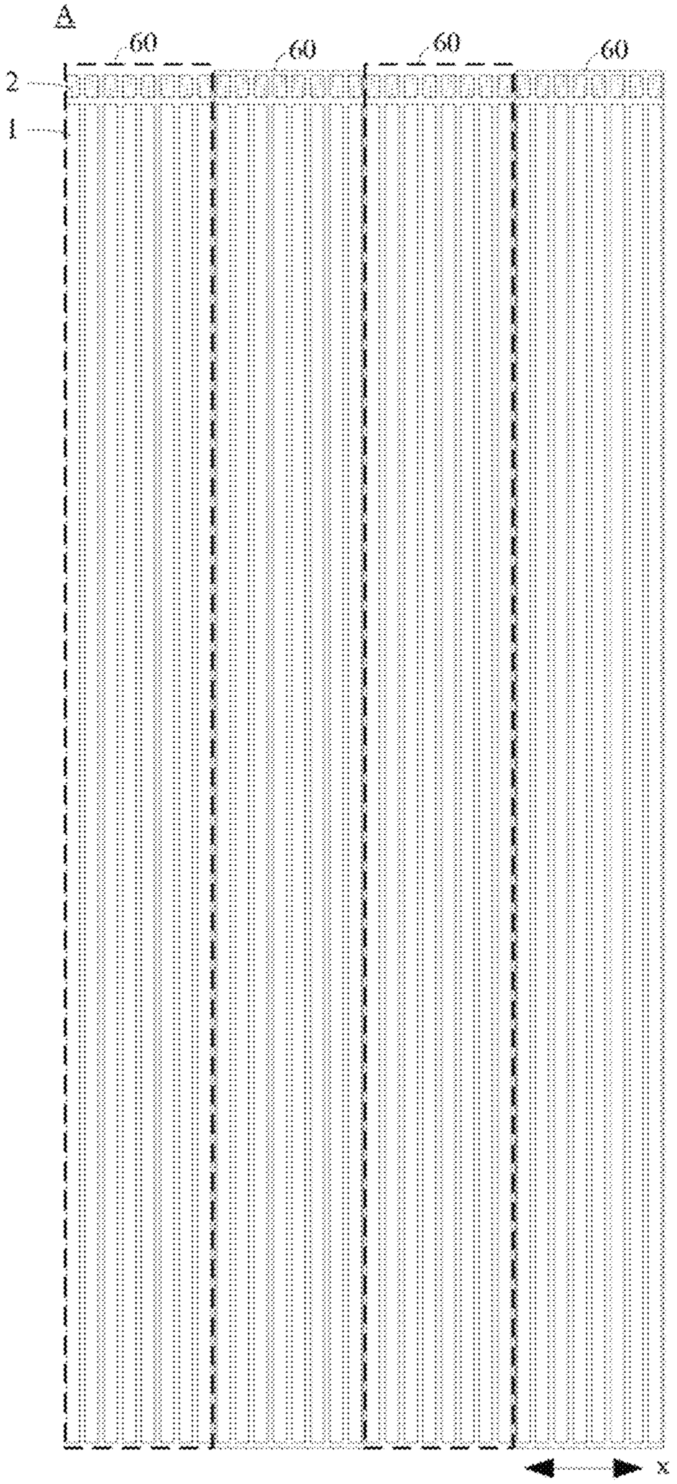
FIG. 39 illustrates another exemplary structure corresponding the area A in FIG. 5.
Figure 40:
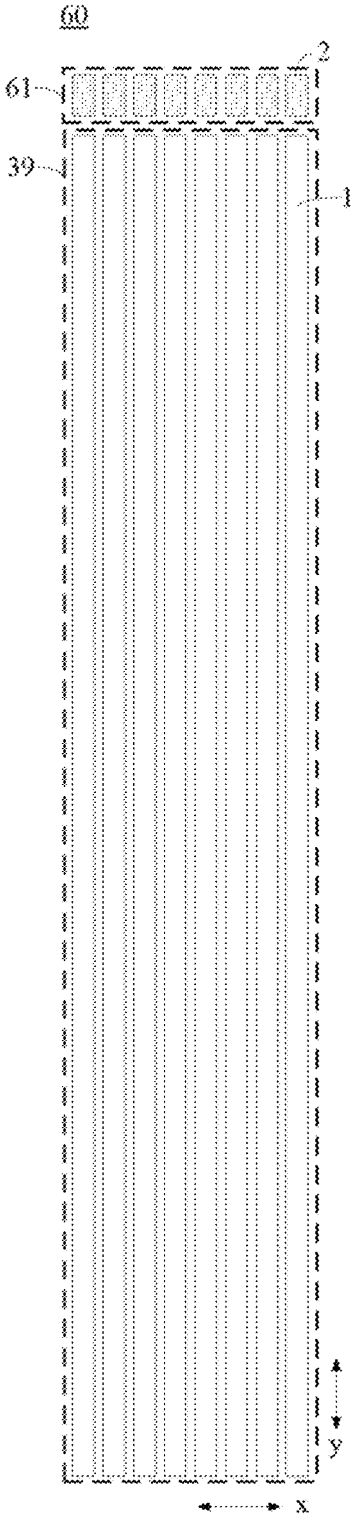
FIG. 40 illustrates an exemplary second display unit according to various disclosed embodiments of the present disclosure.

FIG. 39 is another structural schematic diagram corresponding to the area A in FIG. 5, and FIG. 40 is a structural schematic diagram of the second display unit 60 provided in an embodiment of the present disclosure. As shown in FIG. 39 and FIG. 40, in one embodiment, the display panel may include a second display unit 60, and the second display unit 60 may include a second light-emitting unit group 61 and a second pixel circuit group 39. The second light-emitting unit group 61 may include a plurality of light-emitting units 2 arranged along the first direction x. The second pixel circuit group 39 may include a plurality of pixel circuits 1 arranged along the first direction x.

Further, in the second display unit 60, the second light-emitting unit group 61 and the second pixel circuit group 39 may be arranged along the second direction y, and the light-emitting unit 2 may be arranged along the second direction y with the pixel circuit 1 connected thereto. At this time, the light-emitting unit 2 and the corresponding pixel circuit 1 may be adjacent to each other, which may facilitate the connection between the two.

Figure 41:
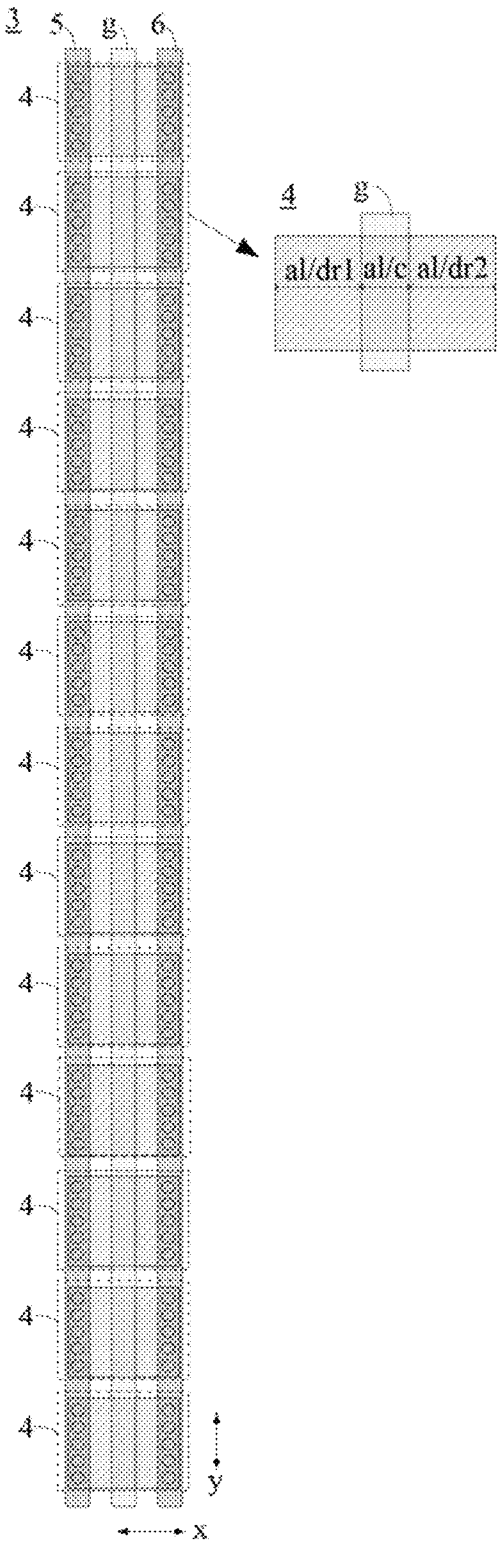
FIG. 41 illustrates another exemplary first transistor according to various disclosed embodiments of the present disclosure.

FIG. 41 is another structural schematic diagram of the first transistor 3 provided in one embodiment of the present disclosure. As shown in FIG. 41, in one embodiment, as the first sub-transistors 4 in the first transistor 3 are arranged along the second direction y, there may be a gap between the active layers al of two adjacent first sub-transistors 4, and the second direction y may intersect with the first direction x.

In this structure, each first sub-transistor 4 arranged in parallel in the first transistor 3 may have a smaller width-to-length ratio, which may make the performance of the first transistor 3 better under the premise of increasing the equivalent width-to-length ratio of the first transistor 3. Moreover, in the first transistor 3 under this design, the gates of the X first sub-transistors 4 may be connected together, the first doped regions dr1 of the active layers al of the X first sub-transistors 4 may be electrically connected to a first source/drain metal electrode 5 extending along the second direction y, and the second doped regions dr2 of the active layers al of the X first sub-transistors 4 may be electrically connected to a second source/drain metal electrode 6 extending along the second direction y, and the layout design of the first transistor 3 may be simpler.

Figure 42:
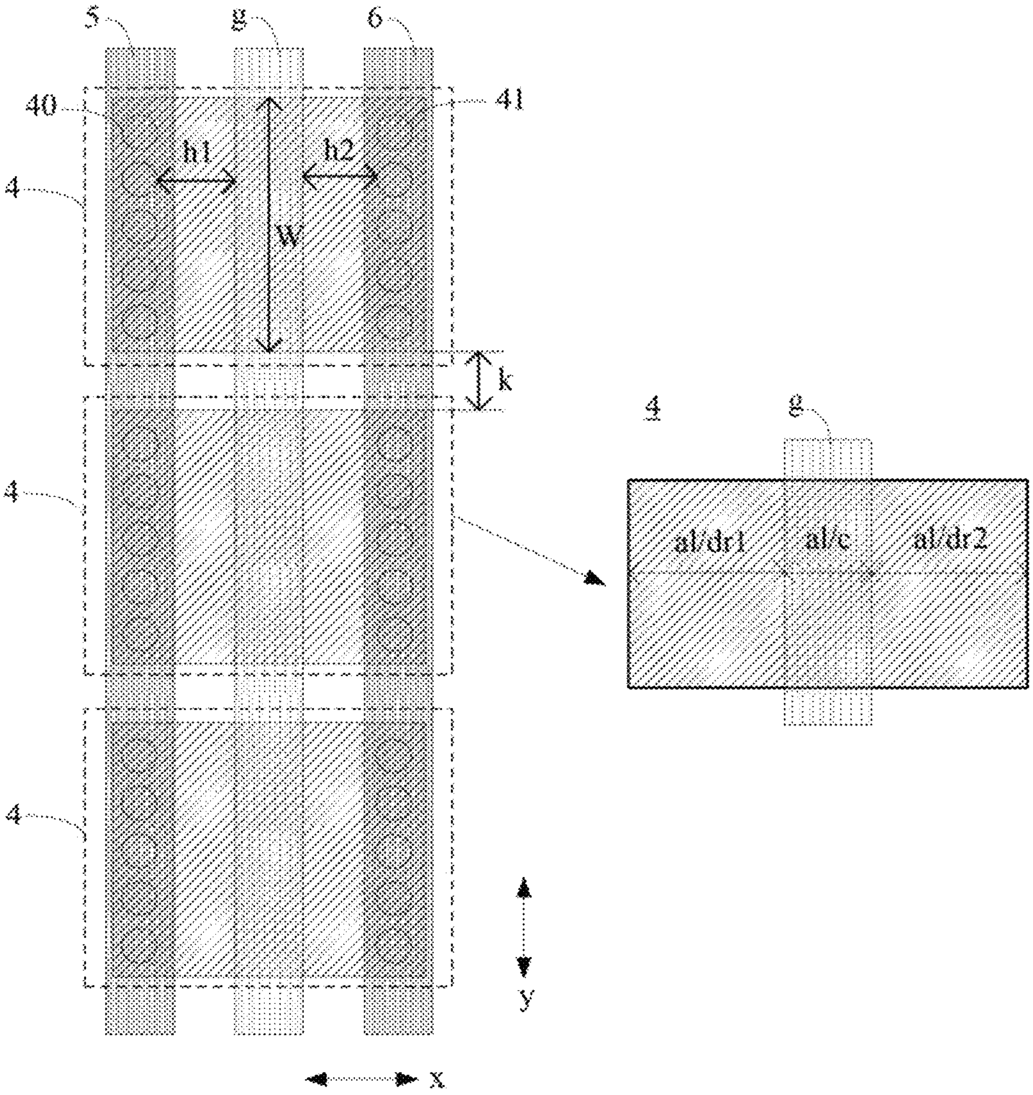
FIG. 42 illustrates a size of the first transistor according to various disclosed embodiments of the present disclosure.

FIG. 42 is a schematic diagram of the size of the first sub-transistor 4 provided in an embodiment of the present disclosure. As shown in FIG. 42, in one embodiment, in the first transistor 3, the channel width W of the first sub-transistor 4 may be less than 20 μm. At this time, the channel width W of the first sub-transistor 4 may be relatively small, which may avoid the abnormal characteristic curve of the transistor structure, and the transistor may have a faster turn-on speed and better performance.

In another embodiment, referring to FIG. 42, in the first transistor 3, the first doped region dr1 of the active layer al in the first sub-transistor 4 may be electrically connected to the first source/drain metal electrode 5 through the first connection via hole 40, and the second doped region dr2 may be electrically connected to the second source/drain metal electrode 6 through the second connection via hole 41.

The distance h1 between the projection of the gate g of the first sub-transistor 4 in the direction perpendicular to the plane where the display panel is located and the projection of the first connecting via hole 40 in the direction perpendicular to the plane where the display panel is located may be greater than or equal to 2.5 μm, and the distance h2 between the projection of the gate g of the first sub-transistor 4 in the direction perpendicular to the plane where the display panel is located and the projection of the second connection via hole 41 in the direction perpendicular to the plane where the display panel is located may be greater than or equal to 2.5 μm. The distance between the projection of the gate g of the above-mentioned sub-transistor and the projection of the connection via hole may be the distance between the point closest to the gate projection in the projection of the connection via hole and the gate projection.

In this way, the gate g may be spaced a sufficient distance from the connection via hole to prevent the metal material in the connection via from short-circuiting with the gate g.

In another embodiment, referring to FIG. 42, in the first transistor 3, the distance k between the active layers al of two adjacent first sub-transistors 4 in the second direction y may be greater than or equal to 2.5 μm, preventing the channels c of adjacent first sub-transistors 4 from being separated due to abnormal exposure in the process.

Figure 43:
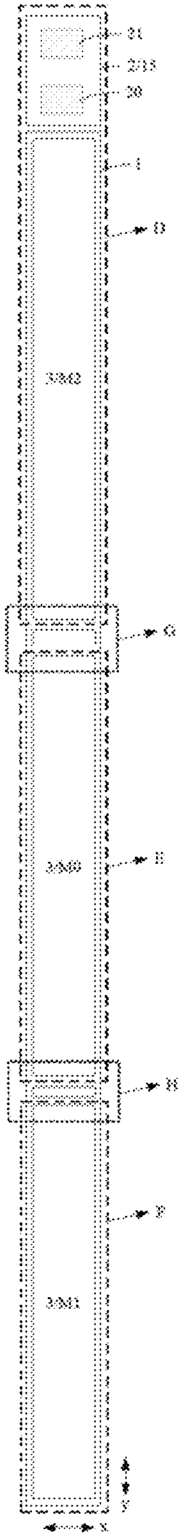
FIG. 43 illustrates a simplified structure of the pixel circuit according to various disclosed embodiments of the present disclosure.
Figure 44:
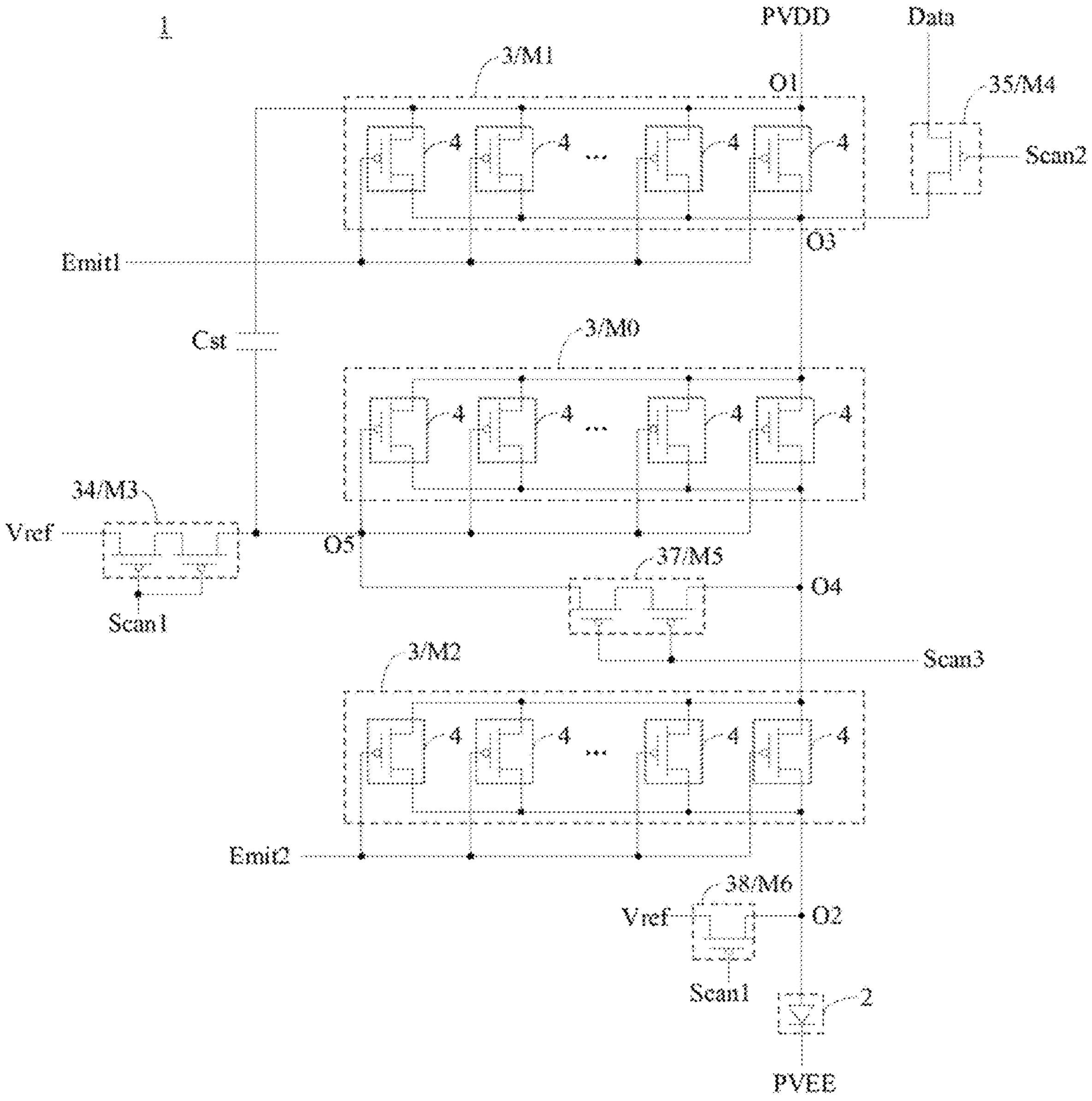
FIG. 44 illustrates another exemplary circuit structure of the pixel circuit according to various disclosed embodiments of the present disclosure.
Figure 45:
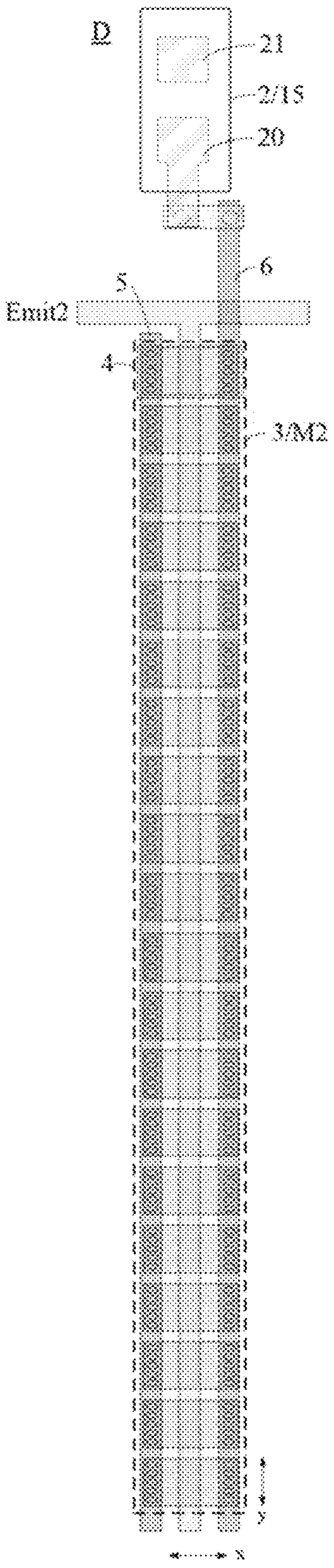
FIG. 45 illustrates an exemplary structure corresponding to the area D in FIG. 43.
Figure 46:
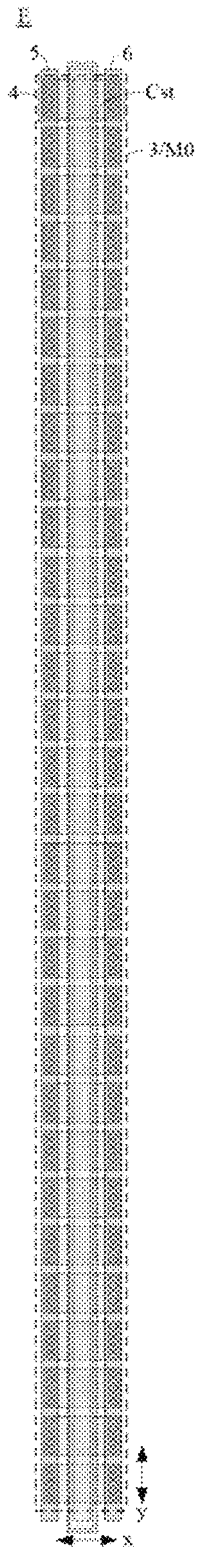
FIG. 46 illustrates an exemplary structure corresponding to the area E in FIG. 43.
Figure 47:
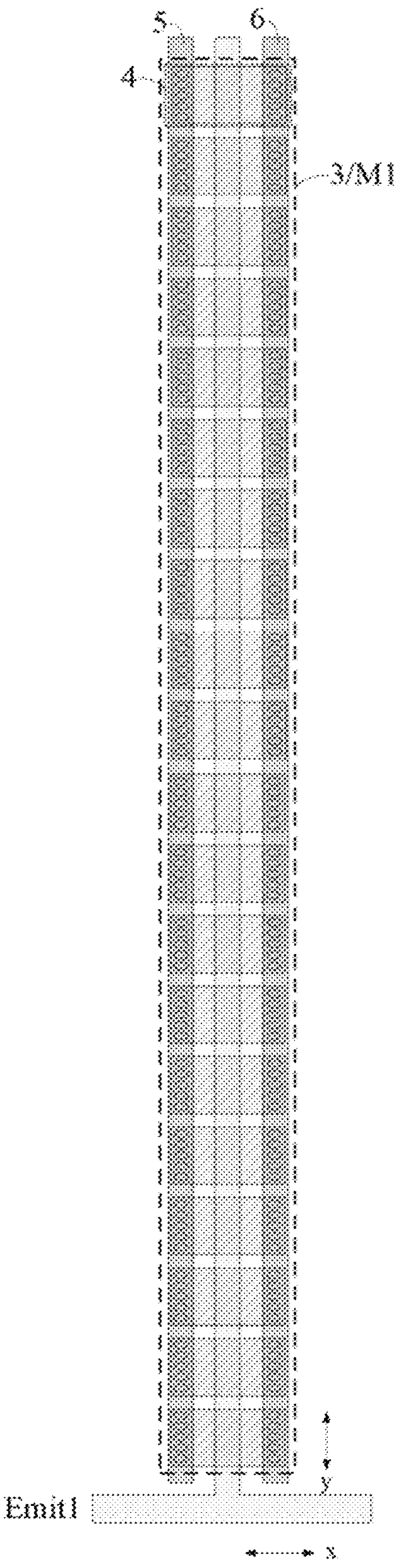
FIG. 47 illustrates an exemplary structure corresponding to the area F in FIG. 43.

FIG. 43 is a simplified structural schematic diagram of the pixel circuit 1 provided in an embodiment of the present disclosure, FIG. 44 is another circuit structural schematic diagram of the pixel circuit 1 provided in an embodiment of the present disclosure, FIG. 45 is a structural schematic diagram corresponding to the area D in FIG. 43, FIG. 46 is a structural schematic diagram corresponding to the area E in FIG. 43, and FIG. 47 is a structural schematic diagram corresponding to the area F in FIG. 43. In combination with FIG. 2, as shown in FIGS. 43-47, in one embodiment, the pixel circuit 1 may include a first light-emitting control transistor M1, a driving transistor M0, and a second light-emitting control transistor M2. The first light-emitting control transistor M1 may be coupled between the first node O1 and the driving transistor M0, and the second light-emitting control transistor M2 may be coupled between the driving transistor M0 and the second node O2. The first light-emitting control transistor M1, the driving transistor M0, and the second light-emitting control transistor M2 may be all first transistors 3. In the second direction y, the driving transistor M0 may be located between the second light-emitting control transistor M2 and the first light-emitting control transistor M1.

When the plurality of first sub-transistors 4 in the first transistor 3 are arranged along the second direction y, the longitudinal length of the first transistor 3 may be relatively large, and the driving transistor M0 may be arranged between the first light-emitting control transistor M1 and the second light-emitting control transistor M2. Accordingly, the driving transistor M0 and the second light-emitting unit group 61 may be spaced at a relatively long distance, thereby preventing the heat emitted by the second light-emitting unit group 61 from affecting the characteristics of the driving transistor M0.

In one embodiment, in combination with FIG. 43, FIG. 45 and FIG. 47, the first light-emitting control transistor M1 may be electrically connected to the first light-emitting control signal line Emit1 extending along the first direction x, and the second light-emitting control transistor M2 may be electrically connected to the second light-emitting control signal line Emit2 extending along the first direction x.

The distance between the first light-emitting control transistor M1 and the first light-emitting control signal line Emit1 may be smaller than the distance between the first light-emitting control transistor M1 and the second light-emitting control signal line Emit2, and the distance between the second light-emitting control signal line Emit2 and the second light-emitting control signal line Emit2 may be smaller than the distance between the second light-emitting control transistor M2 and the first light-emitting control signal line Emit1.

The first light-emitting control transistor M1 and the second light-emitting control transistor M2 may have a large longitudinal length, and because there may be a driving transistor M0 between them, the distance between them may be relatively large. By electrically connecting the two light-emitting control transistors to two independent light-emitting control signal lines respectively, the connection design between the light-emitting control transistor and the light-emitting control signal line may be simplified. Moreover, if only one light-emitting control signal line is used to electrically connect the two light-emitting control transistors, the load of the light-emitting control signal line may be too large, and the first sub-transistor 4 in the two light-emitting control transistors may also be turned on very slowly. The above setting method may effectively solve this problem.

Figure 48:
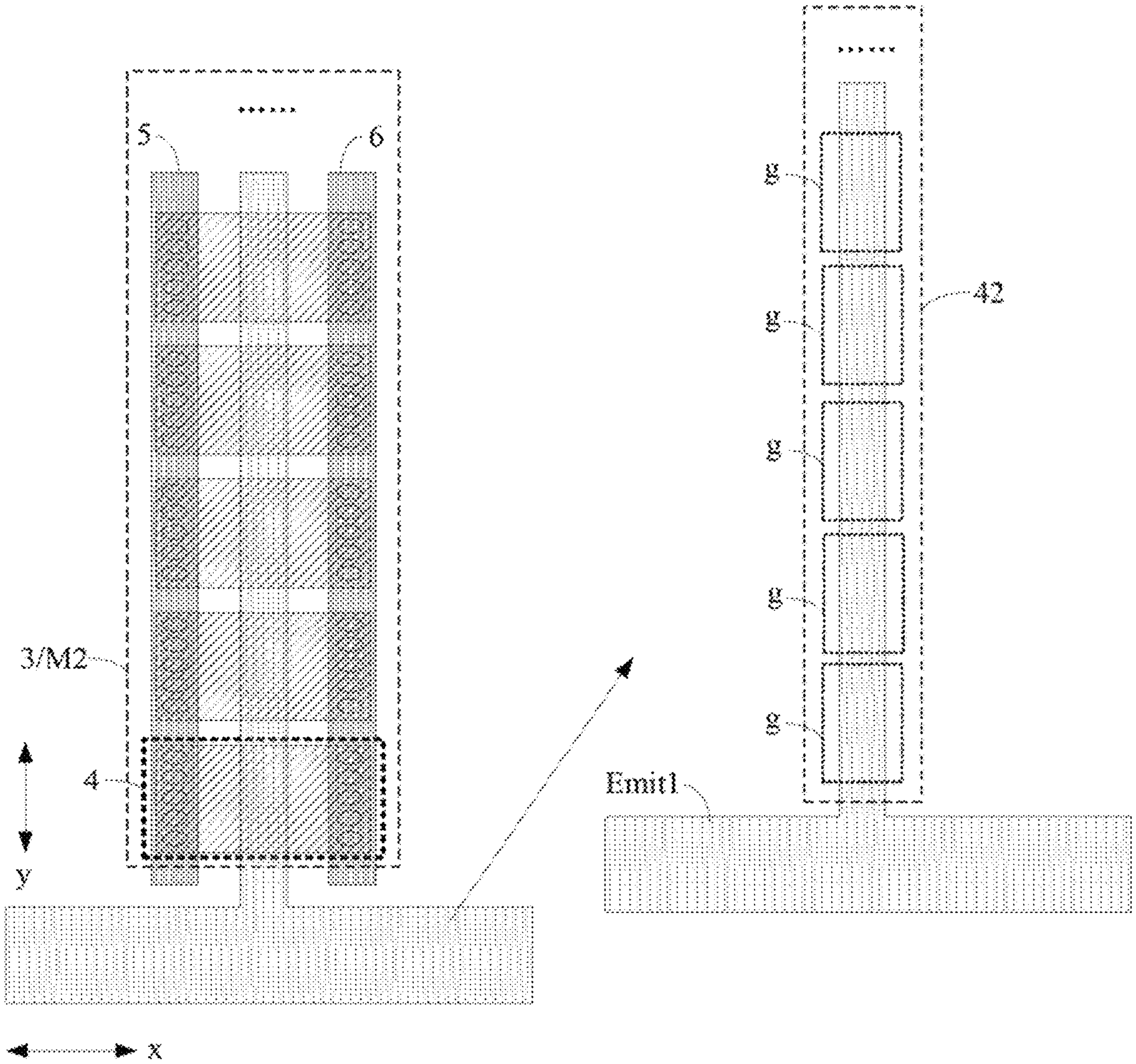
FIG. 48 illustrates another exemplary first light-emitting control signal line of the pixel circuit according to various disclosed embodiments of the present disclosure.

FIG. 48 is another structural schematic diagram of the first light-emitting control signal line Emit1 provided in an embodiment of the present embodiment. As shown in FIG. 48, in one embodiment, the first light-emitting control signal line Emit1 may be electrically connected to the first electrode portion 42 extending along the second direction y. The first electrode portion 42 may be multiplexed as the gate g of each first sub-transistor 4 in the first light-emitting control transistor M1. The width of the first light-emitting control signal line Emit1 in the second direction y may be greater than the width of the first electrode portion 42 in the first direction x. Accordingly, the first light-emitting control signal line Emit1 may have a larger line width, and the larger line width may be used to weaken its load.

Figure 49:
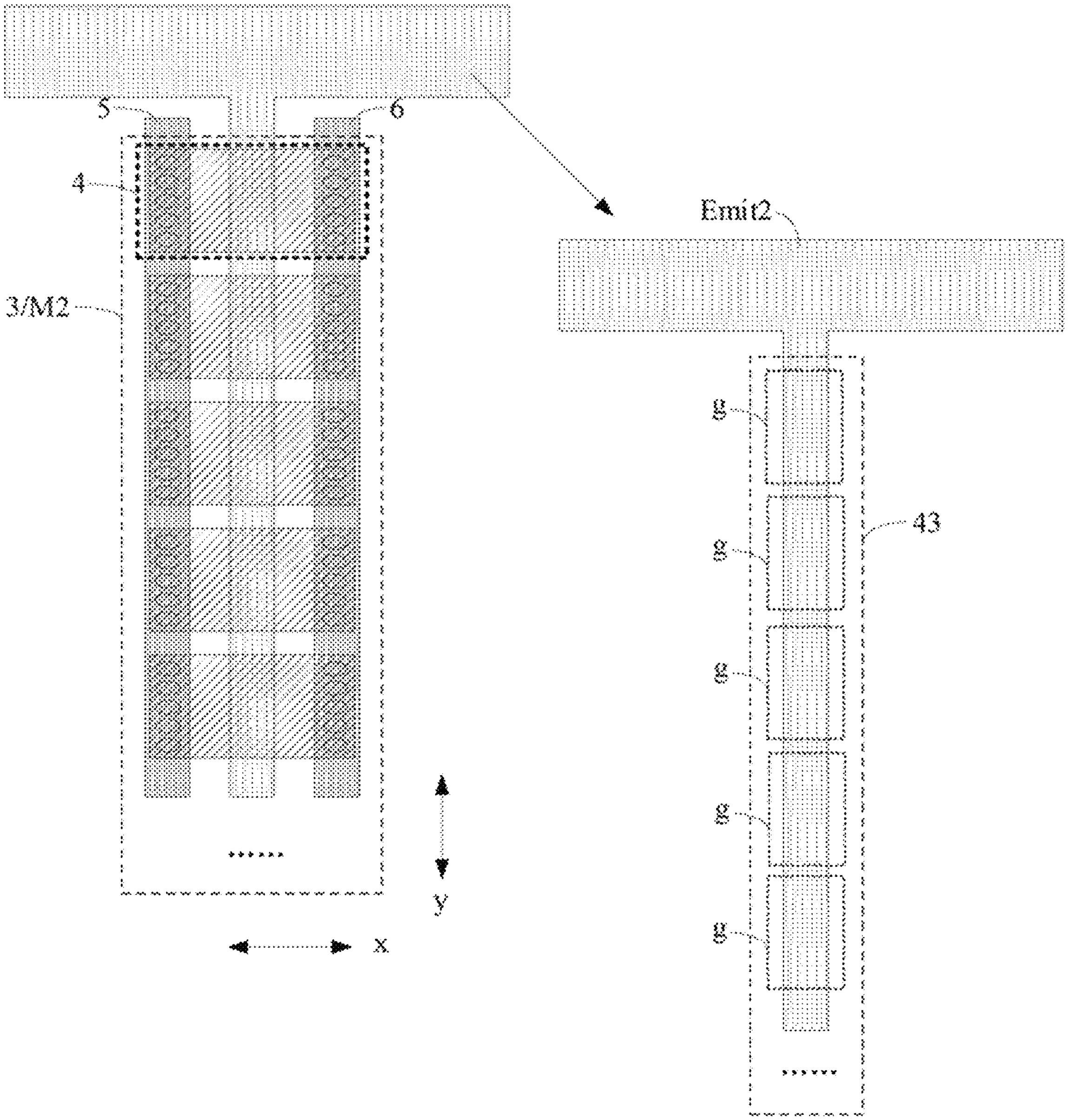
FIG. 49 illustrates another exemplary second light-emitting control signal line of the pixel circuit according to various disclosed embodiments of the present disclosure.

FIG. 49 is another structural schematic diagram of the second light-emitting control signal line Emit2 provided in an embodiment of the present disclosure. As shown in FIG.

49, the second electrode portions 43 extending along the second direction y in the second light-emitting control transistor M2 may be electrically connected, and the second electrode portion 43 may be multiplexed as the gate g of each first sub-transistor 4 in the second light-emitting control transistor M2. The width of the second light-emitting control signal line Emit2 in the second direction y may be greater than the width of the second electrode portion 43 in the first direction x. At this time, the first light-emitting control signal line Emit1 may have a larger line width, and the larger line width may be used to weaken its load.

Figure 50:
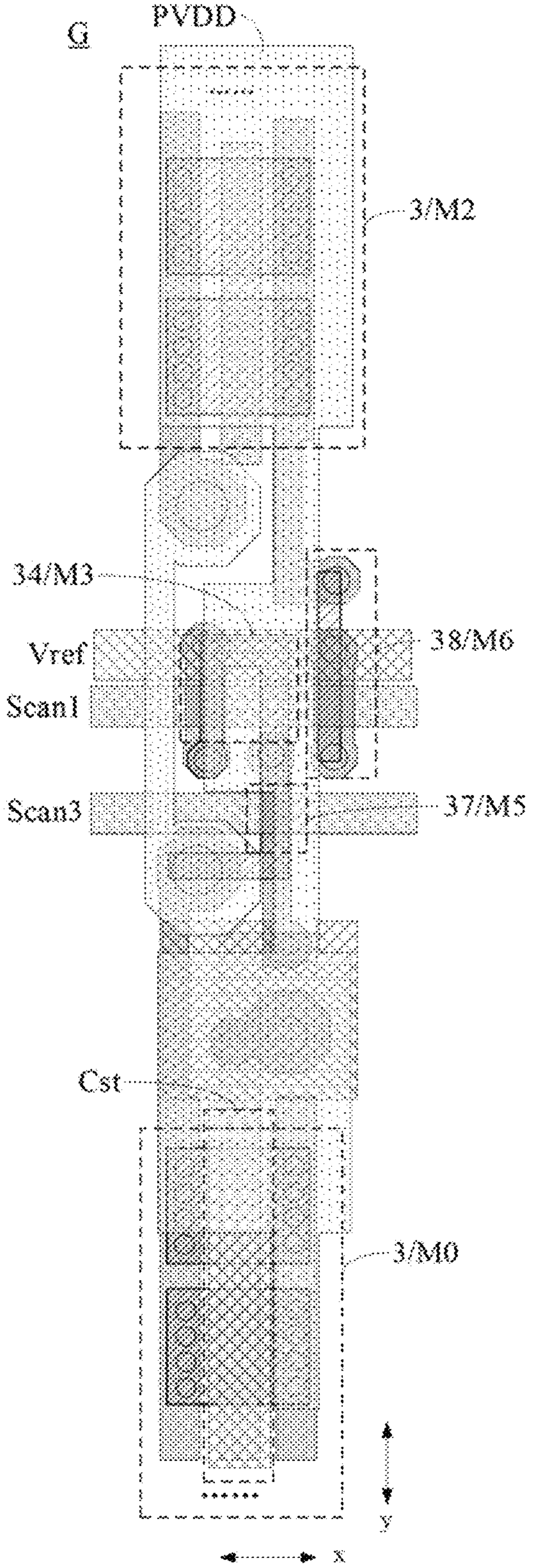
FIG. 50 illustrates an exemplary structure corresponding to the area G in FIG. 43.
Figure 51:
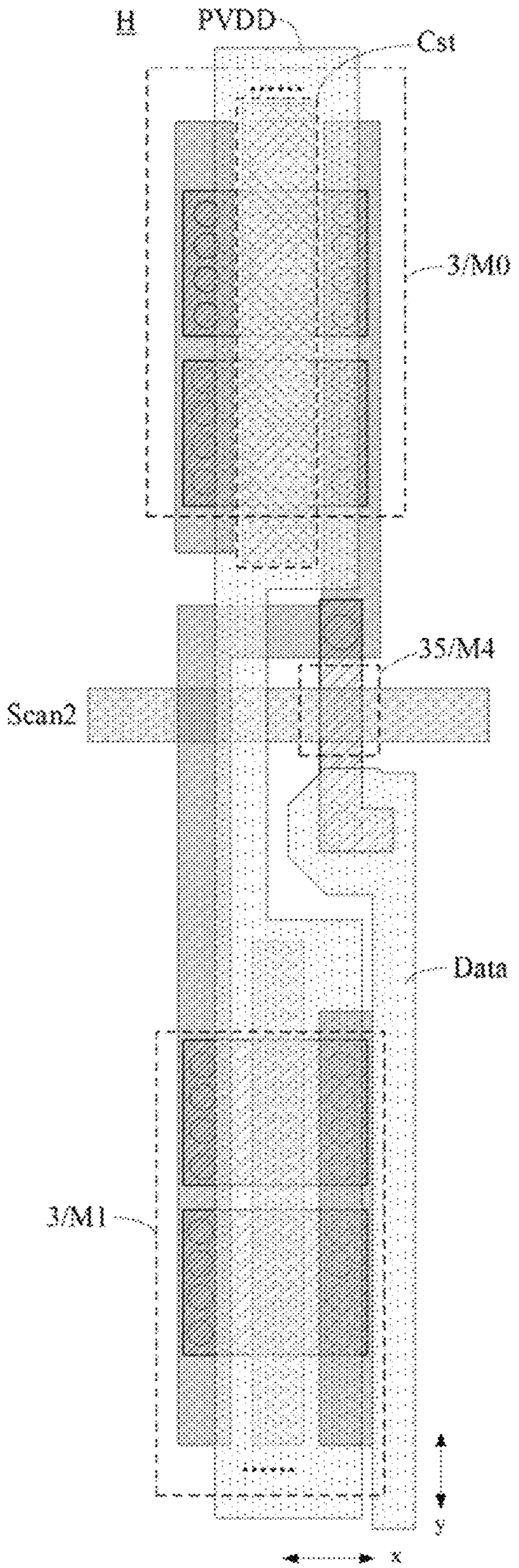
FIG. 51 illustrates an exemplary structure corresponding to the area H in FIG. 43.

FIG. 50 is a structural schematic diagram corresponding to the area G in FIG. 43, and FIG. 51 is a structural schematic diagram corresponding to the area H in FIG. 43. In one embodiment, in combination with FIG. 43, FIG. 44 and FIG. 50, the pixel circuit 1 may also include a third node O3, a fourth node O4 and a fifth node O5. The first light-emitting control transistor M1 may be coupled between the first node O1 and the third node O3. The driving transistor M0 may be coupled between the third node O3 and the fourth node O4. The second light-emitting control transistor M2 may be coupled between the fourth node O4 and the second node O2. The gate of the first sub-transistor 4 in the driving transistor M0 may be electrically connected to the fifth node O5.

The pixel circuit 1 may also include a data writing module 35, a compensation module 37 and an anode reset module 38. The data writing module 35 may be electrically connected to the third node O3, the compensation module 37 may be electrically connected to the fourth node O4 and the fifth node O5 respectively, and the anode reset module 38 may be electrically connected to the second node O2.

The anode reset module 38 and the compensation module 37 may be located between the second light-emitting control transistor M2 and the driving transistor M0. The data writing module 35 may be located between the driving transistor M0 and the first light-emitting control transistor M1.

The anode reset module 38 may be connected to the second light-emitting control transistor M2, and the compensation module 37 may be connected to the driving transistor M0. The anode reset module 38 and the compensation module 37 may be arranged between the second light-emitting control transistor M2 and the driving transistor M0, which may facilitate the connection between the anode reset module 38 and the second light-emitting control transistor M2, and between the compensation module 37 and the driving transistor M0. The data writing module 35 may be located between the driving transistor M0 and the first light-emitting control transistor M1, and the data writing module 35 may be arranged between the driving transistor M0 and the first light-emitting control transistor M1, which may facilitate the connection between the data writing module 35 and the driving transistor M0 and the first light-emitting control transistor M1.

Figure 52:
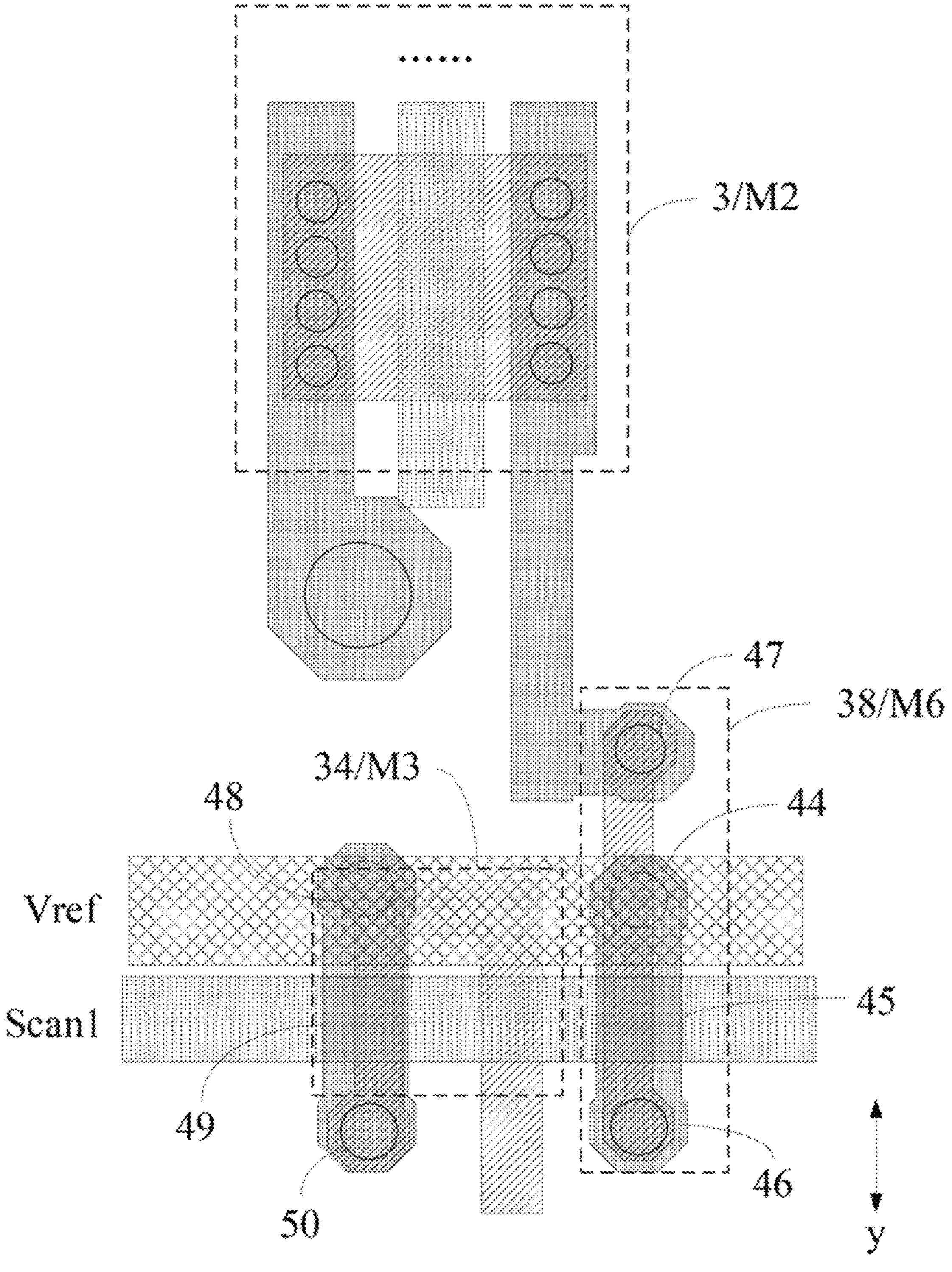
FIG. 52 illustrates an exemplary partially zoomed-in structure corresponding to FIG. 50.

FIG. 52 is a partially enlarged schematic diagram corresponding to FIG. 50. As shown in FIG. 52, in one embodiment, the anode reset module 38 may include an anode reset transistor M6. The gate of the anode reset transistor M6 may be electrically connected to the first scan signal line Scan1, the first electrode of the anode reset transistor M6 may be electrically connected to the reset signal line Vref, and the second electrode of the anode reset transistor M6 may be electrically connected to the second node O2.

The reset signal line Vref may be located on the side of the first scan signal line Scan1 adjacent to the second light-emitting control transistor M2. The reset signal line Vref may be electrically connected to one end of the first wiring 45 through the first via hole 44, the first wiring 45 may extend along the second direction y, and the other end of the first wiring 45 may be electrically connected to the first terminal of the anode reset transistor M6 through the second via hole 46 on the side of the first scan signal line Scan1 away from the reset signal line Vref. The second terminal of the anode reset transistor M6 may be electrically connected to the second light-emitting control transistor M2 through the third via 47 on the side of the reset signal line Vref away from the first scan signal line Scan1.

Moreover, in a direction perpendicular to the plane where the display panel is located, the first wiring 45 may overlap with the active layer al of the anode reset transistor M6. Accordingly, the first wiring 45 may not need to occupy additional lateral space, which may help to further reduce the lateral length of the pixel circuit 1.

In one embodiment, referring to FIG. 44, the pixel circuit 1 may also include a gate reset module 34. The gate reset module 34 may include a gate reset transistor M3, the gate of the gate reset transistor M3 may be electrically connected to the first scan signal line Scan1, the first terminal of the gate reset transistor M3 may be electrically connected to the reset signal line Vref, and the second terminal of the gate reset transistor M3 may be electrically connected to the fifth node O5.

Referring to FIG. 52, the gate reset transistor M3 may be located between the second light-emitting control transistor M2 and the driving transistor M0. The reset signal line Vref may also be electrically connected to one end of the second wiring 49 through the fourth via hole 48. The second wiring 49 may extend along the second direction y, and the other end of the second wiring 49 may be connected to the first electrode of the gate reset transistor M3 through the fifth via hole 50 on the side of the first scan signal line Scan1 away from the reset signal line Vref.

Moreover, in the direction perpendicular to the plane where the display panel is located, the second wiring 49 may overlap with the active layer al of the gate reset transistor M3 such that the second wiring 49 may not need to occupy additional lateral space, which may help to further reduce the lateral length of the pixel circuit 1.

Further, referring to FIG. 44, the compensation module 37 may include a compensation transistor M5. The gate of the compensation transistor M5 may be electrically connected to the second scan signal line Scan2, the first terminal of the compensation transistor M5 may be electrically connected to the fourth node O4, and the second terminal of the compensation transistor M5 may be electrically connected to the fifth node O5.

Figure 53:
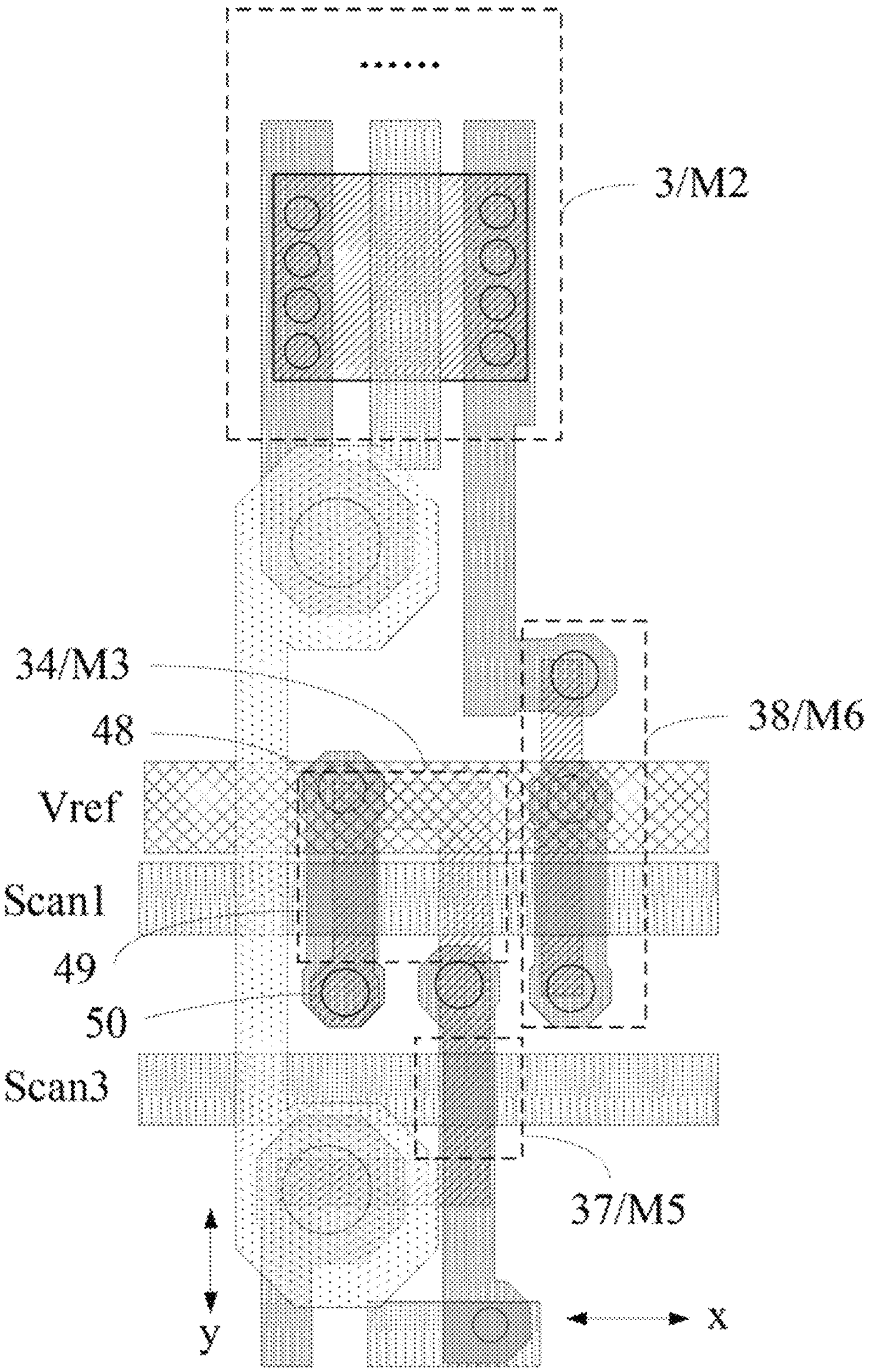
FIG. 53 illustrates another exemplary partially zoomed-in structure corresponding to FIG. 50.

FIG. 53 is another partially enlarged schematic diagram corresponding to FIG. 50. As shown in FIG. 53, the first terminal of the compensation transistor M5 may be electrically connected to the second light-emitting control transistor M2 through the third wiring 51. The third wiring 51 may extend along the second direction y, and the third wiring 51 and the second wiring 49 may be arranged in different layers.

If the third line 51 and the second line 49 are arranged on the same layer, the third line 51 and the second line 49 may need to be spaced sufficiently apart to avoid short circuit. By setting the third line 51 on a different layer from the second line 49, the distance between the orthographic projection of the third line 51 on the plane where the display panel is located and the orthographic projection of the second line 49 on the plane where the display panel is located may be reduced, or the third line 51 may also directly overlap with the second line 49, thereby further reducing the horizontal wiring space required to be occupied by the pixel circuit 1.

In another embodiment, in combination with FIG. 44, and FIGS. 50-51, the data writing module 35 may be electrically connected to the second scanning signal line Scan2, and the compensation module 37 may be electrically connected to the third scanning signal line Scan3. The second scanning signal line Scan2 and the third scanning signal line Scan3 may transmit the same signal at the same time.

The third scanning signal line Scan3 may be located between the second light-emitting control transistor M2 and the driving transistor M0. The second scanning signal line Scan2 may be located between the driving transistor M0 and the first light-emitting control transistor M1.

Because the data writing module 35 and the compensation module 37 may be respectively located on opposite sides of the driving transistor M0 in the second direction y, and the two may be far apart, in the embodiment of the present disclosure, an independent scanning signal line may be set for each of the two so as to connect the two with the scanning signal line.

Figure 54:
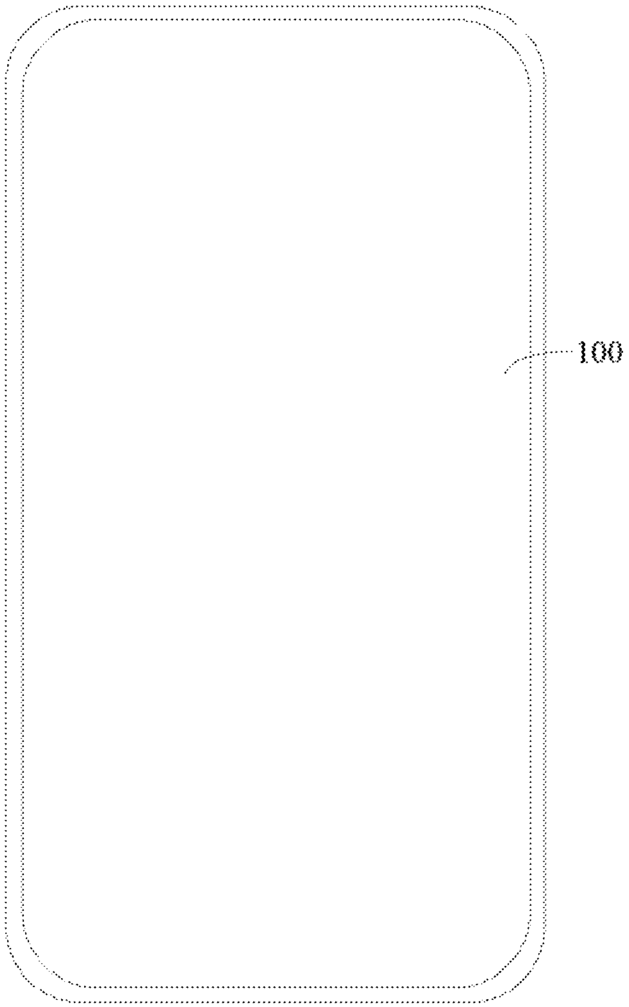
FIG. 54 illustrates an exemplary display panel according to various disclosed embodiments of the present disclosure.

The present disclosure also provides a display device. FIG. 54 is a structural schematic diagram of an exemplary display device provided by one embodiment of the present disclosure. As shown in FIG. 54, the display device includes a display panel 100. The display panel 100 may be a present disclosed display panel described above. The specific structure of the display panel 100 has been described in detail in the above embodiments, and will not be repeated here. The display device shown in FIG. 54 is only for schematic illustration, and the display device may be any electronic device with display function, such as a mobile phone, a tablet computer, a laptop computer, an e-book or a television, etc.

One of the above technical solutions has the following beneficial effects.

In the embodiment of the present disclosure, for the first transistor coupled to the current transmission path, its channel width may not be directly increased, but it may be made to include at least two first sub-transistors arranged in parallel. In the structure of this first transistor, the equivalent width-to-length ratio of the first transistor may be equal to the width-to-length ratio of a single first sub-transistor multiplied by the number of first sub-transistors included in the first transistor, thereby achieving a significant increase in the equivalent width-to-length ratio of the first transistor and improving the current output capacity of the first transistor while avoiding the channel width of a single transistor structure in the pixel circuit being too large. Accordingly, the transistor structure may have a better turn-on speed, and thus the pixel circuit may have a better performance.

It can be further understood that after the current output capacity of the first transistor is increased, the upper limit of the driving current that the pixel circuit can output may also be increased, and the pixel circuit may output a larger driving current to the light-emitting unit. Accordingly, the display screen may have a higher brightness, thereby better meeting the display requirements.

The above is only a preferred embodiment of the present disclosure, and is not intended to limit the present disclosure. Any modifications, equivalent substitutions, improvements, etc., made within the spirit and principles of the present disclosure should be included in the scope of protection of the present disclosure.

Finally, it should be noted that: the above each embodiment is only used to illustrate the technical solution of the present disclosure rather than to limit it. Although the present disclosure has been described in detail with reference to the aforementioned embodiments, a person skilled in the art should understand that the technical solutions described in the aforementioned embodiments may still be modified, or some or all of the technical features may be replaced by equivalents. However, these modifications or replacements do not cause the essence of the corresponding technical solution to deviate from the scope of the technical solution of the embodiments of the present disclosure.

What is claimed is:

1. A display panel, comprising:
a pixel circuit;
a light-emitting unit,
wherein:
the pixel circuit includes a first node and a second node, the first node is electrically connected to a first power line, and the second node is electrically connected to the light-emitting unit; and
the pixel circuit includes a first transistor coupled between the first node and the second node, the first transistor includes X first sub-transistors, gates of the X first sub-transistors are connected, first terminals of the X first sub-transistors are connected, second terminals of the X first sub-transistors are connected, X≥2, and X is an integer; and
a first display unit including a first light-emitting unit group and a first pixel circuit group,
wherein:
the first light-emitting unit group includes M light-emitting units arranged along a first direction;
the first pixel circuit group includes N pixel circuits arranged along a second direction;
a pixel circuit of the N pixel circuits in the first pixel circuit group is electrically connected to at least one light-emitting unit of the M light-emitting units in the first light-emitting unit group;
M≥2, N≥2, and M and N are both integers; and
the first direction and the second direction intersect.

2. The display panel according to claim 1, wherein the pixel circuit comprises:
a first light-emitting control transistor, a driving transistor, and a second light-emitting control transistor,
wherein:
the first light-emitting control transistor is coupled between the first node and the driving transistor, and the second light-emitting control transistor is coupled between the driving transistor and the second node; and
at least one of the first light-emitting control transistor, the driving transistor, and the second light-emitting control transistor includes the first transistor.

3. The display panel according to claim 1, wherein:

$$M=N.$$

4. The display panel according to claim 1, wherein:
in the first display unit, the N pixel circuits in the first pixel circuit group are located at least one side of the first light-emitting unit group in the second direction.

5. The display panel according to claim 4, wherein:
a length of the pixel circuit in the first direction is D;

$$(M-1)\times(d1+d2)\leq D\_M\times(d1+d2);\text{ and}$$

d1 is a length of the light-emitting unit in the first direction, and d2 is a spacing between two adjacent light-emitting units.

6. The display panel according to claim 1, wherein the first pixel circuit group comprises:
a first sub-circuit group; and
a second sub-circuit group,
wherein:
the first sub-circuit group includes N1 pixel circuits;
the second sub-circuit group includes N2 pixel circuits;
N1+N2=N, N1≥1, N2≥1, and N1 and N2 are both integers; and
the first light-emitting unit group is located between the first sub-circuit group and the second sub-circuit group.

7. The display panel according to claim 6, wherein:
M=N, N1≥2, and N2≥2;
the first light-emitting unit group includes a first sub-unit group and a second sub-unit group arranged along the first direction;
the first sub-unit group includes N1 light-emitting units;
the second sub-unit group includes N2 light-emitting units;
the N1 pixel circuits in the first sub-circuit group arranged along a direction from the first sub-circuit group to the second sub-circuit group are electrically connected in sequence to the N1 light-emitting units in the first sub-circuit group arranged along the direction from the first sub-circuit group to the second sub-circuit group; and
the N2 pixel circuits in the second sub-circuit group arranged along the direction from the first sub-circuit group to the second sub-circuit group are electrically connected in sequence to the N2 light-emitting units in the second sub-circuit group arranged along the direction from the first sub-circuit group to the second sub-circuit group.

8. The display panel according to claim 6, wherein:
N1=N2.

9. The display panel according to claim 6, wherein the first pixel comprises:
a first light-emitting control transistor;
a driving transistor; and
a second light-emitting control transistor,
wherein:
the first light-emitting control transistor is coupled between the first node and the driving transistor;
the second light-emitting control transistor is coupled between the driving transistor and the second node;
at least one of the first light-emitting control transistor, the driving transistor and the second light-emitting control transistor includes the first transistor;
in the pixel circuits of the first sub-circuit group and/or the second sub-circuit group, a distance between the second light-emitting control transistor and the first light-emitting unit group is smaller than a distance between the first light-emitting control transistor and the first light-emitting unit group.

10. The display panel according to claim 9, wherein:
the pixel circuits in the first sub-circuit group and the pixel circuits in the second sub-circuit group are mirrored along the first direction.

11. The display panel according to claim 6, wherein:
the light-emitting unit includes a light-emitting element;
the display panel also includes a driving backplane;
the driving backplane includes a substrate, a circuit layer located on one side of the substrate, and a first metal layer located on a side of the circuit layer away from the substrate;
the circuit layer includes the pixel circuits;
the first metal layer includes a first output electrode electrically connected to a first terminal of the light-emitting element, a second output electrode electrically connected to a second terminal of the light-emitting element, and a second power line electrically connected to the second output electrode;

the first output electrode is located at a side of the second output electrode connected to the light-emitting element adjacent to the second sub-circuit group;

the second power line overlaps the first sub-circuit group in a direction perpendicular to a plane where the substrate is located;

the first output electrode includes a first sub-electrode and a second sub-electrode;

the first sub-electrode is electrically connected to the pixel circuit in the first sub-circuit group through a first connection line;

the second sub-electrode is electrically connected to the pixel circuit in the second sub-circuit group through a second connection line;

the second connection line is located in the first metal layer; and the first connection line is located on a side of the first metal layer adjacent to the substrate.

12. The display panel according to claim 11, wherein the driving backplane further comprises:

a second metal layer located between the circuit layer and the first metal layer, wherein:

the first connection line is located in the second metal layer;

the second metal layer also includes a first connection electrode and a second connection electrode;

the pixel circuit in the second sub-circuit group is electrically connected to the second connection line through the second connection electrode;

the pixel circuit in the first sub-circuit group is electrically connected to the first metal member through the first connection electrode;

the first metal member is located in the first metal layer;

the second power line includes a hollowed structure; and at least a portion of the first metal member is located in the hollowed structure and is electrically insulated from the second power line.

13. The display panel according to claim 11, the driving backplane further comprises:

a second metal layer located between the circuit layer and the first metal layer, wherein:

the first connection line is located in the second metal layer; and in a direction perpendicular to the plane where the substrate is located, a thickness of the first metal layer is different from a thickness of the second metal layer; and/or, a width of the second connection line is different from a width of the first connection line.

14. The display panel according to claim 11, wherein:

in a direction perpendicular to the plane where the substrate is located, the first connection line does not overlap with the first output electrode or the second output electrode.

15. The display panel according to claim 14, comprising:

the first connection line is electrically connected to the first sub-electrode at a side of the first sub-electrode adjacent to the second sub-circuit group.

16. The display panel according to claim 6, wherein:

the first light-emitting unit group includes a first sub-unit group and a second sub-unit group arranged along the first direction;

the first sub-unit group includes M1 light-emitting units;

the second sub-unit group includes M2 light-emitting units;

M1≥1, M2≥1, and M1 and M2 are both integers;

the pixel circuits in the first sub-circuit group are electrically connected to the light-emitting units in the first sub-unit group through a first connection line;

the pixel circuits in the second sub-circuit group are electrically connected to the light-emitting units in the second sub-unit group through a second connecting line;

the pixel circuits in the first sub-circuit group are electrically connected to the first connection line through a first lead-out electrode;

the pixel circuits in the second sub-circuit group are electrically connected to the second connection line through a second lead-out electrode;

an orthographic projection of the first lead-out electrode on a plane where the display panel is located and an orthographic projection of the first sub-unit group on the plane where the display panel is located overlap in the second direction; and an orthographic projection of the second lead-out electrode on the plane where the display panel is located and an orthographic projection of the second sub-unit group on the plane where the display panel is located overlap in the second direction.

17. The display panel according to claim 6, wherein:

the light-emitting unit includes a light-emitting element;

the display panel includes a driving backplane;

the driving backplane includes a substrate, a circuit layer located on one side of the substrate, and a first metal layer located on a side of the circuit layer away from the substrate;

the circuit layer includes the pixel circuits;

the first metal layer includes a first output electrode electrically connected to a first terminal of the light-emitting element and a second output electrode electrically connected to a second terminal of the light-emitting element;

the first output electrode includes a first sub-electrode and a second sub-electrode;

the first sub-electrode is also electrically connected to the pixel circuit in the first sub-circuit group;

the second sub-electrode is also electrically connected to the pixel circuit in the second sub-circuit group;

the first sub-electrode is located at a side of the second output electrode connected to the same light-emitting element adjacent to the first sub-circuit group; and the second sub-electrode is located on the side of the second output electrode connected to the same light-emitting element adjacent to the second sub-circuit group.

18. The display panel according to claim 1, wherein:

first sub-transistors in the first transistor are arranged along a first direction and a second direction; and the first direction intersects with the second direction.

19. The display panel according to claim 1, wherein:

the N pixel circuits in the first pixel circuit group is electrically connected to the M light-emitting units in the first light-emitting unit group.

20. A display device, comprising:

a display panel including a pixel circuit, a light-emitting unit, and a first display unit including a first light-emitting unit group and a first pixel circuit group, wherein:

the pixel circuit includes a first node and a second node, the first node is electrically connected to a first power line, and the second node is electrically connected to the light-emitting unit; and the pixel circuit includes a first transistor coupled between the first node and the second node, the first transistor includes X first sub-transistors, gates of the X first sub-transistors are connected, first terminals of the X first sub-transistors are connected, second terminals of the X first sub-transistors are connected, X≥2, and X is an integer; and wherein:

the first light-emitting unit group includes M light-emitting units arranged along a first direction;

the first pixel circuit group includes N pixel circuits arranged along a second direction;

a pixel circuit of the N pixel circuits in the first pixel circuit group is electrically connected to at least one light-emitting unit of the M light-emitting units in the first light-emitting unit group;

M≥2, N≥2, and M and N are both integers; and the first direction and the second direction intersect.

* * * * *